(12) United States Patent
Ichikawa et al.

(10) Patent No.: US 7,911,077 B2
(45) Date of Patent: *Mar. 22, 2011

(54) POWER SUPPLY SYSTEM, VEHICLE PROVIDED WITH THE SAME, TEMPERATURE RISE CONTROL METHOD OF POWER STORAGE DEVICE, AND COMPUTER-READABLE RECORDING MEDIUM WITH PROGRAM RECORDED THEREON FOR CAUSING COMPUTER TO EXECUTE TEMPERATURE RISE CONTROL OF POWER STORAGE DEVICE

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 131 days.

This patent is subject to a terminal disclaimer.

(21) Appl. No.: 12/309,643

(22) PCT Filed: Jun. 20, 2007

(86) PCT No.: PCT/JP2007/062839
§ 371 (c)(1),
(2), (4) Date: Jan. 26, 2009

(87) PCT Pub. No.: WO2008/015857
PCT Pub. Date: Feb. 7, 2008

(65) Prior Publication Data
US 2009/0315403 A1    Dec. 24, 2009

(30) Foreign Application Priority Data

Jul. 31, 2006 (JP) .................. 2006-207915
Oct. 31, 2006 (JP) .................. 2006-296076

(51) Int. Cl.
*B60L 1/00* (2006.01)
(52) U.S. Cl. .......................................... 307/9.1
(58) Field of Classification Search .................. 307/9.1
See application file for complete search history.

(56) References Cited

U.S. PATENT DOCUMENTS 6,501,250 B2   12/2002   Bito et al.
6,608,396 B2   8/2003   Downer et al.
(Continued)

FOREIGN PATENT DOCUMENTS

JP    A-10-174297    6/1998
(Continued)

OTHER PUBLICATIONS

U.S. Appl. No. 12/308,683, filed Dec. 2008, Ichikawa, Shinji et al.*

*Primary Examiner* — Robert L. DeBeradinis
(74) *Attorney, Agent, or Firm* — Oliff & Berridge, PLC

(57) ABSTRACT

During temperature rise control of a power storage device, a correction value calculation unit outputs a negative correction value when a voltage value exceeds an upper limit value. Thus, a duty command is corrected to be decreased. That is, duty command is corrected to increase a boost rate of a converter. Meanwhile, correction value calculation unit outputs a positive correction value when voltage value falls below a lower limit value. Thus, duty command is corrected to be increased. That is, duty command is corrected to lower the boost rate of the converter.

14 Claims, 34 Drawing Sheets

U.S. PATENT DOCUMENTS

| | | |
|---|---|---|
| 2002/0003417 A1 | 1/2002 | Bito et al. |
| 2003/0107352 A1 | 6/2003 | Downer et al. |

FOREIGN PATENT DOCUMENTS

| | | |
|---|---|---|
| JP | A-2001-057743 | 2/2001 |
| JP | A-2001-314039 | 11/2001 |
| JP | A-2003-209969 | 7/2003 |
| JP | A-2003-274565 | 9/2003 |
| JP | A-2003-339103 | 11/2003 |
| JP | A-2005-332777 | 12/2005 |
| JP | A-2006-081300 | 3/2006 |
| JP | A-2006-121874 | 5/2006 |

\* cited by examiner

FIG.2
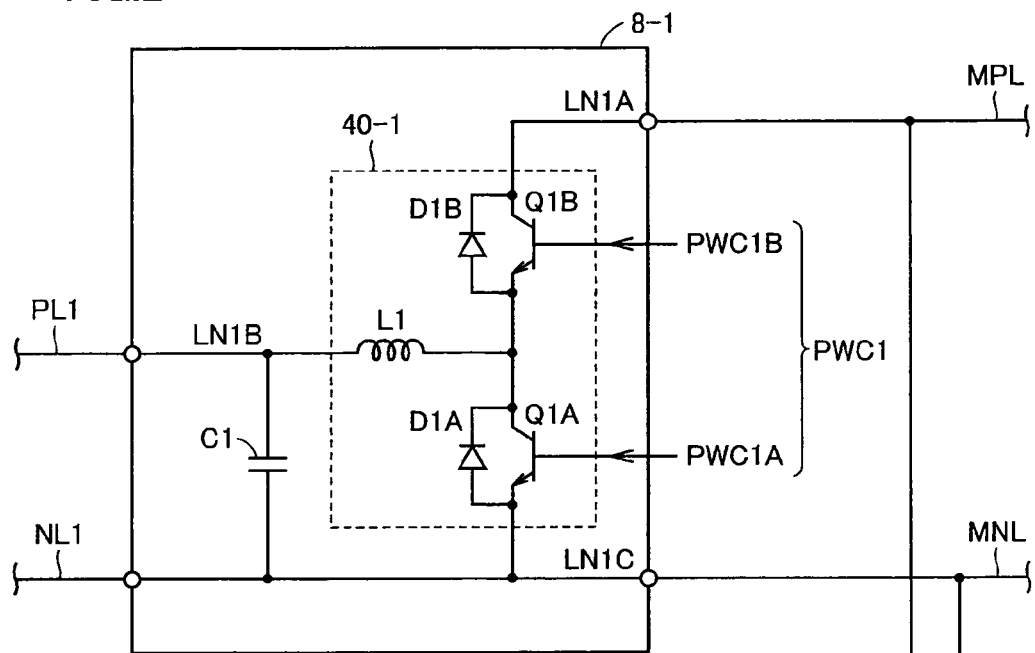
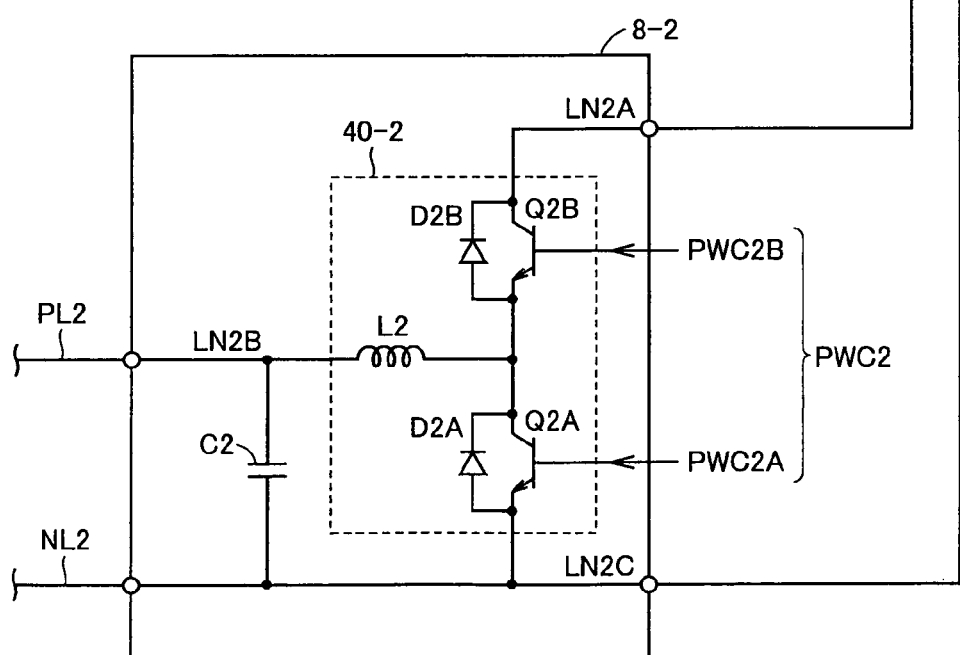

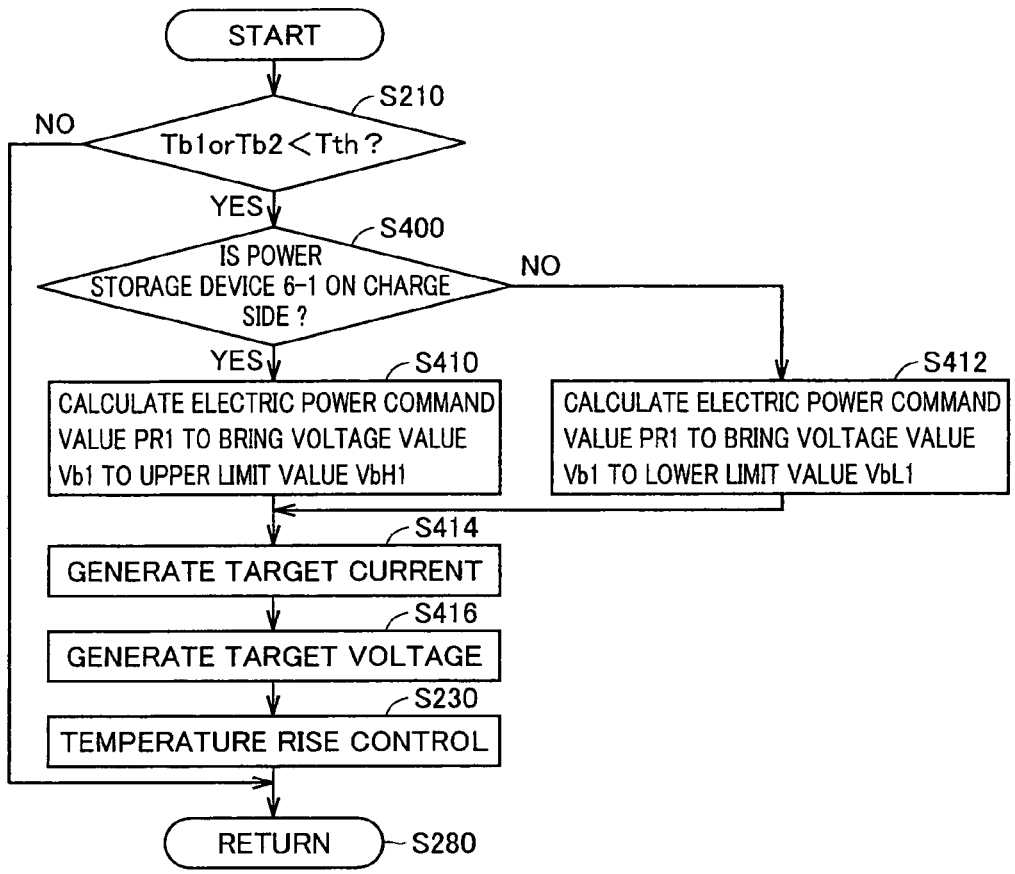
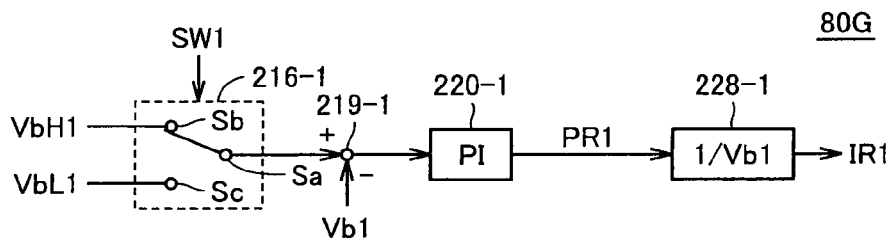

POWER SUPPLY SYSTEM, VEHICLE PROVIDED WITH THE SAME, TEMPERATURE RISE CONTROL METHOD OF POWER STORAGE DEVICE, AND COMPUTER-READABLE RECORDING MEDIUM WITH PROGRAM RECORDED THEREON FOR CAUSING COMPUTER TO EXECUTE TEMPERATURE RISE CONTROL OF POWER STORAGE DEVICE

TECHNICAL FIELD

The present invention relates to a control technique to raise temperature of a power storage device contained in a power supply system.

BACKGROUND ART

Recently, a hybrid vehicle and an electric vehicle have been focused on against a backdrop of environment issues. On these vehicles, an electric motor is mounted as a motive power source, and a power storage device such as a secondary battery and a capacitor is mounted as its electric power source.

In general, according to the power storage device such as the secondary battery and the capacitor, when its temperature is decreased, its capacity is lowered and as a result, charge/discharge characteristics are lowered. Thus, according to such vehicle, when the temperature of the power storage device is lowered after a vehicle system is started, it is necessary to raise the temperature of the power storage device.

Japanese Patent Laying-Open No. 2005-332777 discloses a warm-up control device to warm up a battery by internal heat generation of the battery by controlling charge and discharge of the battery at a low temperature. This warm-up control device includes charge/discharge pattern setting means, limiter value setting means, and warm-up controlling means. The charge/discharge pattern setting means variably sets a charge/discharge pattern repeating the charge and discharge of the battery alternately in the form of a pulse, based on a state of the battery. The limiter value setting means variably sets a limiter value to limit a maximum amplitude of the charge/discharge pattern, based on a battery temperature. When the battery temperature is lower than a predetermined temperature, the warm-up controlling means executes the charge/discharge of the battery based on the charge/discharge pattern set by the charge/discharge pattern setting means, within a range of the limiter value set by the limiter value setting means.

According to this warm-up control device, the temperature rise is promoted by the internal heat generation while the battery is protected by the limiter value setting means, so that the capacity of the battery lowered when the temperature is low can be recovered promptly.

According to the above hybrid vehicle and the electric vehicle, the capacity of a power storage unit is increasingly enlarged in order to enhance acceleration performance and travel performance such as a travel duration. Means for enlarging the capacity of the power storage unit includes a constitution having the plurality of power storage devices.

However, according to the above Japanese Patent Laying-Open No. 2005-332777, temperature rise control of the power storage device in a power supply system having the plurality of power storage devices and a protection method of the power storage device at that time are not disclosed in particular.

In addition, it is necessary to raise the temperature of the power storage device promptly when the temperature of the power storage device is lowered, in order to make the best use of the merits of the enlarged capacity of the power storage device.

DISCLOSURE OF THE INVENTION

It is an object of the present invention to provide a power supply system capable of raising temperature of a power storage device while protecting it and having the plurality of power storage devices and a vehicle provided with it.

In addition, it is another object of the present invention to provide a temperature rise control method for raising temperature of a power storage device while protecting it, in a power supply system having the plurality of power storage devices.

It is still another object of the present invention to provide a computer-readable recording medium with a program recorded thereon for causing a computer to execute a temperature rise control to raise temperature of a power storage device while protecting it, in a power supply system having the plurality of power storage devices.

It is still another object of the present invention to provide a power supply system capable of raising temperature of a power storage device as first as possible while protecting it and having the plurality of power storage devices and a vehicle provided with it.

In addition, it is still another object of the present invention to provide a temperature rise control method for raising temperature of a power storage device as first as possible while protecting it, in a power supply system having the plurality of power storage devices.

It is still another object of the present invention to provide a computer-readable recording medium with a program recorded thereon for causing a computer to execute a temperature rise control to raise temperature of a power storage device as first as possible while protecting it, in a power supply system having the plurality of power storage devices.

According to the present invention, a power supply system is capable of supplying an electric power to a load device, and includes first and second power storage devices, an electric power line, first and second converters, and a control device. The first and second power storage devices are capable of charging and discharging. The electric power line is configured to allow an electric power to be exchanged between the power supply system and the load device. The first converter is provided between the first power storage device and the electric power line to convert a voltage between the first power storage device and the electric power line. The second converter is provided between the second power storage device and the electric power line to convert a voltage between the second power storage device and the electric power line. The control device controls the first and second converters. Thus, the control device controls the converter corresponding to the power storage device on a charge side so as to prevent a voltage of the charge-side power storage device from exceeding an upper limit value during temperature rise control to raise the temperature of at least one of the first and second power storage devices by exchanging the electric power between the first and second power storage devices through the first and second converters and the electric power line. The control device further controls the converter corresponding to the power storage device on a discharge side so as to prevent a voltage of the discharge-side power storage device from falling below a lower limit value.

Preferably, the control device includes first and second control units to control the first and second converters, respectively. Each of the first and second control units includes a voltage control unit and a first correction unit. The voltage control unit controls the corresponding converter so as to control a voltage of the electric power line to be a target voltage during the temperature rise control. The first correction unit corrects an output of the voltage control unit so as to increase the voltage of the electric power line when the voltage of the corresponding power storage device exceeds the upper limit value, and corrects the output of the voltage control unit so as to lower the voltage of the electric power line when the voltage of the corresponding power storage device falls below the lower limit value.

Further preferably, each of the first and second control units further includes a second correction unit. The second correction unit corrects the target voltage so as to increase it when the voltage of the corresponding power storage device exceeds the upper limit value, and corrects the target voltage so as to lower it when the voltage of the corresponding power storage device falls below the lower limit value.

In addition, preferably, the control device includes first and second control units to control the first and second converters, respectively. Each of the first and second control units includes a current control unit and a first correction unit. The current control unit controls the corresponding converter so as to control charge and discharge currents of the corresponding power storage device to be a target current during the temperature rise control. The first correction unit corrects an output of the current control unit so as to increase the voltage of the electric power line when the voltage of the corresponding power storage device exceeds the upper limit value, and corrects the output of the current control unit so as to lower the voltage of the electric power line when the voltage of the corresponding power storage device falls below the lower limit value.

Further preferably, each of the first and second control units further includes a second correction unit. The second correction unit corrects the target current so as to decrease the charge current to the corresponding power storage device when the voltage of the corresponding power storage device exceeds the upper limit value, and corrects the target current so as to decrease the discharge current from the corresponding power storage device when the voltage of the corresponding power storage device falls below the lower limit value.

In addition, preferably, the control device includes first and second control units to control the first and second converters, respectively. The first control unit includes a current control unit and a first correction unit. The second control unit includes a voltage control unit and a second correction unit. The current control unit controls the first converter such that charge and discharge currents of the first power storage device become target currents during the temperature rise control. The first correction unit corrects an output of the current control unit so as to increase a voltage of the electric power line when the voltage of the first power storage device exceeds the upper limit value, and corrects the output of the current control unit so as to lower the voltage of the electric power line when the voltage of the first power storage device falls below the lower limit value. The voltage control unit controls the second converter such that the voltage of the electric power line becomes a target voltage at the temperature rise control time. The second correction unit corrects an output of the voltage control unit so as to increase the voltage of the electric power line when the voltage of the second power storage device exceeds the upper limit value, and corrects the output of the voltage control unit so as to lower the voltage of the electric power line when the voltage of the second power storage device falls below the lower limit value.

Further preferably, the first control unit further includes a third correction unit, and the second control unit further includes a fourth correction unit. The third correction unit corrects the target current so as to decrease a charge current to the first power storage device when the voltage of the first power storage device exceeds the upper limit value, and corrects the target current so as to decrease a discharge current from the first power storage device when the voltage of the first power storage device falls below the lower limit value. The fourth correction unit corrects the target voltage so as to increase it when the voltage of the second power storage device exceeds the upper limit value, and corrects the target voltage so as to lower it when the voltage of the second power storage device falls below the lower limit value.

Preferably, the upper and lower limit values are set based on at least one of a temperature and a state of charge of the corresponding power storage device.

Preferably, the control device controls the converter corresponding to the charge-side power storage device such that the voltage of the charge-side power storage device becomes the upper limit value during the temperature rise control.

Further preferably, the control device includes a target value setup unit and first and second control units. The target value set up unit sets a target voltage of the electric power line such that the voltage of the charge-side power storage device becomes the upper limit value during the temperature rise control. The first and second control units control the first and second converters, respectively, such that a voltage of the electric power line becomes the target voltage.

In addition, further preferably, the control device includes a target value setup unit and first and second control units. The target value setup unit sets a target charge electric power of the charge-side power storage device such that the voltage of the charge-side power storage device becomes the upper limit value during the temperature rise control. The first and second control units control the first and second converters, respectively, such that the target charge electric power flows from the discharge-side power storage device to the charge-side power storage device.

In addition, preferably, the control device controls the converter corresponding to the discharge-side power storage device such that the voltage of the discharge-side power storage device becomes the lower limit value during the temperature rise control.

Further preferably, the control device includes a target value setup unit and first and second control units. The target value setup unit sets a target voltage of the electric power line such that the voltage of the discharge-side power storage device becomes the lower limit value during the temperature rise control. The first and second control units control the first and second converters, respectively, such that a voltage of the electric power line becomes the target voltage.

In addition, further preferably, the control device includes a target value setup unit and first and second control units. The target value setup unit sets a target discharge electric power of the discharge-side power storage device such that the voltage of the discharge-side power storage device becomes the lower limit value during the temperature rise control. The first and second control units control the first and second converters, respectively, such that the target discharge electric power flows from the discharge-side power storage device to the charge-side power storage device.

In addition, according to the present invention, a power supply system is capable of supplying an electric power to a load device, and includes first and second power storage devices, an electric power line, a converter, and a control device. The first and second power storage devices are capable of charging and discharging. The electric power line is configured to allow an electric power to be exchanged between the power supply system and the load device. The converter is provided between the first power storage device and the electric power line to convert a voltage between the first power storage device and the electric power line. The second power storage device is connected to the electric power line. The control device controls the converter to prevent a voltage of the first power storage device from exceeding an upper limit value and falling below a lower limit value, during temperature rise control to raise the temperature of at least one of the first and second power storage devices by exchanging the electric power between the first and second power storage devices through the converter and the electric power line.

Preferably, the control device includes a voltage control unit and a first correction unit. The voltage control unit controls the converter to control a voltage of the electric power line to be a target voltage during the temperature rise control. The first correction unit corrects an output of the voltage control unit to increase the voltage of the electric power line when the voltage of the first power storage device exceeds the upper limit value, and corrects the output of the voltage control unit to lower the voltage of the electric power line when the voltage of the first power storage device falls below the lower limit value.

Further preferably, the control device further includes a second correction unit. The second correction unit corrects the target voltage to increase it when the voltage of the first power storage device exceeds the upper limit value, and corrects the target voltage to lower it when the voltage of the first power storage device falls below the lower limit value.

Further preferably, the control device includes a current control unit and a first correction unit. The current control unit controls the converter to control charge and discharge currents of the first power storage device to be a target current, during the temperature rise control. The first correction unit corrects an output of the current control unit to increase a voltage of the electric power line when the voltage of the first power storage device exceeds the upper limit value, and corrects the output of the current control unit to lower the voltage of the electric power line when the voltage of the first power storage device falls below the lower limit value.

Further preferably, the control device further includes a second correction unit. The second correction unit corrects the target current to decrease the charge current to the first power storage device when the voltage of the first power storage device exceeds the upper limit value, and corrects the target current to decrease the discharge current from the first power storage device when the voltage of the first power storage device falls below the lower limit value.

Preferably, the upper and lower limit values are set based on at least one of a temperature and a state of charge of the first power storage device.

Preferably, the control device controls the converter such that the voltage of the first power storage device becomes the upper limit value during the temperature rise control.

Further preferably, the control device includes a target value setup unit and a control unit. The target value setup unit sets a target voltage of the electric power line such that the voltage of the first power storage device becomes the upper limit value during the temperature rise control. The control unit controls the converter such that a voltage of the electric power line becomes the target voltage.

In addition, further preferably, the control device includes a target value setup unit and a control unit. The target value setup unit sets a target charge electric power of the first power storage device such that the voltage of the first power storage device becomes the upper limit value during the temperature rise control. The control unit controls the converter such that the target charge electric power flows from the second power storage device to the first power storage device.

In addition, preferably, the control device controls the converter such that a voltage of the first power storage device becomes the lower limit value during the temperature rise control.

Further preferably, the control device includes a target value setup unit and a control unit. The target value set up unit sets a target voltage of the electric power line such that the voltage of the first power storage device becomes the lower limit value during the temperature rise control. The control unit controls the converter such that a voltage of the electric power line becomes the target voltage.

In addition, further preferably, the control device includes a target value setup unit and a control unit. The target value set up unit sets a target discharge electric power of the first power storage device such that the voltage of the first power storage device becomes the lower limit value during the temperature rise control. The control unit controls the converter such that the target discharge electric power flows from the first power storage device to the second power storage device.

In addition, according to the present invention, a vehicle includes the above-described power supply system and a drive force generator unit. The drive force generator unit receives power supply from the power supply system and generates drive force of the vehicle.

In addition, according to the present invention, a temperature rise control method is a temperature rise control method of a power storage device in a power supply system capable of supplying an electric power to a load device. The power supply system includes first and second power storage devices, electric power line, and first and second converters. The first and second power storage devices are capable of charging and discharging. The electric power line is configured to allow an electric power to be exchanged between the power supply system and the load device. The first converter is provided between the first power storage device and the electric power line to convert a voltage between the first power storage device and the electric power line. The second converter is provided between the second power storage device and the electric power line to convert a voltage between the second power storage device and the electric power line. Thus, the temperature rise control method includes a first step and a second step. The first step controls the converter corresponding to the charge-side power storage device to prevent a voltage of the charge-side power storage device from exceeding an upper limit value, during temperature rise control to raise the temperature of at least one of the first and second power storage devices by exchanging the electric power between the first and second power storage devices through the first and second converters and the electric power line. The second step controls converter corresponding to the discharge-side power storage device to prevent a voltage of the discharge-side power storage device from falling below a lower limit value during the temperature rise control.

Preferably, the first step includes a first sub-step and a second sub-step. The second step includes a third sub-step and a fourth sub-step. The first sub-step determines whether the voltage of the charge-side power storage device is higher than the upper limit value or not. The second sub-step controls the converter corresponding to the charge-side power storage device such that the voltage of the charge-side power storage device becomes the upper limit value or less when it is determined that the voltage of the charge-side power storage device is higher than the upper limit value. The third sub-step determines whether the voltage of the discharge-side power storage device is lower than the lower limit value or not. The fourth sub-step controls the converter corresponding to the discharge-side power storage device such that the voltage of the discharge-side power storage device becomes the lower limit value or more when it is determined that the voltage of the discharge-side power storage device is lower than the lower limit value.

Further preferably, in the first step, the converter corresponding to the charge-side power storage device is controlled such that the voltage of the charge-side power storage device becomes the upper limit value.

In addition, further preferably, in the second step, the converter corresponding to the discharge-side power storage device is controlled such that the voltage of the discharge-side power storage device becomes the lower limit value.

In addition, according to the present invention, a temperature rise control method is a temperature rise control method of a power storage device in a power supply system capable of supplying an electric power to a load device. The power supply system includes first and second power storage devices, an electric power line, and a converter. The first and second power storage devices are capable of charging and discharging. The electric power line is configured to allow an electric power to be exchanged between the power supply system and the load device. The converter is provided between the first power storage device and the electric power line to convert a voltage between the first power storage device and the electric power line. The second power storage device is connected to the electric power line. Thus, the temperature rise control method includes a first step and a second step. The first step controls the converter to prevent a voltage of the first power storage device from exceeding the upper limit value. The second step controls the converter to prevent a voltage of the first power storage device from falling below a lower limit value during the temperature rise control.

Preferably, the first step includes a first sub-step and a second sub-step. The second step includes a third sub-step and a fourth sub-step. The first sub-step determines whether the voltage of the first power storage device is higher than the upper limit value or not. The second sub-step controls the converter such that the voltage of the first power storage device becomes the upper limit value or less when it is determined that the voltage of the first power storage device is higher than the upper limit value. The third sub-step determines whether the voltage of the first power storage device is lower than the lower limit value or not. The fourth sub-step controls the converter such that the voltage of the first power storage device becomes the lower limit value or more when it is determined that the voltage of the first power storage device is lower than the lower limit value.

Further preferably, in the first step, the converter is controlled such that the voltage of the first power storage device becomes the upper limit value.

In addition, further preferably, in the second step, the converter is controlled such that the voltage of the first power storage device becomes the lower limit value.

In addition, according to the present invention, a computer-readable recording medium records a program for causing a computer to execute the above-described temperature rise control method.

According to the present invention, the temperature of the power storage device is raised by exchanging the electric power between the first and second power storage devices through the electric power line. Here, since the control device controls the converter to prevent the voltage of the power storage device from exceeding the upper limit value and falling below the lower limit value, the voltage of the power storage device does not get out of the range of the upper and lower limit values.

Therefore, according to the present invention, the temperature of the power storage device can be raised while being protected in the power supply system having the plurality of power storage devices.

In addition, according to the present invention, since the control device controls the converter corresponding to the charge-side power storage device such that the voltage of the charge-side power storage device becomes the upper limit value during the temperature rise control, the charge electric power to the power storage device can be maximized. In addition, since the control device controls the converter corresponding to the discharge-side power storage device such that the voltage of the discharge-side power storage device becomes the lower limit value during the temperature rise control, the discharge electric power of the power storage device can be maximized. Therefore, according to the present invention, the temperature of the power storage device can be raised promptly while being protected in the power supply system having the plurality of power storage devices.

BRIEF DESCRIPTION OF THE DRAWINGS

FIG. 2 is a schematic view showing the constitutions of converters shown in FIG. 1.

FIG. 40 is a flowchart showing temperature rise control by a converter ECU according to the fifteenth embodiment.

FIG. 41 is a functional block diagram showing a target value setup unit according to a variation of the fifteenth embodiment.

BEST MODES FOR CARRYING OUT THE INVENTION

Figure 1:
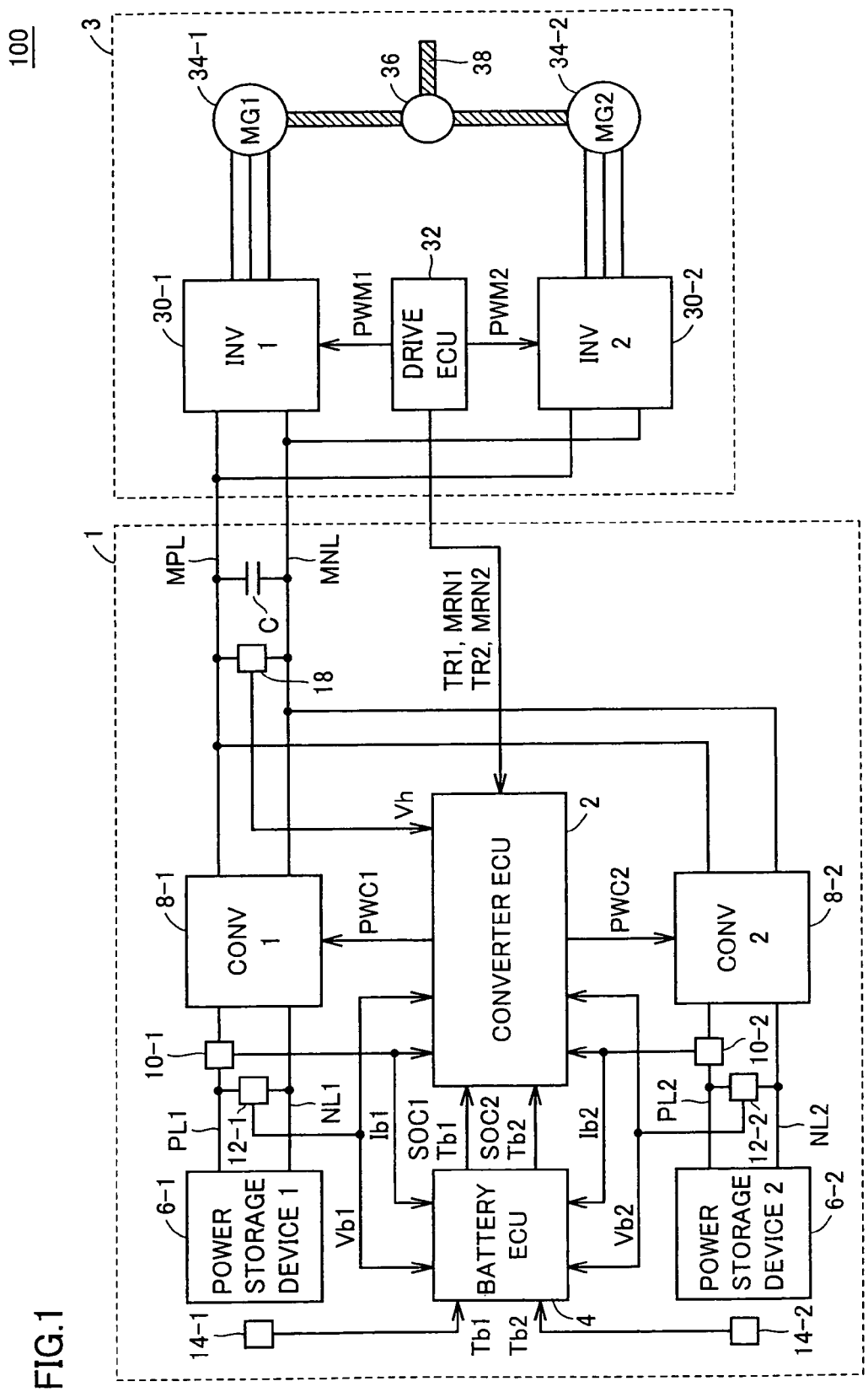
FIG. 1 is an entire block diagram showing a vehicle according to a first embodiment of the present invention.

Embodiments of the present invention will be described with reference to the drawings hereinafter. In addition, the same references are allotted to the same or corresponding parts in the drawings and their description will be not repeated.

First Embodiment

FIG. 1 is an entire block diagram showing a vehicle according to a first embodiment of the present invention. With reference to FIG. 1, a vehicle 100 is provided with a power supply system 1, and a drive force generator unit 3. The drive force generator unit 3 includes inverters 30-1 and 30-2, motor generators 34-1 and 34-2, a mechanical power transmission mechanism 36, a drive shaft 38, and a drive ECU (Electronic Control Unit) 32.

Inverters 30-1 and 30-2 are connected to a main positive bus MPL and a main negative bus MNL in parallel. Thus, inverters 30-1 and 30-2 convert a drive electric power (DC electric power) supplied from power supply system 1 to an AC electric power and output it to motor generators 34-1 and 34-2, respectively. In addition, inverters 30-1 and 30-2 convert an AC electric power generated from motor generators 34-1 and 34-2 to a DC power and output it to power supply system 1 as a regenerative electric power.

Each of inverters 30-1 and 30-2 is configured by a bridge circuit including switching elements for three phases, for example. Thus, inverters 30-1 and 30-2 drive the corresponding motor generators by performing switching operations in response to drive signals PWM1 and PWM2 from drive ECU 32, respectively.

Motor generators 34-1 and 34-2 generate rotation drive force by receiving the AC electric power supplied from inverters 30-1 and 30-2, respectively. In addition, motor generators 34-1 and 34-2 generate an AC electric power by receiving to an external rotation force. Each of motor generators 34-1 and 34-2 is configured by a three-phase AC rotation electric machine having a rotor in which a permanent magnet is embedded. Thus, motor generators 34-1 and 34-2 are connected to mechanical power transmission mechanism 36, and the rotation drive force is transmitted to a wheel (not shown) through drive shaft 38 further connected to mechanical power transmission mechanism 36.

When drive force generator unit 3 is used in a hybrid vehicle, motor generators 34-1 and 34-2 are also connected to an engine (not shown) through mechanical power transmission mechanism 36 or drive shaft 38. Thus, drive ECU 32 carries out control such that the drive force generated from the engine and the drive force generated from motor generators 34-1 and 34-2 may have an optimal ratio. In the case of the hybrid vehicle, one of motor generators 34-1 and 34-2 may function as an electric motor only, and the other may function as an electric generator only.

Drive ECU 32 calculates torque target values TR1 and TR2 and rotation speed target values MRN1 and MRN2, based on a signal transmitted from each sensor (not shown), a travel state, and an accelerator pedal position. Thus, drive ECU 32 generates drive signal PWM1 in such a way that generation torque and the rotation speed of motor generator 34-1 become torque target value TR1 and rotation speed target value MRN1, respectively to control inverter 30-1, and generates drive signal PWM2 in such a way that generation torque and the rotation speed of motor generator 34-2 become torque target value TR2 and rotation speed target value MRN2, respectively to control inverter 30-2. In addition, drive ECU 32 outputs calculated torque target values TR1 and TR2 and rotation speed target values MRN1 and MRN2 to a converter ECU 2 (will be described below) of power supply system 1.

Meanwhile, power supply system 1 includes power storage devices 6-1 and 6-2, converters 8-1 and 8-2, a smoothing capacitor C, converter ECU 2, a battery ECU 4, current sensors 10-1 and 10-2, voltage sensors 12-1, 12-2, and 18, and temperature sensors 14-1 and 14-2.

Power storage devices 6-1 and 6-2 are DC power supplies capable of charging and discharging and for example, formed of a secondary battery such as a nickel-hydrogen battery and a lithium-ion battery. Thus, power storage device 6-1 is connected to converter 8-1 through a positive polar line PL1 and a negative polar line NL1, and power storage device 6-2 is connected to converter 8-2 through a positive polar line PL2 and negative polar line NL2. At least one of power storage devices 6-1 and 6-2 may be formed of an electric double-layer capacitor.

Converter 8-1 is provided between power storage device 6-1, and main positive bus MPL and main negative bus MNL, and converts a voltage between power storage device 6-1, and main positive bus MPL and main negative bus MNL, based on drive signal PWC1 from converter ECU 2. Converter 8-2 is provided between power storage device 6-2, and main positive bus MPL and main negative bus MNL, and converts a voltage between power storage device 6-2, and main positive bus MPL and main negative bus MNL, based on drive signal PWC2 from converter ECU 2.

Smoothing capacitor C is connected between main positive bus MPL and main negative bus MNL, and decreases an electric power fluctuation component contained in main positive bus MPL and main negative bus MNL. Voltage sensor 18 detects a voltage value Vh between main positive bus MPL and main negative bus MNL and outputs the detected result to converter ECU 2.

Current sensors 10-1 and 10-2 detect a current value Ib1 inputted and outputted to and from power storage device 6-1 and a current value Ib2 inputted and outputted to and from power storage device 6-2, respectively and output the detected results to converter ECU 2 and battery ECU 4. Each of current sensors 10-1 and 10-2 detects the current outputted from the corresponding power storage device (discharge current) as a positive value and detects the current inputted to the corresponding power storage device (charge current) as a negative value. Although current sensors 10-1 and 10-2 detect the current values of positive polar lines PL1 and PL2, respectively in FIG. 1, current sensors 10-1 and 10-2 may detect currents of negative polar lines NL1 and NL2, respectively.

Voltage sensors 12-1 and 12-2 detect a voltage value Vb1 of power storage device 6-1 and a voltage value Vb2 of power storage device 6-2, respectively and output the detected results to converter ECU 2 and battery ECU 4. Temperature sensors 14-1 and 14-2 detect a temperature Tb1 in power storage device 6-1 and a temperature Tb2 in power storage device 6-2, respectively and output the detected results to battery ECU 4.

Battery ECU 4 calculates a state quantity SOC1 showing a state of charge (SOC) of power storage device 6-1, based on current value Ib1 from current sensor 10-1, voltage value Vb1 from voltage sensor 12-1 and temperature Tb1 from temperature sensor 14-1, and outputs calculated state quantity SOC1 and temperature Tb1 to converter ECU 2.

In addition, battery ECU 4 calculates a state quantity SOC2 showing a SOC of power storage device 6-2, based on current value Ib2 from current sensor 10-2, voltage value Vb2 from voltage sensor 12-2 and temperature Tb2 from temperature sensor 14-2, and outputs calculated state quantity SOC2 and temperature Tb2 to converter ECU 2. State quantities SOC1 and SOC2 may be calculated by various kinds of well-known methods.

Converter ECU 2 calculates drive signals PWC1 and PWC2 for driving converters 8-1 and 8-2, respectively, based on the detected values from current sensors 10-1 and 10-2 and voltage sensors 12-1, 12-2, and 18, temperatures Tb1 and Tb2 and state quantities SOC1 and SOC2 from battery ECU 4, and torque target values TR1 and TR2 and rotation speed target values MRN1 and MRN2 from drive ECU 32. Thus, converter ECU 2 outputs generated drive signals PWC1 and PWC2 to converters 8-1 and 8-2 to control converters 8-1 and 8-2, respectively. The constitution of converter ECU 2 will be described in detail later.

FIG. 2 is a schematic view showing the constitutions of converters 8-1 and 8-2 shown in FIG. 1. Since the constitution and operation of converter 8-2 is the same as those of converter 8-1, the constitution and the operation of converter 8-1 will be described below. With reference to FIG. 2, converter 8-1 includes a chopper circuit 40-1, a positive bus LN1A, a negative bus LN1C, a wiring LN1B, and a smoothing capacitor C1. Chopper circuit 40-1 contains transistors Q1A and Q1B, diodes D1A and D1B, and an inductor L1.

One end of positive bus LN1A is connected to a collector of transistor Q1B, and the other end thereof is connected to main positive bus MPL. In addition, one end of negative bus LN1C is connected to negative polar line NL1, and the other end thereof is connected to main negative bus MNL.

Transistors Q1A and Q1B are connected between negative bus LN1C and positive bus LN1A in series. More specifically, an emitter of transistor Q1A is connected to negative bus LN1C, and the collector of transistor Q1B is connected to positive bus LN1A. Diodes D1A and D1B are connected to transistors Q1A and Q1B in antiparallel, respectively. Inductor L1 is connected to a connection point between transistor Q1A and transistor Q1B.

One end of wiring LN1B is connected to positive polar line PL1, and the other end thereof is connected to inductor L1. Smoothing capacitor C1 is connected between wiring LN1B and negative bus LN1C, and decreases an AC component contained in a DC voltage between wiring LN1B and negative bus LN1C.

Chopper circuit 40-1 boosts the DC electric power (drive electric power) from positive polar line PL1 and negative polar line NL1 at the time of discharging of power storage device 6-1 and steps down the DC electric power (regenerative electric power) from main positive bus MPL and main negative bus NML at the time of charging of power storage device 6-1, based on drive signal PWC1 from converter ECU 2 (not shown).

The voltage conversion operation (boosting operation and step-down operation) of converter 8-1 will be described hereinafter. At the time of the boosting operation, converter ECU 2 keeps transistor Q1B in an off state, and turns on/off transistor Q1A based on a predetermined duty ratio. While transistor Q1A is on, a discharge current flows from power storage device 6-1 to main positive bus MPL through wiring LN1B, inductor L1, diode D1B, and positive bus LN1A in this order. At the same time, a pump current flows from power storage device 6-1 through wiring LN1B, inductor L1, transistor Q1A, and negative bus LN1C in this order. Inductor L1 accumulates electromagnetic energy by this pump current. Thus, when transistor Q1A transits from an on state to an off state, inductor L1 superimposes the accumulated electromagnetic energy on the discharge current. As a result, an average voltage of the DC electric power to be supplied from converter 8-1 to main positive bus MPL and main negative bus MNL is boosted by a voltage corresponding to the electromagnetic energy accumulated in inductor L1 based on the duty ratio.

Meanwhile, at the time of step-down operation, converter ECU 2 turns on/off transistor Q1B based on the predetermined duty ratio, and keeps transistor Q1A in the off state. While transistor Q1B is on, the charge current flows from main positive bus MPL to power storage device 6-1 through positive bus LN1A, transistor Q1B, inductor L1, and wiring LN1B in this order. Thus, when transistor Q1B transits from the on state to the off state, since inductor L1 generates a magnetic flux so as to prevent a current change, the charge current continues to flow through diode D1A, inductor L1, and wiring LN1B in this order. Meanwhile, in view of electric energy, since the DC electric power is supplied from main positive bus MPL and main negative bus MNL only while transistor Q1B is on, when it is assumed that the charge current is kept constant (when it is assumed that the inductance of inductor L1 is sufficiently high), the average voltage of the DC electric power supplied from converter 8-1 to power storage device 6-1 is equal to a value provided by multiplying the DC voltage between main positive bus MPL and main negative bus MNL by the duty ratio.

In order to control such voltage conversion operation of converter 8-1, converter ECU 2 generates drive signal PWC1 including a drive signal PWC1A to control the on/off of transistor Q1A, and a drive signal PWC1B to control the on/off of transistor Q1B.

Figure 3:
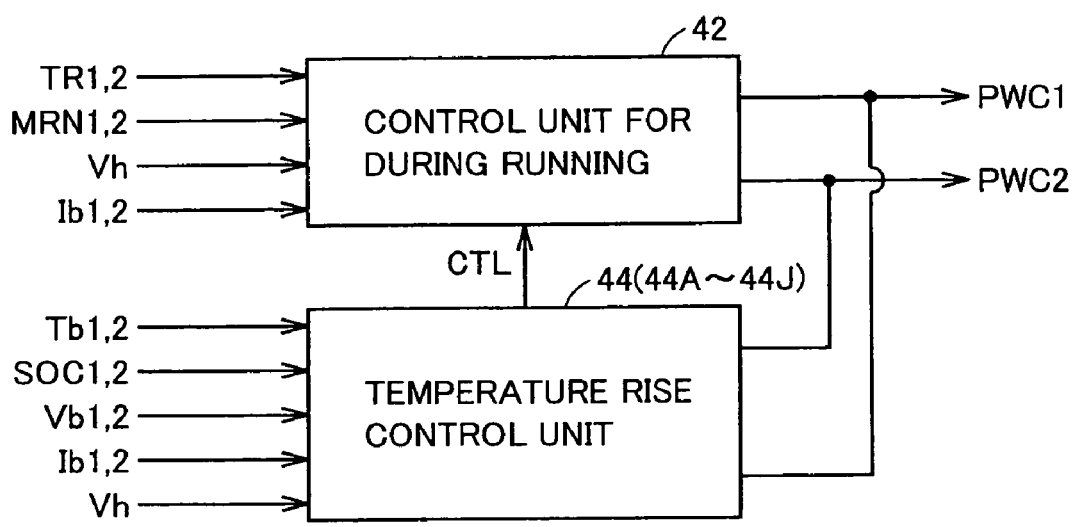
FIG. 3 is a functional block diagram showing a converter ECU shown in FIG. 1.

FIG. 3 is a functional block diagram of converter ECU 2 shown in FIG. 1. With reference to FIG. 3, converter ECU 2 includes a control unit 42 for during running and a temperature rise control unit 44.

Control unit 42 for during running receives torque target values TR1 and TR2 and rotation speed target values MRN1 and MRN2 of motor generators 34-1 and 34-2 from drive ECU 32. In addition, control unit 42 for during running receives voltage value Vh from voltage sensor 18, and receives current values Ib1 and Ib2 from current sensors 10-1 and 10-2, respectively.

Thus, when a control signal CTL from temperature rise control unit 44 is inactivated, that is, when a temperature rise control is not executed by temperature rise control unit 44, control unit 42 for during running generates drive signals PWC1 and PWC2 to drive converter 8-1 and 8-2, respectively, based on the above signals. Thus, control unit 42 for during running outputs generated drive signals PWC1 and PWC2 to converters 8-1 and 8-2, respectively. Meanwhile, when control signal CTL is activated, that is, when temperature rise control unit 44 executes the temperature rise control, control unit 42 for during running stops generating drive signals PWC1 and PWC2.

Temperature rise control unit 44 receives temperatures Tb1 and Tb2 and state quantities SOC1 and SOC2 from battery ECU 4. In addition, temperature rise control unit 44 receives voltage values Vb1 and Vb2 from voltage sensors 12-1 and 12-2, respectively, receives current values Ib1 and Ib2 from current sensors 10-1 and 10-2, respectively, and receives voltage value Vh from voltage sensor 18. Thus, when any one of temperatures Tb1 and Tb2 showing the temperatures of power storage devices 6-1 and 6-2 is lower than a specified value, temperature rise control unit 44 executes the temperature rise control so as to raise temperature of power storage devices 6-1 and 6-2 by exchanging the electric power between power storage devices 6-1 and 6-2 through converters 8-1 and 8-2, and main positive bus MPL and main negative bus MNL.

More specifically, when any one of temperatures Tb1 and Tb2 is lower than the specific value, temperature rise control unit 44 generates drive signals PWC1 and PWC2 by a method which will be described later, based on the above signals. Thus, temperature rise control unit 44 outputs generated drive signals PWC1 and PWC2 to converters 8-1 and 8-2, and activates control signal CTL to be outputted to control unit 42 for during running.

Figure 4:
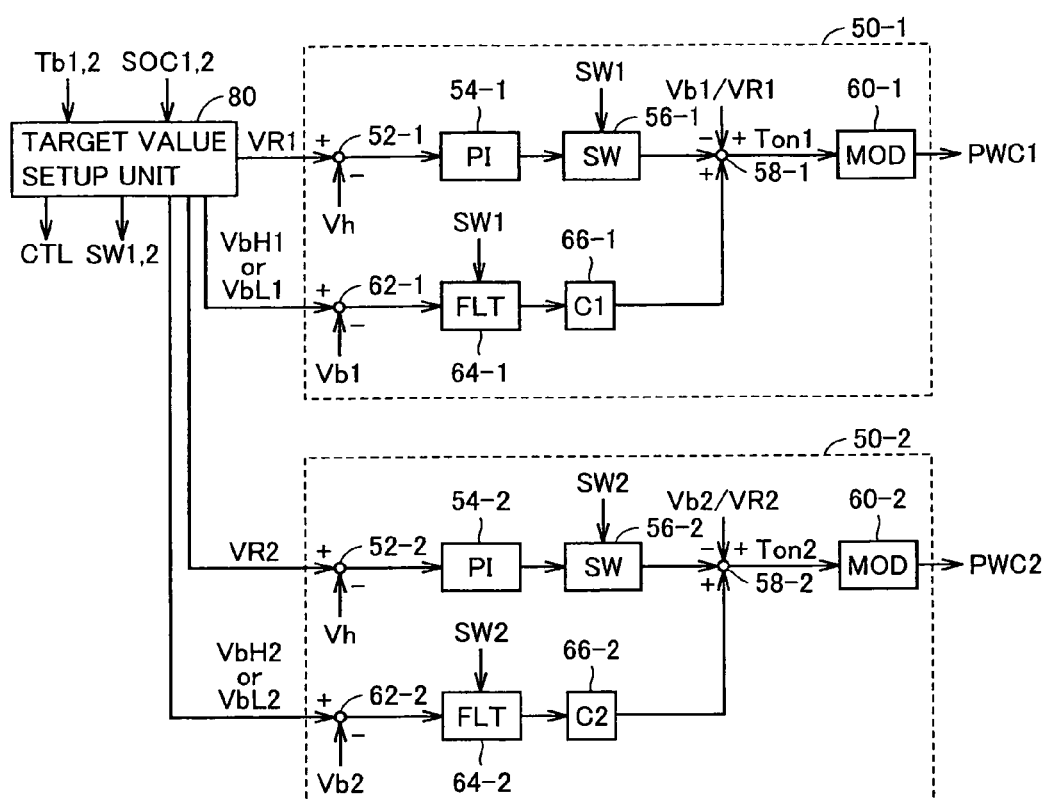
FIG. 4 is a detailed functional block diagram showing a temperature rise control unit shown in FIG. 3.

FIG. 4 is a functional block diagram showing temperature rise control unit 44 shown in FIG. 3 in detail. With reference to FIG. 4, temperature rise control unit 44 includes a first control unit 50-1, a second control unit 50-2, and a target value setup unit 80.

First control unit 50-1 includes a subtraction unit 52-1, a PI control unit 54-1, a switching unit 56-1, a calculation unit 58-1, and a modulation unit 60-1. Subtraction unit 52-1 subtracts voltage value Vh from a target voltage VR1 outputted from target value setup unit 80, and outputs the calculated result to PI control unit 54-1. PI control unit 54-1 performs a proportional integral calculation using a deviation of target voltage VR1 and voltage value Vh as its input, and outputs the calculated result to switching unit 56-1.

Switching unit 56-1 outputs the calculated result of PI control unit 54-1 to calculation unit 58-1 when a switching signal SW1 from target value setup unit 80 is activated. Meanwhile, switching unit 56-1 outputs a value 0 to calculation unit 58-1 instead of the calculated result of PI control unit 54-1 when switching signal SW1 is inactivated. More specifically, switching unit 56-1 turns on the function of voltage FB control by PI control unit 54-1 when switching signal SW1 is activated, and switching unit 56-1 turns off the function of the voltage FB control by PI control unit 54-1 when switching signal SW1 is inactivated.

Calculation unit 58-1 subtracts the output of switching unit 56-1 from an inverse number of a theoretical boost ratio of converter 8-1 designated by (voltage value Vb1)/(target voltage VR1), and adds a correction amount outputted from a correction value calculation unit 66-1 (that will be described later) to the calculated result, and outputs the result to modulation unit 60-1 as a duty command Ton1. An input term ((voltage value Vb1)/(target voltage VR1)) in subtraction unit 58-1 is a voltage feed forward (referred to as "voltage FF" occasionally hereinafter) compensation term based on the theoretical boost ratio of converter 8-1.

Modulation unit 60-1 generates drive signal PWC1 based on duty command Ton1 and a carrier wave generated from an oscillation unit (not shown), and outputs generated drive signal PWC1 to transistors Q1A and Q1B of converter 8-1.

Duty command Ton1 inputted to modulation unit 60-1 corresponds to an on duty ratio of transistor Q1B constituting an upper arm of converter 8-1, and ranges from 0 to 1. Thus, converter 8-1 is controlled in such a way that a boost rate becomes low as duty command Ton1 is increased, and the boost rate becomes high as duty command Ton1 is decreased.

First control unit 50-1 further includes a subtraction unit 62-1, a filter 64-1, and correction value calculation unit 66-1. Subtraction unit 62-1 subtracts voltage value Vb1 from an upper limit voltage value VbH1 or a lower limit voltage value VbL1 outputted from target value setup unit 80, and outputs the calculated result to filter 64-1.

When switching signal SW1 is activated, filter 64-1 passes a positive value only and outputs a value 0 in a case of a negative value input. Meanwhile, when switching signal SW1 is inactivated, filter 64-1 passes a negative value only, and outputs a value 0 in a case of a positive value input. Correction value calculation unit 66-1 multiplies the output from filter 64-1 by a gain (positive value) and outputs the calculated result to calculation unit 58-1.

Second control unit 50-2 includes a subtraction unit 52-2, PI control unit 54-2, a switching unit 56-2, a calculation unit 58-2, and a modulation unit 60-2. In addition, second control unit 50-2 further includes a subtraction unit 62-2, a filter 64-2, and a correction value calculation unit 66-2. Since the constitution and operation of second control unit 50-2 is the same as those of first control unit 50-1, its description will not be repeated.

Target value setup unit 80 determines whether the temperature rise control of power storage devices 6-1 and 6-2 is executed or not based on temperatures Tb1 and Tb2, and activates control signal CTL to be outputted to control unit 42 for during running shown in FIG. 3 when the temperature rise control is executed. Thus, when the temperature rise control is executed, target value setup unit 80 generates target voltages VR1 and VR2 and switching signal SW1 and SW2 of converters 8-1 and 8-2, respectively and outputs target voltage VR1, switching signal SW, and predetermined upper limit voltage value VbH1 or lower limit voltage value VbL1 of power storage device 6-1, to first control unit 50-1 and outputs target voltage VR2, switching signal SW2, and predetermined upper limit voltage value VbH2 or lower limit voltage value VbL2 of power storage device 6-2, to second control unit 50-2.

Figure 5:
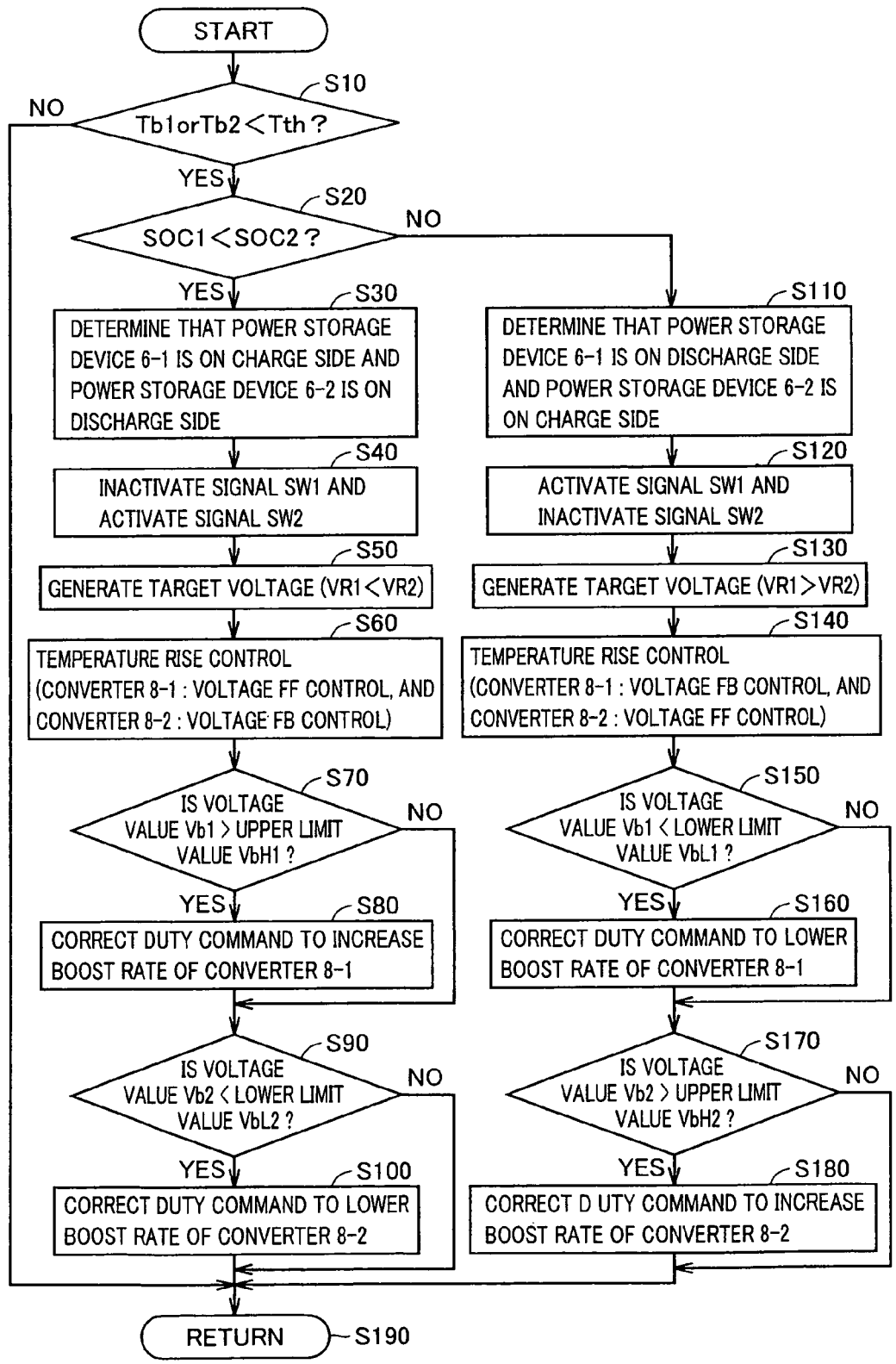
FIG. 5 is a flowchart showing temperature rise control by a converter ECU 2 shown in FIG. 1.

FIG. 5 is a flowchart showing the temperature rise control by converter ECU 2 shown in FIG. 1. The processes shown in this flowchart are called from a main routine at regular time intervals or when a certain condition is established (at the time of the start-up of the system, for example), and then executed.

With reference to FIG. 5, converter ECU 2 determines whether temperature Tb1 or temperature Tb2 is lower than a predetermined threshold temperature Tth (−10° C., for example) (step S1). When converter ECU 2 determines that both temperatures Tb1 and Tb2 are not less than threshold temperature Tth (NO in step S10), it moves the process to step S190 and inactivates control signal CTL.

When it is determined that temperature Tb1 or Tb2 is lower than threshold temperature Tth in step S10 (YES in step S10), converter ECU 2 activates control signal CTL. Thus, converter ECU 2 determines whether state quantity SOC1 is less than state quantity SOC2 or not (step S20).

When converter ECU 2 determines that state quantity SOC1 is less than state quantity SOC2 (YES in step S20), it determines that power storage devices 6-1 and 6-2 are on the charge side and the discharge side, respectively (step S30). Then, converter ECU 2 inactivates switching signal SW1 and activates switching signal SW2 (step S40).

Thus, converter ECU 2 turns off the voltage FB control function of converter 8-1 corresponding to charge-side power storage device 6-1 and turns on the voltage FB control function of converter 8-2 corresponding to discharge-side power storage device 6-2. That is, the control of converter 8-1 is a voltage FF control system based on the theoretical boost ratio, and the control of converter 8-2 is a voltage FB control system based on voltage value Vh.

Next, converter ECU 2 generates target voltages VR1 and VR2 (step S50). Here, converter ECU 2 sets target voltage VR2 higher than target voltage VR1 so that the electric power flows from power storage device 6-2 on the discharge side to power storage device 6-1 on the charge side.

When target voltages VR1 and VR2 are generated, converter ECU 2 controls converter 8-1 by the voltage FF control based on target voltage VR1, and controls converter 8-2 by the voltage FB control based on target voltage VR2. Thus, the electric power flows from power storage device 6-2 to power storage device 6-1 through converter 8-2, main positive bus MPL and main negative bus MNL, and converter 8-1 in this order, whereby the temperature rise control of power storage devices 6-1 and 6-2 is executed (step S60).

While the temperature rise control is executed, converter ECU 2 determines whether voltage value Vb1 is higher than upper limit voltage value VbH1 or not (step S70). When converter ECU 2 determines that voltage value Vb1 is higher than upper limit voltage value VbH1 (YES in step S70), it corrects duty command Ton1 to increase the boost rate of converter 8-1 (step S80). In other words, duty command Ton1 is corrected to be decreased.

Steps S70 and S80 are executed by subtraction unit 62-1, filter 64-1, and correction value calculation unit 66-1 of first control unit 50-1. Consequently, when voltage value Vb1 exceeds upper limit voltage value VbH1, the output of subtraction unit 62-1 becomes a negative value. Here, since switching signal SW1 is inactivated, filter 64-1 passes the output from subtraction 62-1. Therefore, a negative correction value is outputted from correction value calculation unit 66-1, and duty command Ton1 is corrected to be decreased.

Thus, an operation point of converter 8-1 is changed in such a way that the boost rate of converter 8-1 is increased, and converter 8-1 applies a current from power storage device 6-1 to main positive bus MPL and main negative bus MNL. As a result, voltage value Vb1 of power storage device 6-1 is decreased.

When it is determined that voltage value Vb1 is not more than upper limit voltage value VbH1 in step S70 (NO in step S70), converter ECU 2 does not execute step S80 and moves the process to step S90.

In addition, while the temperature rise control is executed, converter ECU 2 determines whether voltage value Vb2 is lower than lower limit voltage value VbL2 or not (step S90). When converter ECU 2 determines that voltage value Vb2 is lower than lower limit voltage value VbL2 (YES in step S90), it corrects a duty command Ton2 so as to lower the boost rate of converter 8-2 (step S100). In other words, duty command Ton2 is corrected so as to be increased.

Steps S90 and S100 are executed by subtraction unit 62-2, filter 64-2, and correction value calculation unit 66-2 of second control unit 50-2. Consequently, when voltage value Vb2 falls below lower limit voltage value VbL2, the output of subtraction unit 62-2 becomes a positive value. Here, since switching signal SW2 is activated, filter 64-2 passes the output from subtraction 62-2. Therefore, a positive correction value is outputted from correction value calculation unit 66-2, and duty command Ton2 is corrected so as to be increased.

Thus, an operation point of converter 8-2 is changed in such a way that the boost rate of converter 8-2 is lowered, and converter 8-2 applies a current from main positive bus MPL and main negative bus MNL to power storage device 6-2. As a result, voltage value Vb2 of power storage device 6-2 is increased.

When it is determined that voltage value Vb2 is not less than lower limit voltage value VbL2 in step S90 (NO in step S90), converter ECU 2 does not execute step S100 and moves the process to step S190.

Meanwhile, it is determined that state quantity SOC1 is not less than state quantity SOC2 in step S20 (NO in step S20), converter ECU 2 determines that power storage devices 6-1 and 6-2 on the discharge side and the charge side, respectively (step S110). Then, converter ECU 2 activates switching signal SW1 and inactivates switching signal SW2 (step S120).

Thus, converter ECU 2 turns on the voltage FB control function of converter 8-1 corresponding to discharge-side power storage device 6-1, and turns off the voltage FB control function of converter 8-2 corresponding to charge-side power storage device 6-2. That is, the control of converter 8-1 is the voltage FB control system based on voltage value Vh, and the control of converter 8-2 is the voltage FF control system based on the theoretical boost ratio.

Next, converter ECU 2 generates target voltages VR1 and VR2 (step S130). Here, converter ECU 2 sets target voltage VR1 higher than target voltage VR2 so that the electric power will flow from discharge-side power storage device 6-1 to charge-side power storage device 6-2.

When target values VR1 and VR2 are generated, converter ECU 2 controls converter 8-1 by the voltage FB control based on target voltage VR1, and controls converter 8-2 by the voltage FF control based on target voltage VR2. Thus, an electric power flows from power storage device 6-1 to power storage device 6-2 through converter 8-1, main positive bus MPL and main negative bus MNL, and converter 8-2 in this order, whereby the temperature rise control of power storage devices 6-1 and 6-2 is executed (step S140).

While the temperature rise control is executed, converter ECU 2 determines whether voltage value Vb1 is lower than lower limit voltage value VbL1 or not (step S150). When converter ECU 2 determines that voltage value Vb1 is lower than lower limit voltage value VbL1 (YES in step S150), it corrects duty command Ton1 so as to lower the boost rate of converter 8-1 (step S160). In other words, duty command Ton1 is corrected to be increased.

Steps S150 and S160 are executed by subtraction unit 62-1, filter 64-1, and correction value calculation unit 66-1 of first control unit 50-1. Consequently, when voltage value Vb1 falls below lower limit voltage value VbL1, the output of subtraction unit 62-1 becomes a positive value. Here, since switching signal SW1 is activated, filter 64-1 passes the output from subtraction unit 62-1. Therefore, a positive correction value is outputted from correction value calculation unit 66-1, and duty command Ton1 is corrected so as to be increased.

Thus, the operation point of converter 8-1 is changed in such a way that the boost rate of converter 8-1 is lowered, and converter 8-1 applies a current from main positive bus MPL and main negative bus MNL to power storage device 6-1. As a result, voltage value Vb1 of power storage device 6-1 is increased.

When it is determined that voltage value Vb1 is not less than lower limit voltage value VbL1 in step S150 (NO in step S150), converter ECU 2 does not execute step S160 and moves the process to step S170.

In addition, while the temperature rise control is executed, converter ECU 2 determines whether voltage value Vb2 is higher than upper limit voltage value VbH2 or not (step S170). When converter ECU 2 determines that voltage value Vb2 is higher than upper limit voltage value VbH2 (YES in step S170), it corrects duty command Ton2 so as to increase the boost rate of converter 8-2 (step S180). In other words, duty command Ton2 is corrected to be decreased.

Steps S170 and S180 are executed by subtraction unit 62-2, filter 64-2, and correction value calculation unit 66-2 of second control unit 50-2. Consequently, when voltage value Vb2 exceeds upper limit voltage value VbH2, the output of subtraction unit 62-2 becomes a negative value. Here, since switching signal SW2 is inactivated, filter 64-2 passes the output from subtraction unit 62-2. Therefore, a negative correction value is outputted from correction value calculation unit 66-2, and duty command Ton2 is corrected to be decreased.

Thus, the operation point of converter 8-2 is changed in such a way that the boost rate of converter 8-2 is increased, and converter 8-2 applies a current from power storage device 6-2 to main positive bus MPL and main negative bus MNL. As a result, voltage value Vb2 of power storage device 6-2 is decreased.

When it is determined that voltage value Vb2 is not more than upper limit voltage value VbH2 in step S170 (NO in step S170), converter ECU 2 does not execute step S180 and moves the process to step S190.

The voltage FF compensation term in the control unit on the charge side may be 1 in the above. Thus, the upper arm of the converter corresponding to the charge-side power storage device is always in the on state, so that the switching loss in the converter can be decreased.

As described above, according to the first embodiment, the temperatures of power storage devices 6-1 and 6-2 are raised by exchanging the electric power between power storage devices 6-1 and 6-2 through converters 8-1 and 8-2, and main positive bus MPL and main negative bus MNL. Here, since converter ECU 2 controls converter 8-1 such that voltage value Vb1 of power storage device 6-1 may not exceed upper limit voltage value VbH1 and may not fall below lower limit voltage value VbL1, and controls converter 8-2 such that voltage value Vb2 of power storage device 6-2 may not exceed upper limit voltage value VbH2 and may not fall below lower limit voltage value VbL2 during the temperature rise control, the voltages of power storage devices 6-1 and 6-2 can be within a range of the upper and lower limits. Therefore, according to the first embodiment, the temperatures of power storage devices 6-1 and 6-2 can be raised while being protected.

Variation

Figure 6:
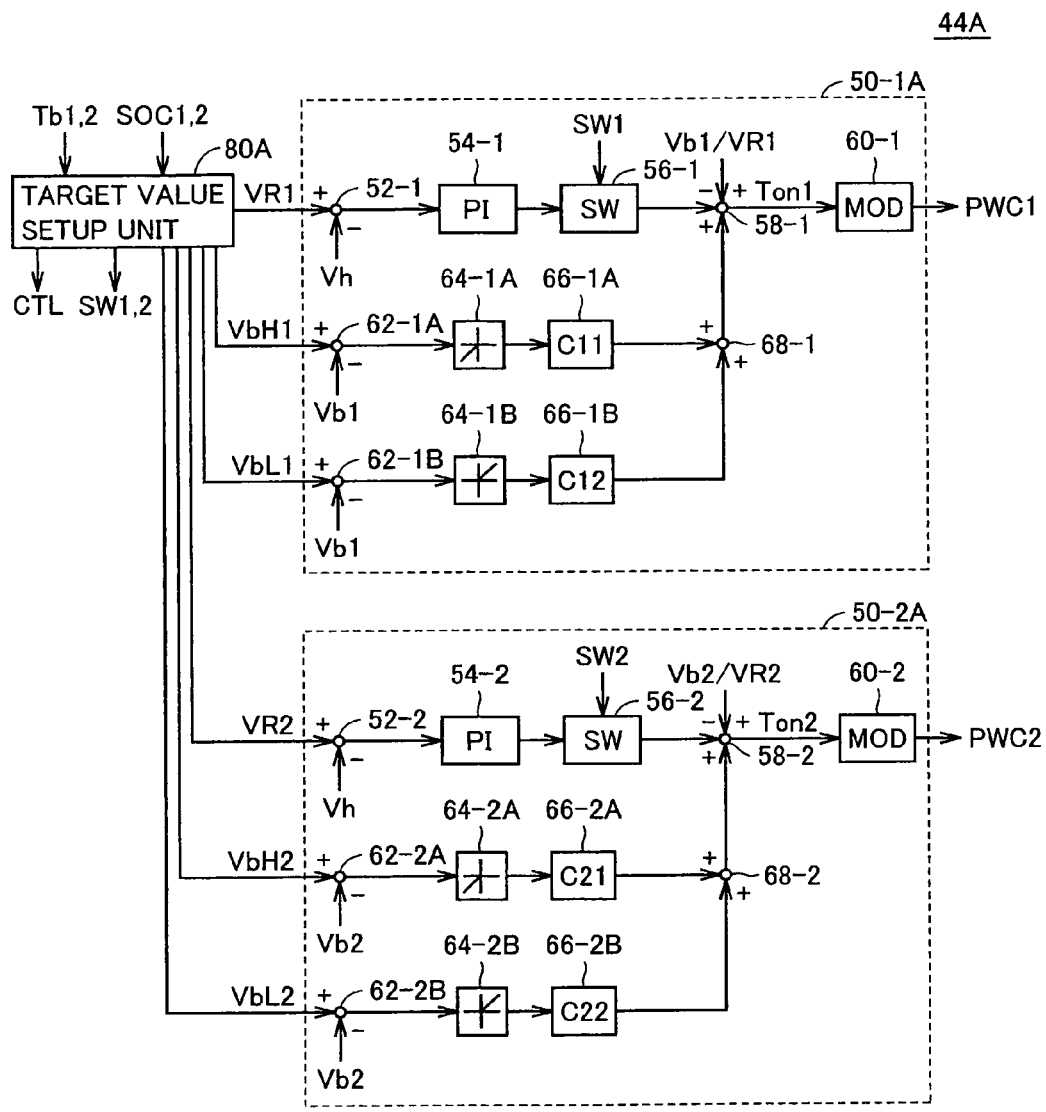
FIG. 6 is a functional block diagram showing a temperature rise control unit according to a variation of the first embodiment shown in FIG. 1.

FIG. 6 is a functional block diagram showing a temperature rise control unit according to a variation of the first embodiment. With reference to FIG. 6, a temperature rise control unit 44A includes a first control unit 50-1A, a second control unit 50-2A, and a target value setup unit 80A.

As compared with the constitution of first control unit 50-1 shown in FIG. 4, first control unit 50-1A includes subtraction units 62-1A and 62-1B, filters 64-1A and 64-1B, and correction value calculation units 66-1A and 66-1B instead of subtraction unit 62-1, filter 64-1, and correction value calculation unit 66-1, and further includes an addition unit 68-1.

Subtraction unit 62-1A subtracts voltage value Vb1 from upper limit voltage value VbH1 outputted from target value setup unit 80A, and outputs the calculated result to filter 64-1A. Filter 64-1A passes a negative value only, and outputs a value of 0 in a case of a positive value input. Correction value calculation unit 66-1A multiplies the output from filter 64-1A by a gain (positive value) and outputs the calculated result to addition unit 68-1.

Subtraction unit 62-1B subtracts voltage value Vb1 from lower limit voltage value VbL1 outputted from target value setup unit 80A, and outputs the calculated result to filter 64-1B. Filter 64-1B passes a positive value only, and outputs a value of 0 in a case of a negative value input. Correction value calculation unit 66-1B multiplies the output from filter 64-1B by a gain (positive value) and outputs the calculated result to addition unit 68-1.

Addition unit 68-1 adds up the outputs from correction value calculation unit 66-1A and correction value calculation unit 66-1B, and outputs the calculated result to calculation unit 58-1.

As compared with the constitution of second control unit 50-2 shown in FIG. 4, second control unit 50-2A includes subtraction units 62-2A and 62-2B, filters 64-2A and 64-2B, and correction value calculation units 66-2A and 66-2B instead of subtraction unit 62-2, filter 64-2, and correction value calculation unit 66-2, and further includes an addition unit 68-2. Since the constitution and operation of second control unit 50-2A are the same as those of first control unit 50-1A, their description will not be repeated.

Target value setup unit 80A outputs upper limit voltage value VbH1 and lower limit voltage value VbL1 of power storage device 6-1 to first control unit 50-1A, and outputs upper limit voltage value VbH2 and lower limit voltage value VbL2 of power storage device 6-2 to first control unit 50-2A, regardless of whether power storage devices 6-1 and 6-2 are on the charge side or discharge side. Other functions of target value setup unit 80A are the same as those of target value setup unit 80 shown in FIG. 4.

According to temperature rise control unit 44A, first control unit 50-1A is provided with correction value calculation unit 66-1A outputting a correction value when voltage value Vb1 exceeds upper limit voltage value VbH1, and correction value calculation unit 66-1B outputting a correction value when voltage value Vb1 falls below lower limit voltage value VbL1 (the same is applied to second control unit 50-2A). Therefore, although it is necessary to switch a correction function based on whether power storage devices 6-1 and 6-2 are on the charge side or discharge side in temperature rise control unit 44 in the first embodiment, the switching of the correction function is not required in temperature rise control unit 44A.

In addition, since upper limit voltage value VbH1 is greater than lower limit voltage value VbL1, the opposite correction values may not be outputted from correction value calculation units 66-1A and 66-1B at the same time.

As described above, according to this variation, it is not necessary to switch the correction function based on whether power storage devices 6-1 and 6-2 are on the charge side or discharge side. Thus, according to this variation also, the same effect as in the first embodiment can be achieved.

Second Embodiment

According to a second embodiment, when a voltage of a power storage device gets out of the range of upper and lower limits, a duty command of a corresponding converter is corrected such that the voltage of the power storage device falls within the range of the upper and lower limits, and a target voltage of the converter is corrected to prevent the voltage of the power storage device from getting out of the range of the upper and lower limits again.

Entire constitutions of a vehicle and a converter ECU according to the second embodiment is the same as that of vehicle 100 and converter ECU 2 shown in FIGS. 1 and 3.

Figure 7:
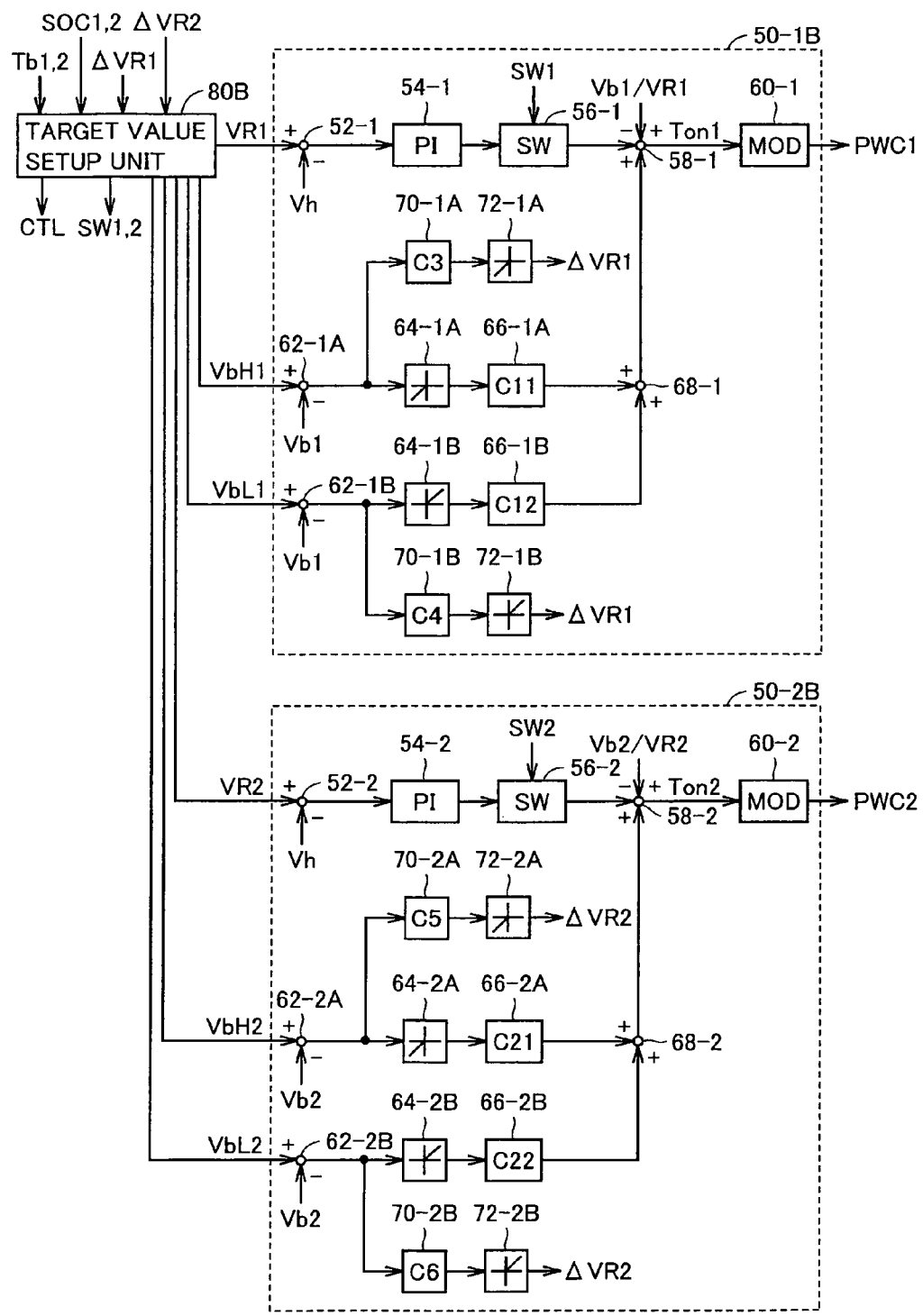
FIG. 7 is a detailed functional block diagram showing a temperature rise control unit according to a second embodiment.

FIG. 7 is a detailed functional block diagram showing a temperature rise control unit according to the second embodiment. With reference to FIG. 7, a temperature rise control unit 44B includes a first control unit 50-1B, a second control unit 50-2B, and a target value setup unit 80B.

As compared with the constitution of first control unit 50-1A shown in FIG. 6, first control unit 50-1B further includes correction value calculation units 70-1A and 70-1B, and filters 72-1A and 72-1B. Correction value calculation unit 70-1A multiplies the output from subtraction unit 62-1A by a gain (positive value) and outputs the calculated result to filter 72-1A. Filter 72-1A passes a negative value only and outputs a value 0 in a case of a positive value input. Thus, filter 72-1A outputs its output to target value setup unit 80B as a correction value ΔVR1 of target voltage VR1.

Correction value calculation unit 70-1B multiplies the output from subtraction unit 62-1B by a gain (positive value) and outputs the calculated result to filter 72-1B. Filter 72-1B passes a positive value only and outputs a value 0 in a case of a negative value input. Thus, filter 72-1B outputs its output to target value setup unit 80B as correction value ΔVR1 of target voltage VR1.

As compared with the constitution of second control unit 50-2A shown in FIG. 6, second control unit 50-2B further includes correction value calculation units 70-2A and 70-2B, and filters 72-2A and 72-2B. Since the constitution and operation of second control unit 50-2B are the same as those of first control unit 50-1B, its description will not be repeated.

Target value setup unit 80B corrects target voltage VR1 by subtracting correction value ΔVR1 from target voltage VR1. In addition, target value setup unit 80B corrects target voltage VR1 by subtracting a correction value ΔVR2 from target voltage VR2. Other functions of target value setup unit 80B are the same as those of target value setup unit 80 shown in FIG. 4.

Figure 8:
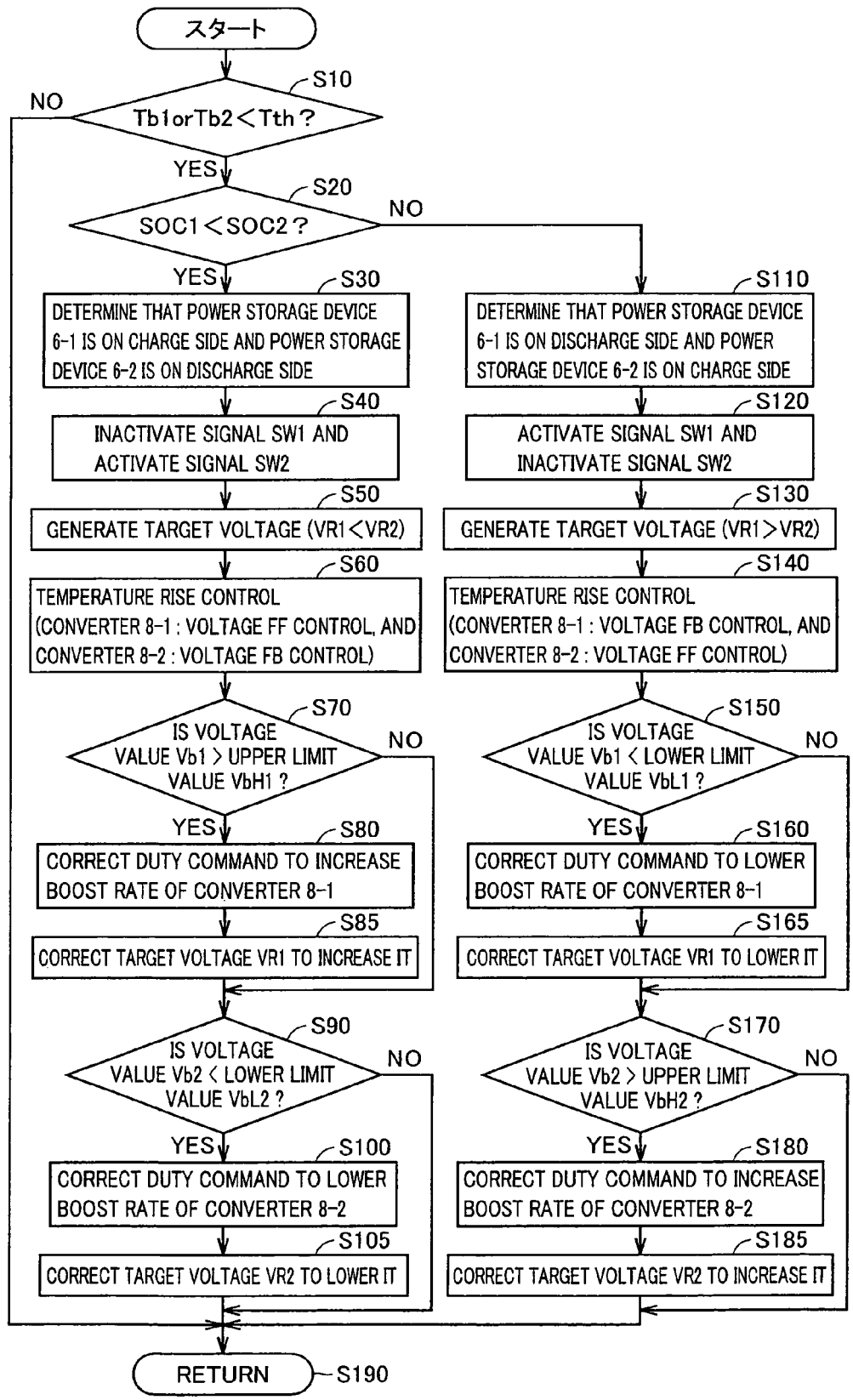
FIG. 8 is a flowchart showing temperature rise control by a converter ECU according to the second embodiment.

FIG. 8 is a flowchart of the temperature rise control by converter ECU 2 according to the second embodiment. The processes shown in this flowchart are also called from a main routine at regular time intervals or when a certain condition is established (at the time of the start-up of the system, for example), and then executed.

With reference to FIG. 8, as compared with the flowchart shown in FIG. 5, this flowchart further includes steps S85, S105, S165, and S185. That is, when duty command Ton1 is corrected to increase the boost rate of converter 8-1 in step S80, converter ECU 2 corrects target voltage VR1 to increase it (step S85).

This step S85 is executed by correction value calculation unit 70-1A and filter 72-1A of first control unit 50-1B, and target value setup unit 80B. That is, when voltage value Vb1 exceeds upper limit voltage value VbH1, the output of subtraction unit 62-1A becomes a negative value, and correction value calculation unit 70-1A outputs a negative correction amount. Thus, negative correction value ΔVR1 is outputted from filter 72-1A, and target value setup unit 80B corrects target voltage VR1 to increase it.

Thus, the operation point of converter 8-1 changed such that the boost rate of converter 8-1 is increased in the process in step S80 is maintained, and voltage value Vb1 is prevented from exceeding upper limit voltage value VbH1 again.

In addition, when duty command Ton2 is corrected so as to lower the boost rate of converter 8-2 in step S100, converter ECU 2 corrects target voltage VR2 to lower it (step S105). This step S105 is executed by correction value calculation unit 70-2B and filter 72-2B of second control unit 50-2B, and target value setup unit 80B. That is, when voltage value Vb2 falls below lower limit voltage value VbL2, the output of calculation unit 62-2B is a positive value and correction value calculation unit 70-2B outputs a positive correction amount. Thus, a positive correction value ΔVR2 is outputted from filter 72-2B, and target value setup unit 80B corrects target voltage VR2 to lower it.

Thus, the operation point of converter 8-2 changed such that the boost rate of converter 8-2 is lowered in the process in step S100 is maintained, and voltage value Vb2 is prevented from falling below lower limit voltage value VbL2 again.

In addition, when duty command Ton1 is corrected to lower the boost rate of converter 8-1 in step S160, converter ECU 2 corrects target voltage VR1 to lower it (step S165). This step S165 is executed by correction value calculation unit 70-1B and filter 72-1B of first control unit 50-1B, and target value setup unit 80B.

In addition, when duty command Ton2 is corrected so as to increase the boost rate of converter 8-2 in step S180, converter ECU 2 corrects target voltage VR2 to increase it (step S185). This step S185 is executed by correction value calculation unit 70-2A and filter 72-2A of second control unit 50-2B, and target value setup unit 80B.

As described above, according to the second embodiment, when the voltage of the power storage device gets out of the range of the upper and lower limits, the duty command of the corresponding converter is corrected such that the voltage of the power storage device falls with in the range of the upper and lower limits, and the target voltage of the corresponding converter is also corrected. Therefore, according to the second embodiment, the voltage of the power storage device can be prevented from getting out of the range of the upper and lower limits again.

Although the correction function of the target voltage is added to the constitution of temperature rise control unit 44A in the variation of the first embodiment shown in FIG. 6 in the above, the correction function of the target voltage can be added to the constitution of temperature rise control unit 44 in the first embodiment shown in FIG. 4.

Third Embodiment

While the temperature rise control unit is configured by the voltage control system in the embodiments 1 and 2, a temperature rise control unit is configured by a current control system in a third embodiment.

Entire constitutions of a vehicle and a converter ECU according to the third embodiment is the same as those of vehicle 100 and converter ECU 2 shown in FIGS. 1 and 3.

Figure 9:
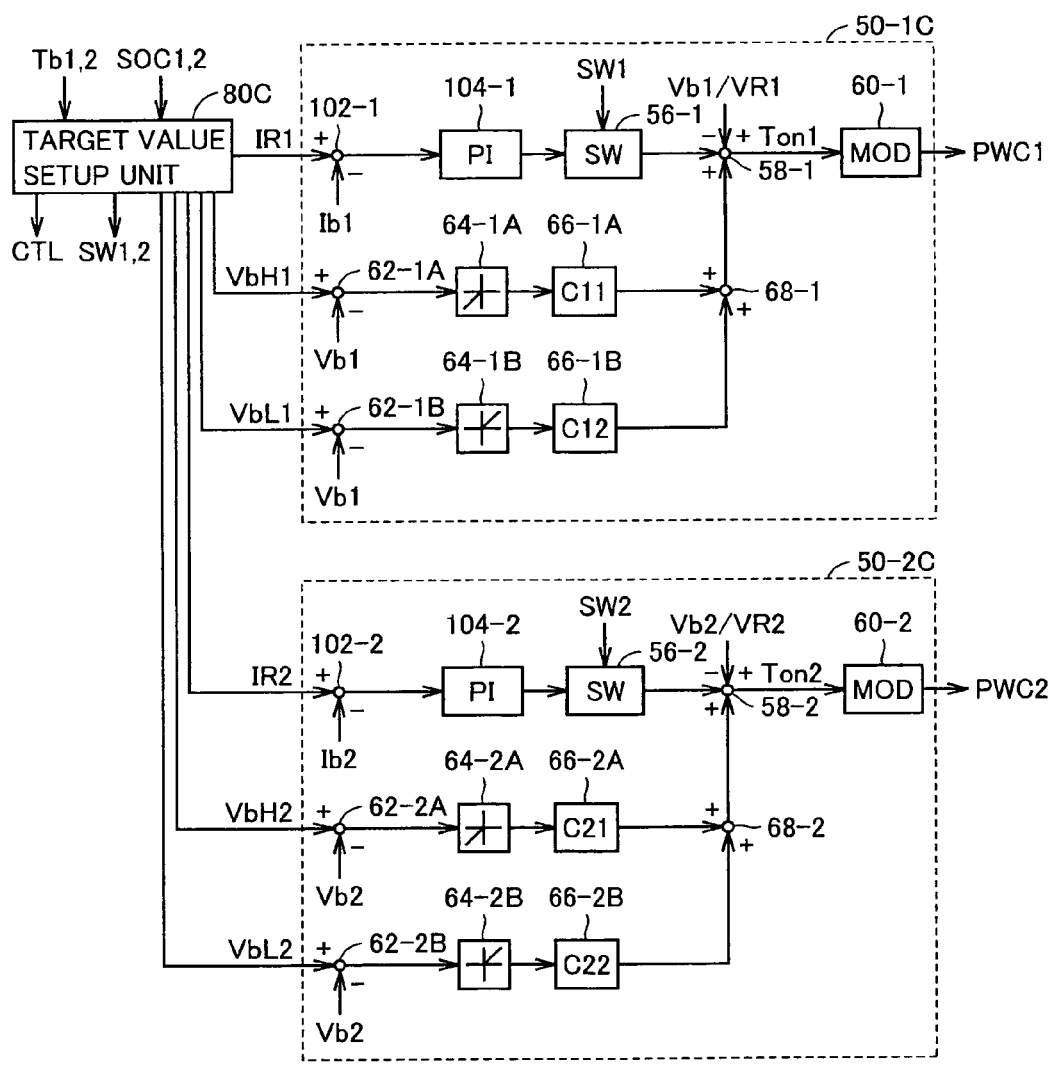
FIG. 9 is a functional block diagram showing a temperature rise control unit according to a third embodiment.

FIG. 9 is a functional block diagram showing a temperature rise control unit according to the third embodiment. With reference to FIG. 9, a temperature rise control unit 44C includes a first control unit 50-1C, a second control unit 50-2C, and a target value setup unit 80C.

As compared with the constitution of first control unit 50-1A shown in FIG. 6, first control unit 50-1C includes a subtraction unit 102-1 and PI control unit 104-1, instead of subtraction unit 52-1 and PI control unit 54-1.

Subtraction unit 102-1 subtracts current value Ib1 from a target current IR1 outputted from target value setup unit 80C, and outputs the calculated result to PI control unit 104-1. PI control unit 104-1 performs a proportional integral calculation using a deviation of target current IR1 and current value Ib1 as its input, and outputs the calculated result to switching unit 56-1.

In addition, as compared with the constitution of second control unit 50-2A shown in FIG. 6, second control unit 50-2C includes a subtraction unit 102-2 and a PI control unit 104-2, instead of subtraction unit 52-2 and PI control unit 54-2. Since the constitution and operation of second control unit 50-2C are same as those of first control unit 50-1C, their description will not be repeated.

Target value setup unit 80C generates target currents IR1 and IR2 of converters 8-1 and 8-2 and outputs generated target currents IR1 and IR2 to first and second control units 50-1C and 50-2C, respectively during the temperature rise control. Other functions of target value setup unit 80C are the same as those of target value setup unit 80 shown in FIG. 4.

Figure 10:
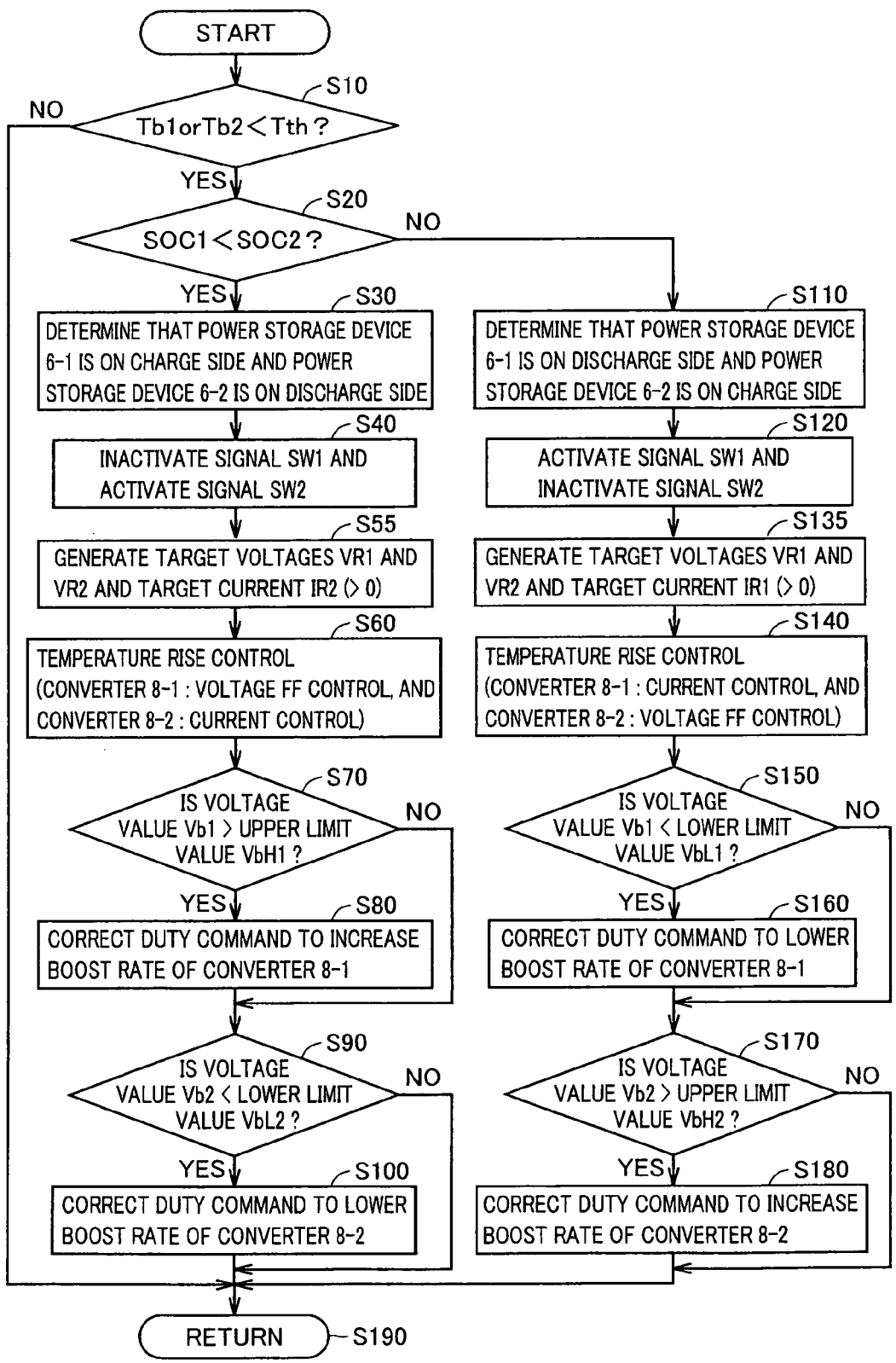
FIG. 10 is a flowchart showing temperature rise control by a converter ECU according to the third embodiment.

FIG. 10 is a flowchart of the temperature rise control by converter ECU 2 according to the third embodiment. The processes shown in this flowchart are also called from a main routine at regular time intervals or when a certain condition is established (at the time of the start-up of the system, for example), and then executed.

With reference to FIG. 10, as compared with the flowchart shown in FIG. 5, this flowchart includes steps S55 and S135 instead of steps S50 and S130. That is, when switching signal SW1 is inactivated and switching signal SW2 is activated in step S40, converter ECU 2 turns off a current control function of converter 8-1 corresponding to charge-side power storage device 6-1, and turns on a current control function of converter 8-2 corresponding to discharge-side power storage device 6-2. That is, the control of converter 8-1 is a voltage FF control system based on a theoretical boost ratio, and the control of converter 8-2 is a current control system based on current value Ib2.

Thus, converter ECU 2 generates target voltages VR1 and VR2, and generates target current TR2 (step S55). Here, converter ECU 2 generates target current IR2 such that target current IR2 becomes a positive value (discharge direction). Target current IR2 may be a predetermined value or may be a value provided by dividing a discharge allowance electric power of power storage device 6-2 calculated based on state quantity SOC2 of power storage device 6-2 by voltage value Vb2.

In addition, when switching signal SW1 is activated and switching signal SW2 is inactivated in step S120, converter ECU 2 turns on the current control function of converter 8-1 corresponding to discharge-side power storage device 6-1, and turns off the current control function of converter 8-2 corresponding to charge-side power storage device 6-2. That is, the control of converter 8-1 is the current control system based on current value Ib1, and the control of converter 8-2 is the voltage FF control system based on the theoretical boost ratio.

Thus, converter ECU 2 generates target voltages VR1 and VR2, and generates target current IR1 (step S135). Here, converter ECU 2 generates target current IR1 such that target current IR1 becomes a positive value (discharge direction). Target current IR1 may be a predetermined value or may be a value provided by dividing a discharge allowance electric power of power storage device 6-1 calculated based on state quantity SOC1 of power storage device 6-1 by voltage value Vb1.

Correction processes executed in steps S70 to S100 and S150 to S180 are the same as those in the first embodiment.

As described above, according to the third embodiment, since temperature rise control unit 44C is configured by the current control system, the current value (electric power value) exchanged between power storage devices 6-1 and 6-2 during the temperature rise control can be set. Therefore, according to the third embodiment, the management of the SOC of power storage devices 6-1 and 6-2 can be easy during the temperature rise control. In addition, a temperature rise speed can be controlled based on the value of the target current.

Although the current control function of the converter corresponding to the discharge-side power storage device is turned on, and the target current (positive value) of the converter is generated in the above description, the current control function of the converter corresponding to the charge-side power storage device may be turned on, and the target current (negative value) of the converter may be generated.

In addition, in the above description, as compared with the constitution of temperature rise control unit 44A in the variation of the first embodiment shown in FIG. 6, subtraction unit 102-1 and PI control unit 104-1 are included instead of subtraction unit 52-1 and PI control unit 54-1, and subtraction unit 102-2 and PI control unit 104-2 are included instead of subtraction unit 52-2 and PI control unit 54-2. Meanwhile, as compared with the constitution of temperature rise control unit 44 in the first embodiment shown in FIG. 4, subtraction unit 102-1 and PI control unit 104-1 may be included instead of subtraction unit 52-1 and PI control unit 54-1, and subtraction unit 102-2 and PI control unit 104-2 may be included instead of subtraction unit 52-2 and PI control unit 54-2.

Fourth Embodiment

According to a fourth embodiment, the function to correct the target current of the converter when the voltage of the power storage device gets out of the range of the upper and lower limits is added to the constitution of the temperature rise control unit according to the third embodiment.

Entire constitutions of a vehicle and a converter ECU according to the fourth embodiment is the same as those of vehicle 100 and converter ECU 2 shown in FIGS. 1 and 3.

Figure 11:
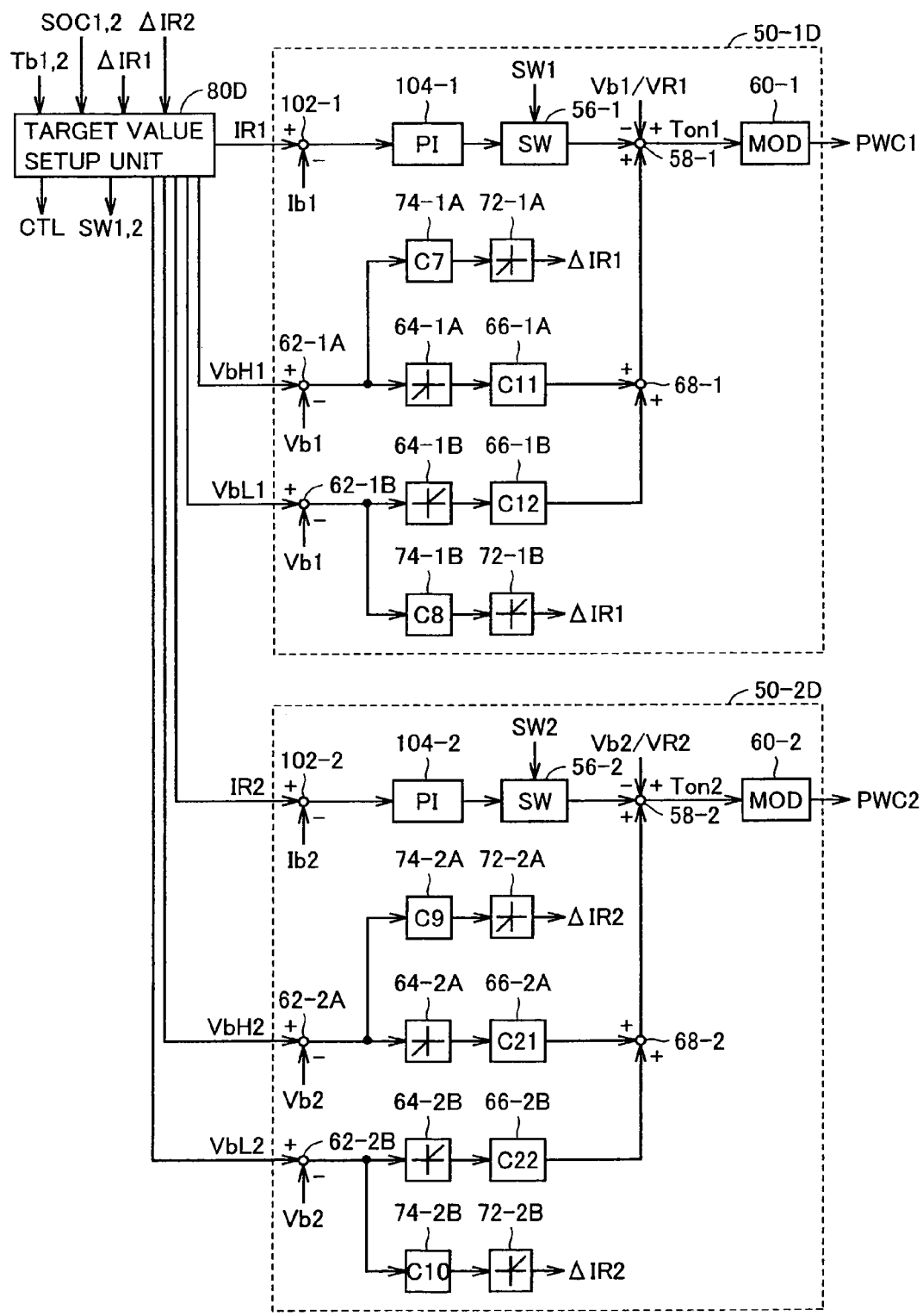
FIG. 11 is a detailed functional block diagram showing a temperature rise control unit according to a fourth embodiment.

FIG. 11 is a detailed functional block diagram showing a temperature rise control unit according to the fourth embodiment. With reference to FIG. 11, a temperature rise control unit 44D includes a first control unit 50-1D, a second control unit 50-2D, and a target value setup unit 80D.

As compared with the constitution of first control unit 50-1C shown in FIG. 9, first control unit 50-1D further includes correction value calculation units 74-1A and 74-1B, and filters 72-1A and 72-1B. Correction value calculation unit 74-1A multiplies the output from subtraction unit 62-1A by a gain (positive value), and outputs the calculated result to filter 72-1A. Filter 72-1A passes a negative value only, and outputs a value 0 in a case of a positive value input. Thus, filter 72-1A outputs its output to target value setup unit 80D as a correction value ΔIR1.

Correction value calculation unit 74-1B multiplies the output from subtraction unit 62-1B by a gain (positive value), and outputs the calculated result to filter 72-1B. Filter 72-1B passes a positive value only, and outputs a value 0 in a case of a negative value input. Thus, filter 72-1B outputs its output to target value setup unit 80D as correction value ΔIR1.

As compared with the constitution of second control unit 50-2C shown in FIG. 9, second control unit 50-2D further includes correction value calculation units 74-2A and 74-2B, and filters 72-2A and 72-2B. Since the constitution and operation of second control unit 50-2D are the same as those of first control unit 50-1D, their description will not be repeated.

When switching signal SW1 is activated, target value setup unit 80D subtracts correction value ΔIR1 from target current IR1 to correct target current IR1. Meanwhile, when switching signal SW1 is inactivated, target value setup unit 80D adds correction value ΔIR1 to target current IR2 to correct target current IR2.

In addition, when switching signal SW2 is activated, target value setup unit 80D subtracts a correction value ΔIR2 from target current IR2 to correct target current IR2. Meanwhile, when switching signal SW2 is inactivated, target value setup unit 80D adds correction value ΔIR2 to target current IR1 to correct target current IR1.

Figure 12:
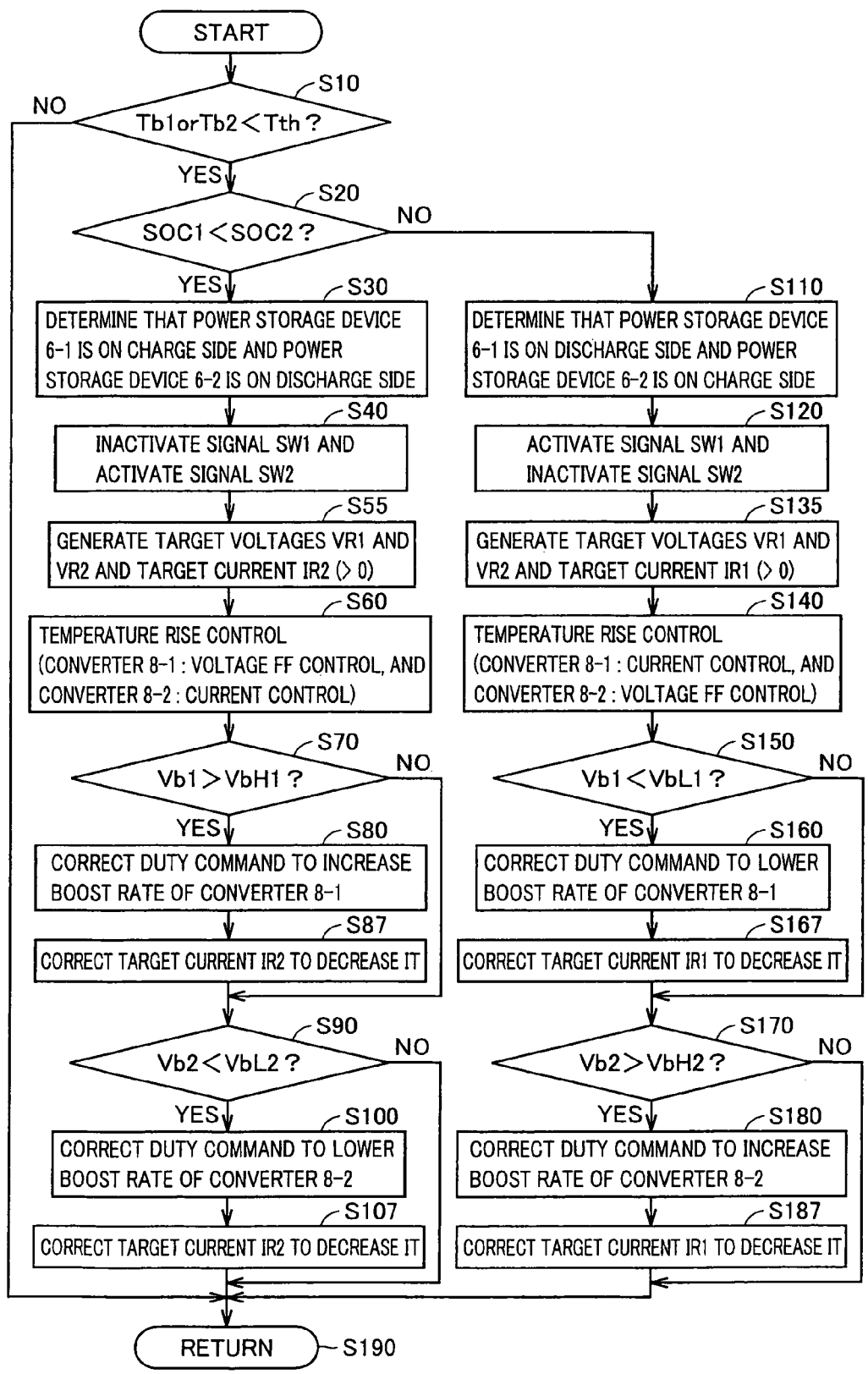
FIG. 12 is a flowchart showing temperature rise control by a converter ECU according to the fourth embodiment.

FIG. 12 is a flowchart of the temperature rise control by converter ECU 2 according to the fourth embodiment. The processes shown in this flowchart are also called from a main routine at regular time intervals or when a certain condition is established (at the time of the start-up of the system, for example), and then executed.

With reference to FIG. 12, as compared with the flowchart shown in FIG. 10, this flowchart further includes steps S87, S107, S167, and S187. That is, when duty command Ton1 is corrected to increase the boost rate of converter 8-1 in step S80, converter ECU 2 corrects target current IR2 to decrease it (step S87).

This step S87 is executed by correction value calculation unit 74-1A and filter 72-1A of first control unit 50-1D, and target value setup unit 80D. That is, when voltage value Vb1 exceeds upper limit voltage value VbH1, the output of subtraction unit 62-1A becomes a negative value, and correction value calculation unit 74-1A outputs a negative correction amount. Thus, negative correction value ΔIR1 is outputted from filter 72-1A, and target value setup unit 80D adds correction value ΔIR1 to target current IR2 to correct target current IR2 to decrease it.

Thus, a discharge current from power storage device 6-2 is decreased, so that voltage value Vb1 can be prevented from exceeding upper limit voltage value VbH1 again.

In addition, when duty command Ton2 is corrected to lower the boost rate of converter 8-2 in step S100, converter ECU 2 corrects target current IR2 to decrease it (step S107).

This step S107 is executed by correction value calculation unit 74-2B and filter 72-2B of second control unit 50-2D, and target value setup unit 80D. That is, when voltage value Vb2 falls below lower limit voltage value VbL2, the output of subtraction unit 62-2B becomes a positive value, and correction value calculation unit 74-2B outputs a positive correction amount. Thus, positive correction value ΔIR2 is outputted from filter 72-2B, and target value setup unit 80D subtracts correction value ΔIR2 from target current IR2 and corrects target current IR2 to decrease it.

Thus, the discharge current from power storage device 6-2 is decreased, so that voltage value Vb2 can be prevented from falling below lower limit voltage value VbL2 again.

In addition, when duty command Ton1 is corrected to lower the boost rate of converter 8-1 in step S160, converter ECU 2 corrects target current IR1 to decrease it (step S167). This step S167 is executed by correction value calculation unit 74-1B and filter 72-1B of first control unit 50-1D, and target value setup unit 80D.

In addition, when duty command Ton2 is corrected to increase the boost rate of converter 8-2 in step S180, converter ECU 2 corrects target current IR1 to decrease it (step S187). This step S187 is executed by correction value calculation unit 74-2A and filter 72-2A of second control unit 50-2D, and target value setup unit 80D.

As described above, according to the fourth embodiment, when the voltage of the power storage device gets out of the range of the upper and lower limits, the duty command of the corresponding converter is corrected and the target current is also corrected such that the voltage of the power storage device falls within the range of the upper and lower limits. Therefore, according to the fourth embodiment, the voltage of the power storage device can be prevented from getting out of the range of the upper and lower limits again.

Although the correction function of the target current is added to the constitution of temperature rise control unit 44C in the third embodiment shown in FIG. 9 in the above description, the correction function of the target current may be added to the constitution of temperature rise control unit 44 in the first embodiment shown in FIG. 4 in which subtraction unit 102-1, PI control unit 104-1, subtraction unit 102-2 and PI control unit 104-2 are included.

Fifth Embodiment

According to a fifth embodiment, one converter is controlled by the current control, and the other converter is controlled by the voltage control during the temperature rise control.

Entire constitutions of a vehicle and a converter ECU according to the fifth embodiment is the same as those of vehicle 100 and converter ECU 2 shown in FIGS. 1 and 3.

Figure 13:
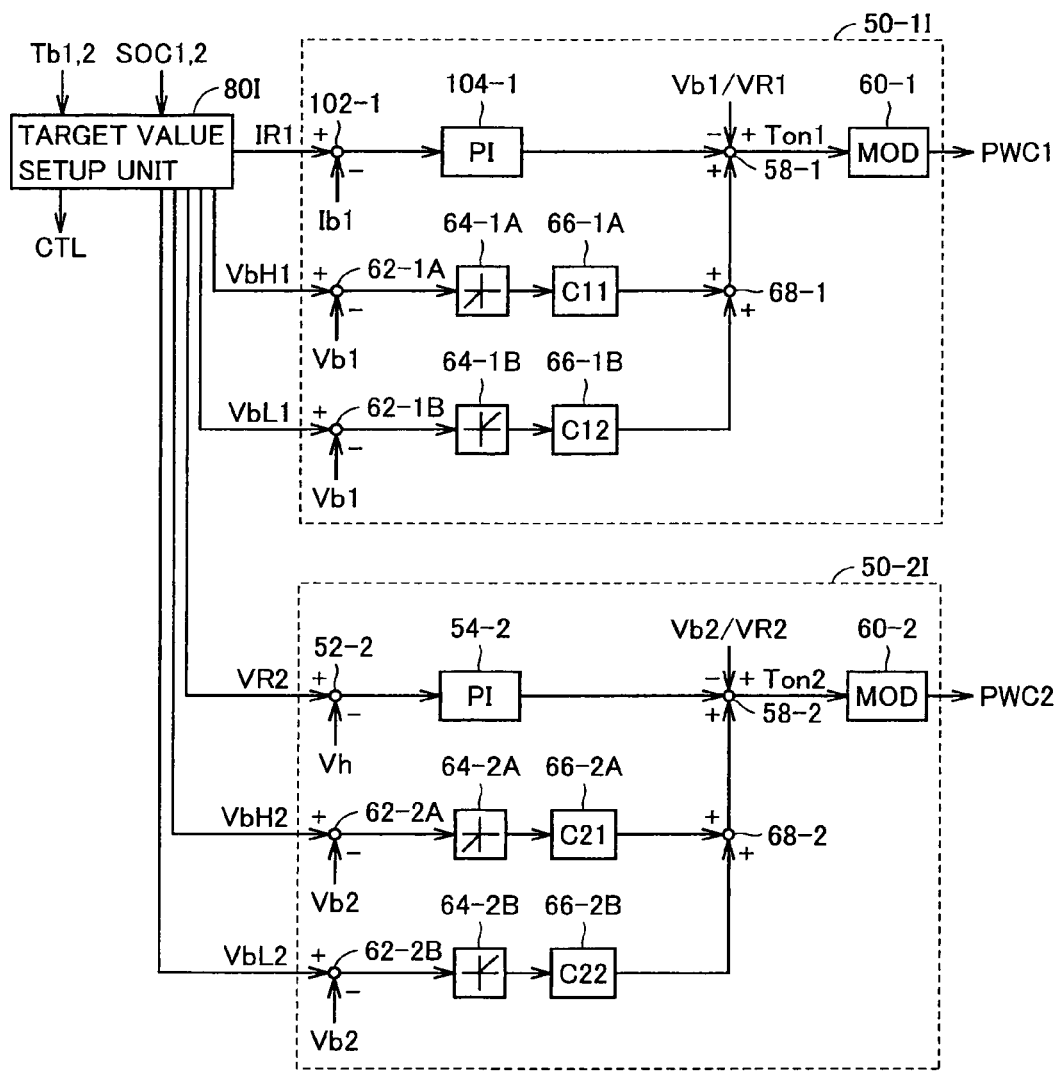
FIG. 13 is a detailed functional block diagram showing a temperature rise control unit according to a fifth embodiment.

FIG. 13 is a detailed functional block diagram showing a temperature rise control unit according to the fifth embodiment. With reference to FIG. 13, a temperature rise control unit 44I includes a first control unit 50-1I, a second control unit 50-2I, and a target value setup unit 80I.

As compared with first control unit 50-1C shown in FIG. 9, first control unit 50-1I does not include switching unit 56-1.

As compared with second control unit 50-2A shown in FIG. 6, second control unit 50-2I does not include switching unit 56-2.

Target value setup unit 80I generates target current IR1 of converter 8-1 and target voltage VR2 of converter 8-2 during the temperature rise control, and outputs generated target current IR1 and target voltage VR2 to first and second control units 50-1I and 50-2I, respectively. The other functions of target value setup unit 80I is the same as those of target value setup unit 80 shown in FIG. 4 except that switching signals SW1 and SW2 are not generated.

Figure 14:
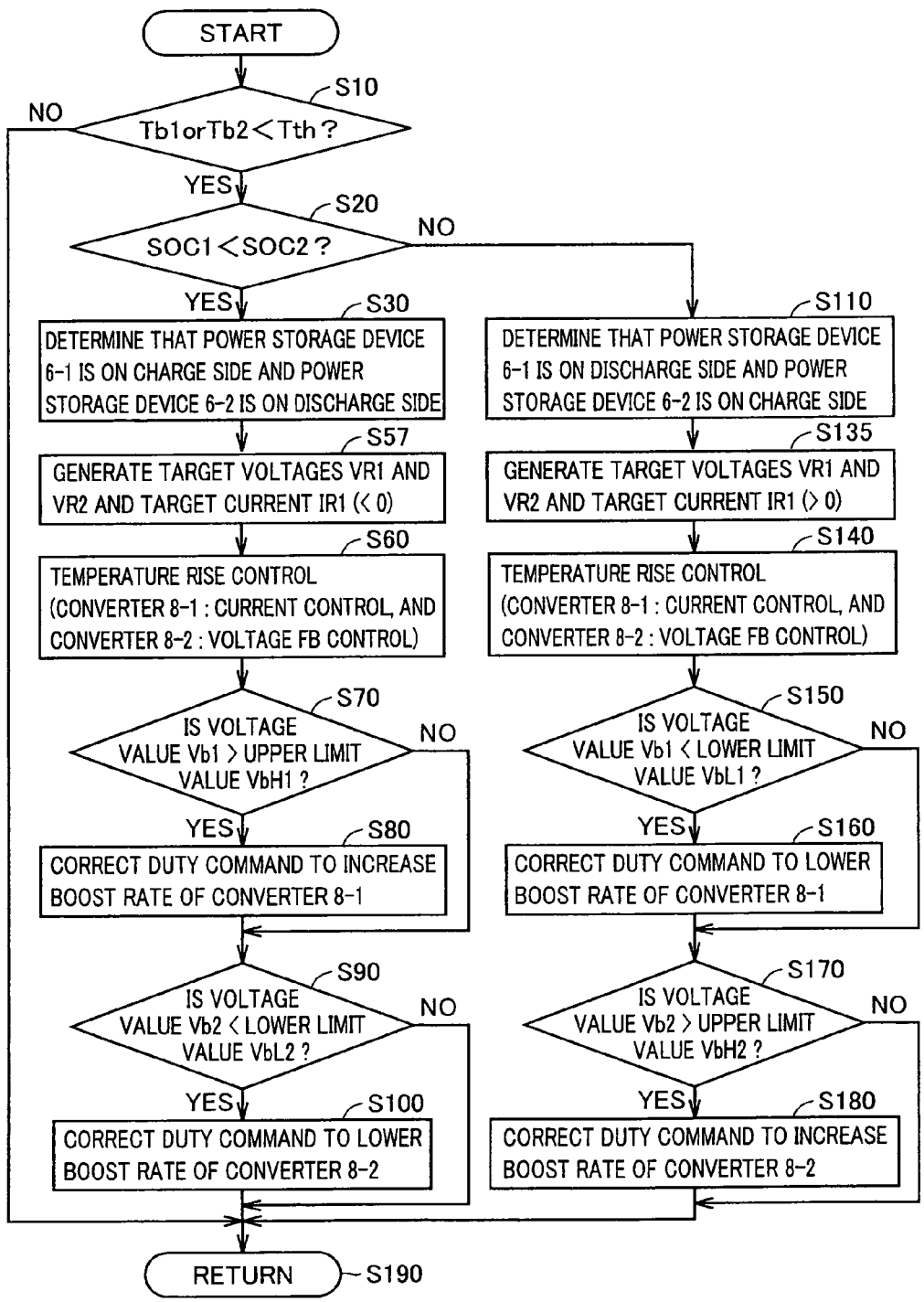
FIG. 14 is a flowchart showing temperature rise control by a converter ECU according to the fifth embodiment.

FIG. 14 is a flowchart showing the temperature rise control by converter ECU 2 according to the fifth embodiment. The processes shown in this flowchart are also called from a main routine at regular time intervals or when a certain condition is established (at the time of the start-up of the system, for example), and then executed.

With reference to FIG. 14, as compared with the flowchart shown in FIG. 10, this flowchart does not include steps S40 and S120 and includes step S57 instead of step S55. That is, when power storage devices 6-1 and 6-2 are determined to be on the charge side and discharge side, respectively in step S30, converter ECU 2 generates target voltages VR1 and VR2, and generates negative target current IR1 (charge direction) (step S57).

Thus, in step S60, converter ECU 2 controls converter 8-1 by the current control based on target current IR1, and controls converter 8-2 by the voltage FB control based on target voltage VR2.

Meanwhile, when power storage devices 6-1 and 6-2 are determined to be on the discharge side and charge side, respectively in step S110, converter ECU 2 generates target voltages VR1 and VR2, and generates positive target current IR1 (discharge direction). Thus, in step S140, converter ECU 2 controls converter 8-1 by the current control based on target current IR1, and controls converter 8-2 by the voltage FB control based on target voltage VR2.

The correction processes executed in step S70 to S100, and steps S150 to 180 are the same as those in the first embodiment.

Although converter 8-1 is controlled by the current control and converter 8-2 is controlled by the voltage FB control in the above, converter 8-2 may be controlled by the current control and converter 8-1 may be controlled by the voltage FB control.

As described above, according to the fifth embodiment, since one converter is current-controlled and the other converter is voltage-FB-controlled, the control systems of both converters do not interfere with each other, it is not necessary to provide the switching circuit. Therefore, according to the fifth embodiment, the same effect as that in the third embodiment can be achieved by the constitution simpler than that in the third embodiment.

Sixth Embodiment

According to a sixth embodiment, the function to correct the target current of converter 8-1 when the voltage of power storage device 6-1 gets out of the range of the upper and lower limits and to correct the target voltage of converter 8-2 when the voltage of power storage device 6-2 gets out of the range of the upper and lower limits is added to the constitution of the temperature rise control unit in the fifth embodiment.

Figure 15:
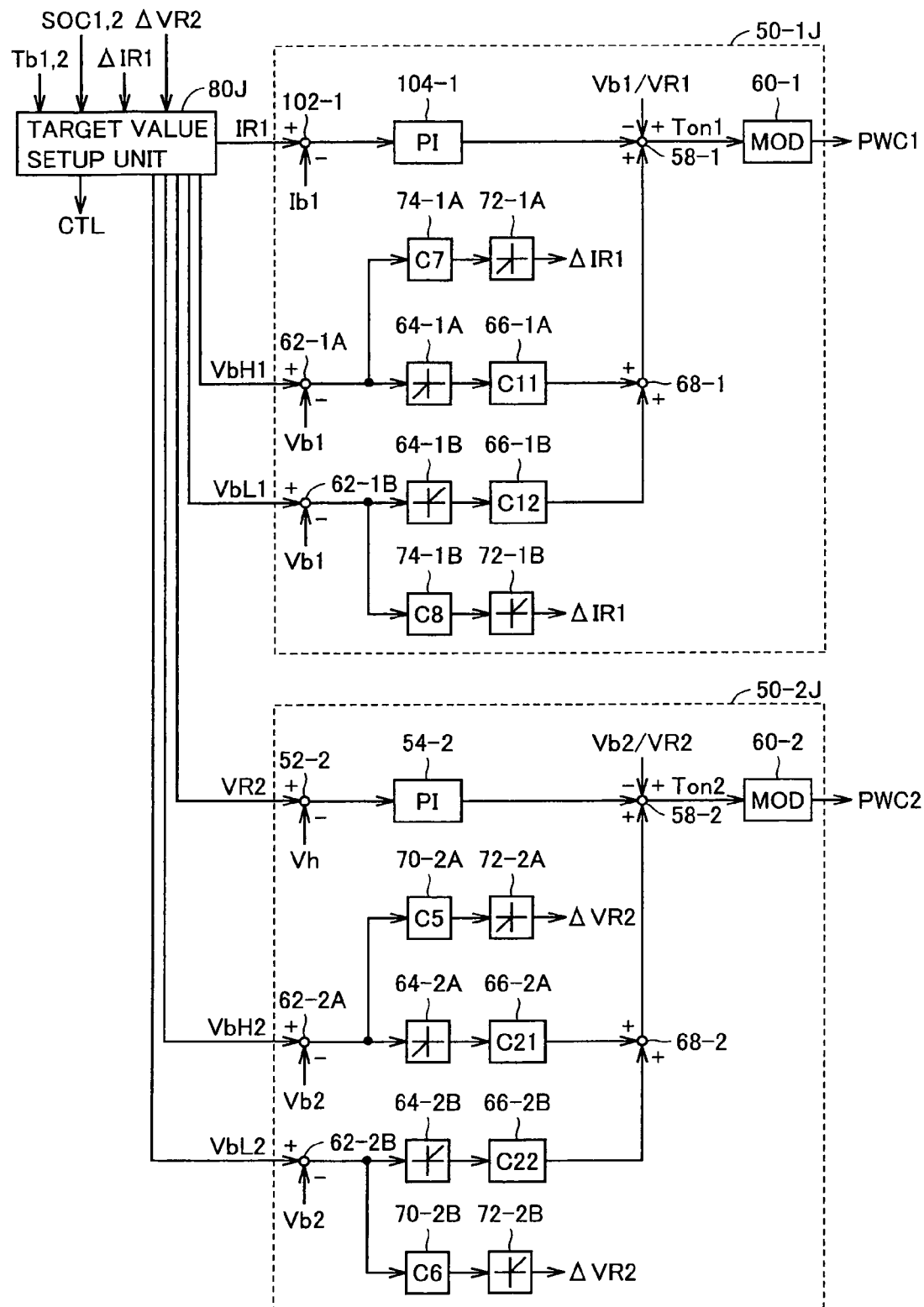
FIG. 15 is a detailed functional block diagram showing a temperature rise control unit according to a sixth embodiment.

FIG. 15 is a detailed functional block diagram showing a temperature rise control unit according to the sixth embodiment. With reference to FIG. 15, a temperature rise control unit 44J includes a first control unit 50-1J, a second control unit 50-2J, and a target value setup unit 80J.

As compared with first control unit 50-1D shown in FIG. 11, first control unit 50-1J does not include switching unit 56-1. As compared with second control unit 50-2B shown in FIG. 7, second control unit 50-2J does not include switching unit 56-2.

Target value setup unit 80J corrects target current IR1 by subtracting correction value $\Delta$IR1 from target current IR1. In addition, target value setup unit 80J corrects target voltage VR2 by subtracting correction value $\Delta$VR2 from target voltage VR2. The other functions of target value setup unit 80J are the same as those of target value setup unit 80I in the fifth embodiment.

Figure 16:
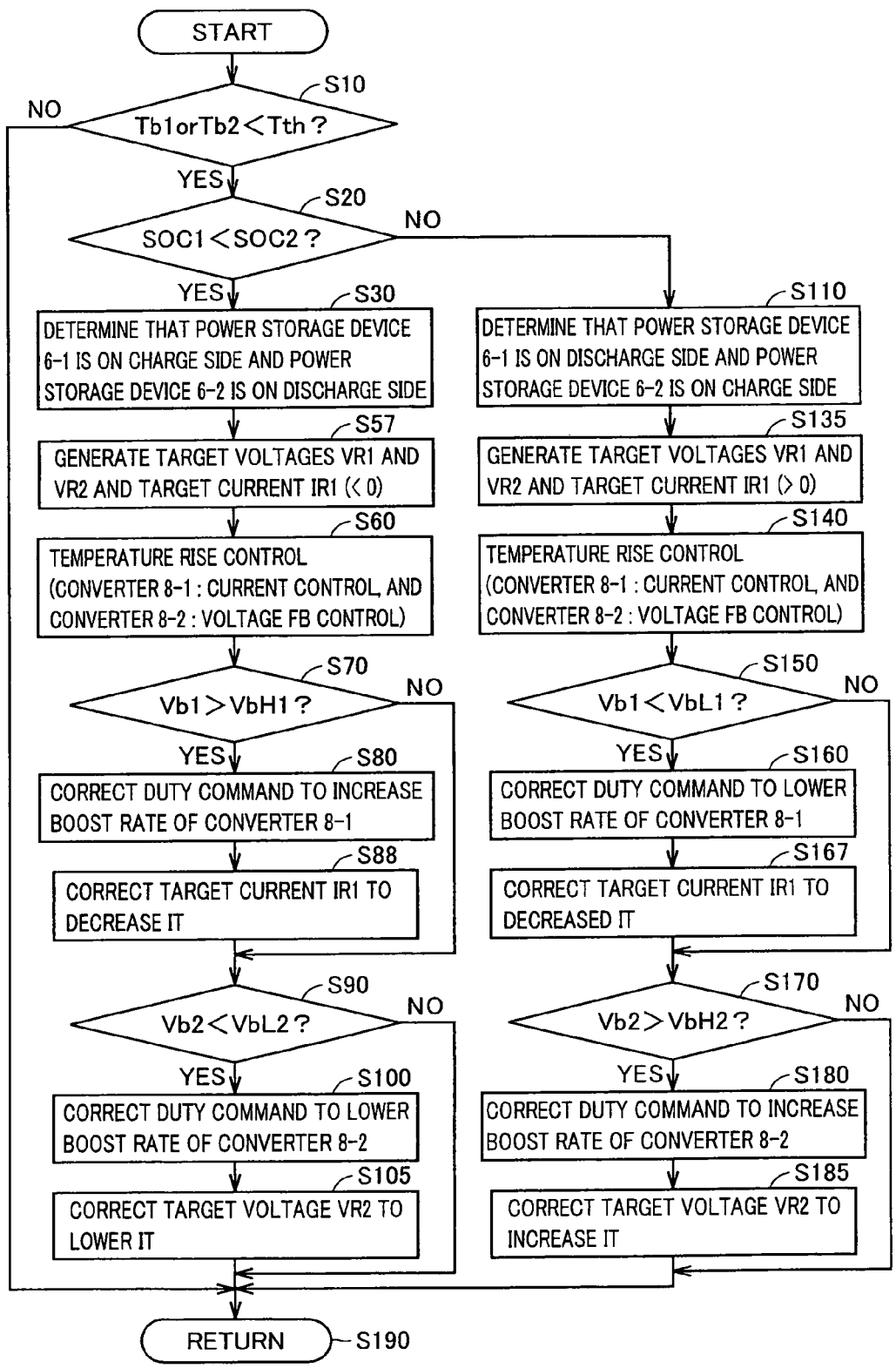
FIG. 16 is a flowchart showing temperature rise control by a converter ECU according to the sixth embodiment.

FIG. 16 is a flowchart showing the temperature rise control by converter ECU 2 according to the sixth embodiment. The processes shown in this flowchart are also called from a main routine at regular time intervals or when a certain condition is established (at the time of the start-up of the system, for example), and then executed.

With reference to FIG. 16, as compared with the flowchart shown in FIG. 14, this flowchart further includes steps S88, S105, S167, and S185. That is, when duty command Ton1 is corrected to increase the boost rate of converter 8-1 in step S80, converter ECU 2 corrects target current IR1 to decrease it (step S88). In addition, when duty command Ton2 is corrected to lower the boost rate of converter 8-2 in step S100, converter ECU 2 corrects target voltage VR2 to decrease it (step S105).

Furthermore, when duty command Ton1 is corrected to lower the boost rate of converter 8-1 in step S160, converter ECU 2 corrects target current IR1 to decrease it (step S167). Still furthermore, when duty command Ton2 is corrected to increase the boost rate of converter 8-2 in step S180, converter ECU 2 corrects target voltage VR2 to increase it (step S185).

As described above, according to the sixth embodiment, when the voltage of power storage device 6-1 gets out of the range of the upper and lower limits, duty command Ton1 of converter 8-1 and target current IR1 are corrected so that the voltage of power storage device 6-1 falls within the range of the upper and lower limits. In addition, when the voltage of power storage device 6-2 gets out of the range of the upper and lower limits, duty command Ton2 of converter 8-2 and target voltage VR2 are corrected so that the voltage of power storage device 6-2 falls within the range of the upper and lower limits. Therefore, according to the sixth embodiment, the voltage of the power storage device can be prevented from getting out of the range of the upper and lower limits again.

Seventh Embodiment

Figure 17:
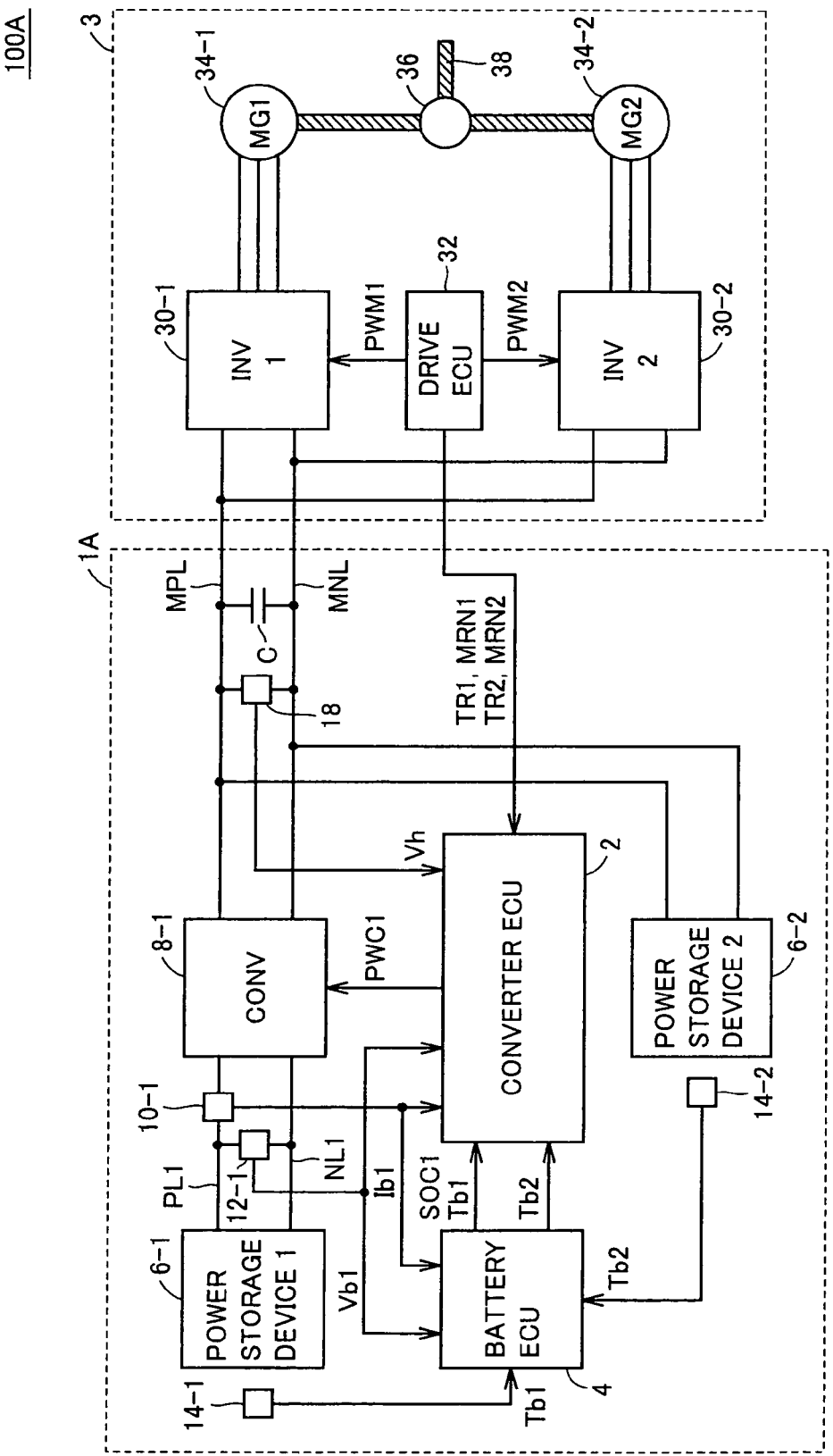
FIG. 17 is an entire block diagram showing a vehicle according to a seventh embodiment of the present invention.

FIG. 17 is an entire block diagram showing a vehicle according to a seventh embodiment of the present invention. With reference to FIG. 17, a vehicle 100A includes a power supply system 1A and drive force generator unit 3. The constitution of power supply system 1A is the same as that of power supply system 1 shown in FIG. 1 except that converter 8-2 is not provided. That is, power storage device 6-2 is directly connected to main positive bus MPL and main negative bus MNL.

Drive force generator unit 3 is the same as that described in FIG. 1. The constitution of converter ECU 2 is the same as shown in FIG. 3.

Figure 18:
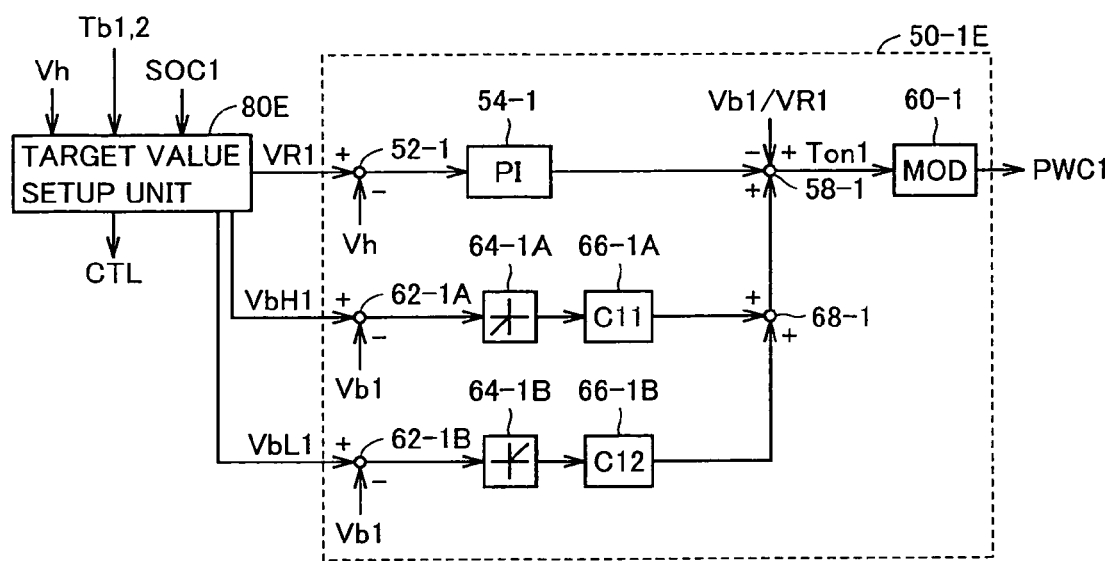
FIG. 18 is a detailed functional block diagram showing a temperature rise control unit according to the seventh embodiment.

FIG. 18 is a detailed functional block diagram showing a temperature rise control unit according to the seventh embodiment. With reference to FIG. 18, a temperature rise control unit 44E includes a first control unit 50-1E and a target value setup unit 80E. The constitution of first control unit 50-1E is the same as first control unit 50-1A shown in FIG. 6 except that switching unit 56-1 is not provided.

Target value setup unit 80E determines whether the temperature rise control of power storage devices 6-1 and 6-2 is executed or not based on temperatures Tb1 and Tb2, and activates control signal CTL to be outputted to control unit 42 for during running (FIG. 3) at the time of the execution of the temperature rise control. Thus, target value setup unit 80E generates target voltage VR1 of converter 8-1, and outputs generated target voltage VR1 to first control unit 50-1E during the temperature rise control. In addition, target value setup unit 80E outputs predetermined upper limit voltage value VbH1 and lower limit voltage value VbL1 of power storage device 6-1 to first control unit 50-1E.

Figure 19:
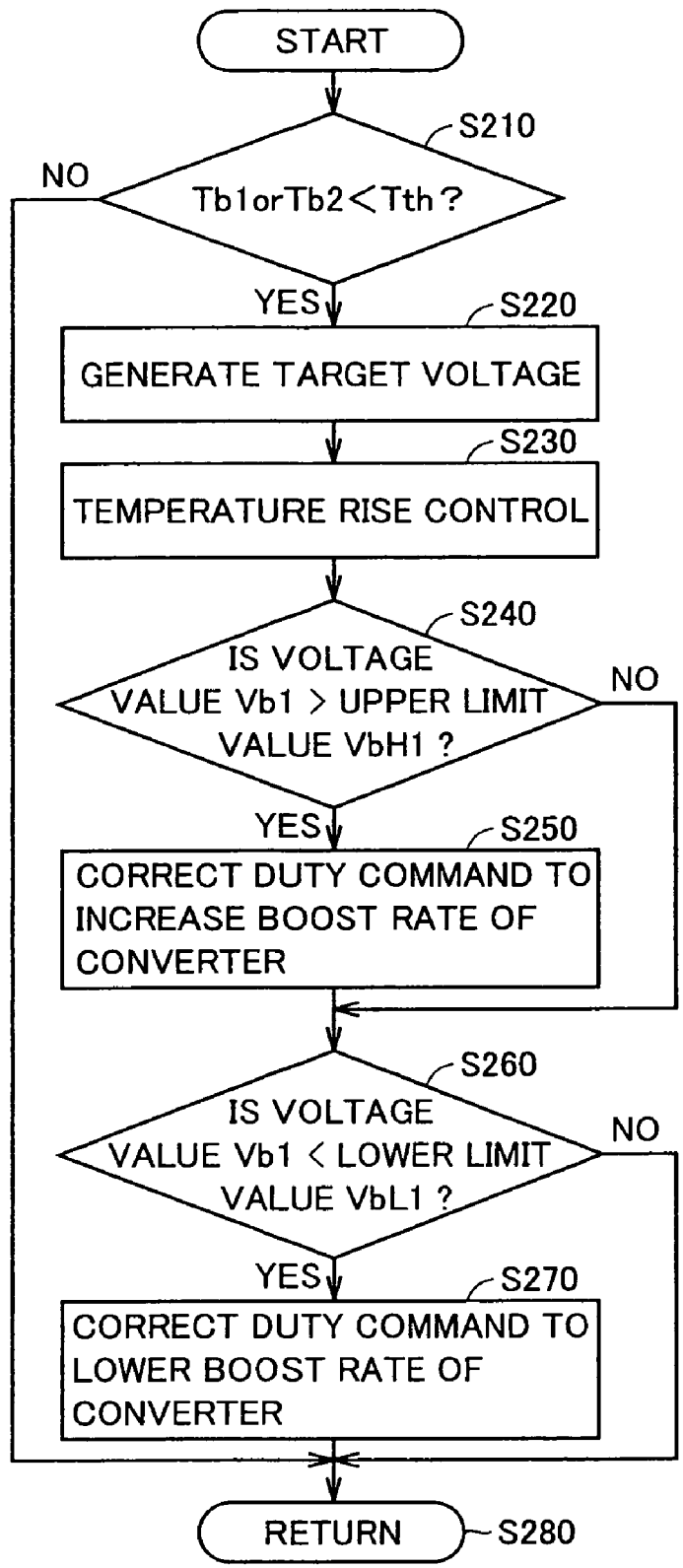
FIG. 19 is a flowchart showing temperature rise control by a converter ECU according to the seventh embodiment.

FIG. 19 is a flowchart showing the temperature rise control by converter ECU 2 according to the seventh embodiment. The process shown in this flowchart is also called from a main routine at regular time intervals or when a certain condition is established (at the time of the start-up of the system, for example), and then executed.

With reference to FIG. 19, converter ECU 2 determines whether temperature Tb1 or temperature Tb2 is lower than predetermined threshold temperature Tth (−10° C., for example) (step S210). When converter ECU 2 determines that both temperatures Tb1 and Tb2 are not less than threshold temperature Tth (NO in step S210), it moves the process to step S280 and inactivates control signal CTL.

When it is determined that temperature Tb1 or Tb2 is lower than threshold temperature Tth in step S210 (YES in step S210), converter ECU 2 activates control signal CTL. Thus, converter ECU 2 generates target voltage VR1 (step S220). More specifically, converter ECU 2 fluctuates target voltage VR1 in a certain cycle within a range in which voltage value Vh can be controlled (Vb1≦Vh≦Vh_max where Vh_max designates a maximum voltage of main positive bus MPL and main negative bus MNL).

Thus, converter ECU 2 controls converter 8-1 in such a way that voltage value Vh follows target voltage VR1 (voltage FB control). Thus, an electric power flows between power storage devices 6-1 and 6-2 through main positive bus MPL and main negative bus MNL based on the fluctuation of target voltage VR1, and the temperature rise control of power storage devices 6-1 and 6-2 is executed (step S230).

While the temperature rise control is executed, converter ECU 2 determines whether voltage value Vb1 is higher than upper limit voltage value VbH1 or not (step S240). When converter ECU 2 determines that voltage value Vb1 is higher than upper limit voltage value VbH1 (YES in step S240), it corrects duty command Ton1 to increase the boost rate of converter 8-1 (step S250). In other words, duty command Ton1 is corrected to be decreased.

Steps S240 and S250 are executed by subtraction unit 62-1A, filter 64-1A, and correction value calculation unit 66-1A of first control unit 50-1E. Consequently, when voltage value Vb1 exceeds upper limit voltage value VbH1, the output of subtraction unit 62-1A becomes a negative value. Then, filter 64-1A passes the output from subtraction 62-1A. Therefore, a negative correction value is outputted from correction value calculation unit 66-1A, and duty command Ton1 is corrected to be decreased.

Thus, the operation point of converter 8-1 is changed in such a way that the boost rate of converter 8-1 is increased, and converter 8-1 flows a current from power storage device 6-1 to main positive bus MPL and main negative bus MNL. As a result, voltage value Vb1 of power storage device 6-1 is decreased.

When it is determined that voltage value Vb1 is not more than upper limit voltage value VbH1 in step S240 (NO in step S240), converter ECU 2 does not execute step S240 and moves the process to step S260.

In addition, while the temperature rise control is executed, converter ECU 2 determines whether voltage value Vb1 is lower than lower limit voltage value VbL1 or not (step S260). When converter ECU 2 determines that voltage value Vb1 is lower than lower limit voltage value VbL1 (YES in step S260), it corrects duty command Ton1 to lower the boost rate of converter 8-1 (step S270). In other words, duty command Ton1 is corrected to be increased.

Steps S260 and S270 are executed by subtraction unit 62-1B, filter 64-1B, and correction value calculation unit 66-1B of first control unit 50-1E. Consequently, when voltage value Vb1 falls below lower limit voltage value VbL1, the output of subtraction unit 62-1B becomes a positive value. Therefore, filter 64-1B passes the output from subtraction unit 62-1B. Therefore, a positive correction value is outputted from correction value calculation unit 66-1B, and duty command Ton1 is corrected so as to be increased.

Thus, the operation point of converter 8-1 is changed in such a way that the boost rate of converter 8-1 is lowered, and converter 8-1 flows a current from main positive bus MPL and main negative bus MNL to power storage device 6-1. As a result, voltage value Vb1 of power storage device 6-1 is increased.

When it is determined that voltage value Vb1 is not less than lower limit voltage value VbL1 in step S260 (NO in step S260), converter ECU 2 does not execute step S270 and moves the process to step S280.

As described above, according to the seventh embodiment, the temperatures of power storage devices 6-1 and 6-2 are raised by exchanging the electric power between power storage devices 6-1 and 6-2 through converter 8-1, and main positive bus MPL and main negative bus MNL. Here, since converter ECU 2 controls converter 8-1 such that voltage value Vb1 of power storage device 6-1 may not exceed upper limit voltage value VbH1 and may not fall below lower limit voltage value VbL1, during the temperature rise control, the voltage of power storage device 6-1 can be within the range of the upper and lower limits. Further, voltage value Vh may also be controlled by target voltage VR1. Therefore, according to the seventh embodiment, the temperatures of power storage devices 6-1 and 6-2 can be raised while being protected.

According to the above description, first control unit 50-1E is configured without switching unit 56-1 as compared with first control unit 50-1A shown in FIG. 6, and may be configured without switching unit 56-1 as compared with first control unit 50-1 shown in FIG. 4.

Eighth Embodiment

According to an eighth embodiment, when voltage value Vb1 of power storage device 6-1 gets out of the range of the upper and lower limits, converter 8-1 is controlled such that voltage value Vb1 is within the range of the upper and lower limits, and target voltage VR1 is corrected so as to prevent voltage value Vb1 from getting out of the range of the upper and lower limits again.

Entire constitutions of a vehicle and a converter ECU according to this eighth embodiment is the same as vehicle 100A and converter ECU 2 shown in FIGS. 17 and 3.

Figure 20:
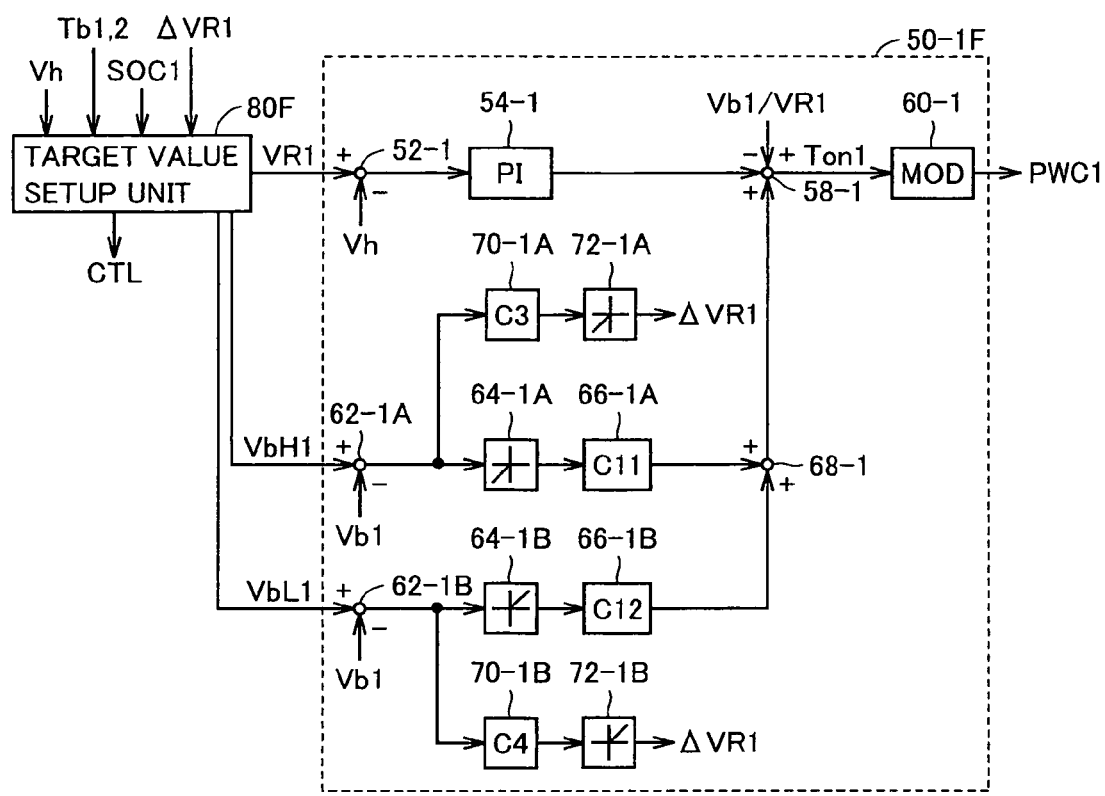
FIG. 20 is a detailed functional block diagram showing a temperature rise control unit according to an eighth embodiment.

FIG. 20 is a detailed functional block diagram showing a temperature rise control unit according to the eighth embodiment. With reference to FIG. 20, a temperature rise control unit 44F includes a first control unit 50-1F, and a target value setup unit 80F. The constitution of first control unit 50-1F is the same as that of first control unit 50-1B shown in FIG. 7 except that switching unit 56-1 is not provided.

Target value setup unit 80F corrects target voltage VR1 by subtracting correction value ΔVR1 from target voltage VR1. Other functions of target value setup unit 80F are the same as those of target value setup unit 80E shown in FIG. 18.

Figure 21:
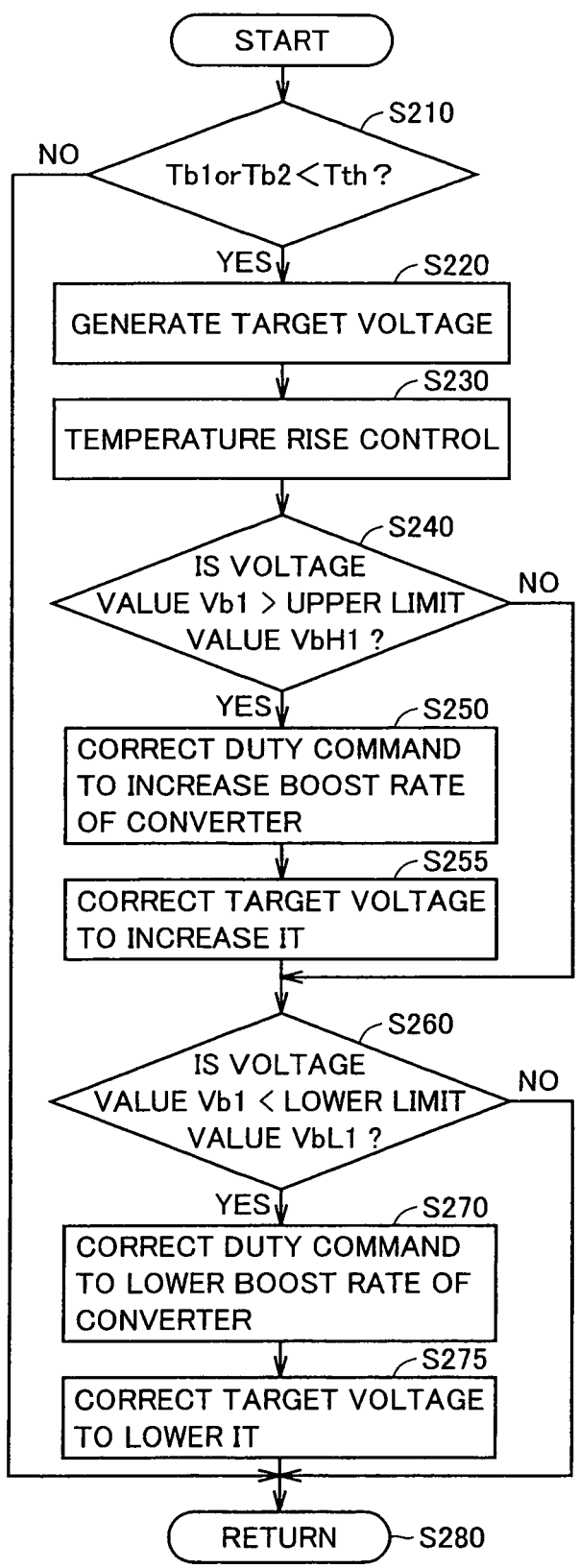
FIG. 21 is a flowchart showing temperature rise control by a converter ECU according to the eighth embodiment.

FIG. 21 is a flowchart of the temperature rise control by converter ECU 2 according to the eighth embodiment. The processes shown in this flowchart are also called from a main routine at regular time intervals or when a certain condition is established (at the time of the start-up of the system, for example), and then executed.

With reference to FIG. 21, as compared with the flowchart shown in FIG. 19, this flowchart further includes steps S255 and S275. That is, when duty command Ton1 is corrected to increase the boost rate of converter 8-1 in step S250, converter ECU 2 corrects target voltage VR1 to increase it (step S255). This step S255 is executed by correction value calculation unit 70-1A and filter 72-1A of first control unit 50-1F, and target value setup unit 80F. Its detailed processes are the same as those described in step S85 shown in FIG. 8.

In addition, when duty command Ton1 is corrected to lower the boost rate of converter 8-1 in step S270, converter ECU 2 corrects target voltage VR1 to lower it (step S275). This step S275 is executed by correction value calculation unit 70-1B and filter 72-1B of first control unit 50-1F, and target value setup unit 80F. Its detailed process is the same as that described in step S165 in FIG. 8.

As described above, according to the eighth embodiment, when voltage value Vb1 of the power storage device 6-1 gets out of the range of the upper and lower limits, the duty command of converter 8-1 is corrected such that voltage value Vb1 falls within the range of the upper and lower limits, and target voltage VR1 is also corrected. Therefore, according to the eighth embodiment, voltage value Vb1 can be prevented from getting out of the range of the upper and lower limits again.

Ninth Embodiment

While the temperature rise control unit is configured by the voltage control system according to the seventh embodiment, a temperature rise control unit is configured by the current control system according to the ninth embodiment.

Entire constitutions of a vehicle and a converter ECU according to the ninth embodiment is the same as vehicle 100A and converter ECU 2 shown in FIGS. 17 and 3.

Figure 22:
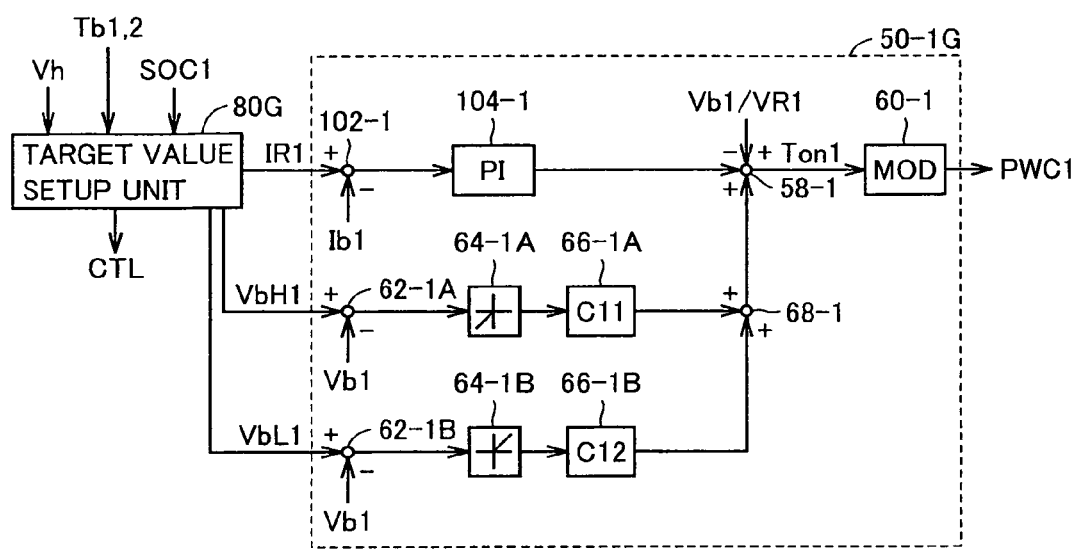
FIG. 22 is a detailed functional block diagram showing a temperature rise control unit according to a ninth embodiment.

FIG. 22 is a detailed functional block diagram showing the temperature rise control unit according to the ninth embodiment. With reference to FIG. 22, a temperature rise control unit 44G includes a first control unit 50-1G and a target value setup unit 80G. First control unit 50-1G is the same as first control unit 50-1C shown in FIG. 9 except that switching unit 56-1 is not provided.

Target value setup unit 80G generates target current IR1 of converter 8-1, and outputs generated target current IR1 to first control unit 50-1G during the temperature rise control. Other functions of target value setup unit 80G are the same as those of target value setup unit 80E shown in FIG. 18.

Figure 23:
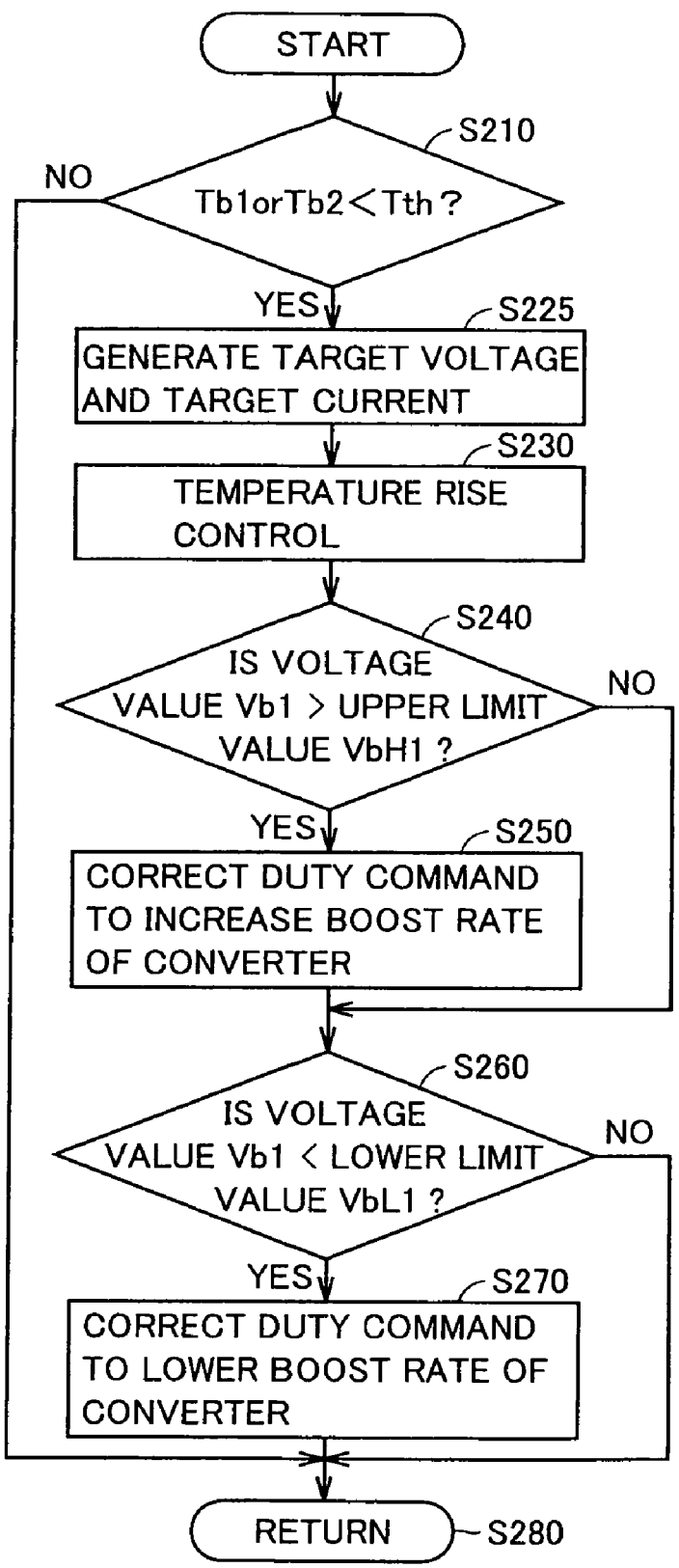
FIG. 23 is a flowchart showing temperature rise control by a converter ECU according to the ninth embodiment.

FIG. 23 is a flowchart showing the temperature rise control by converter ECU 2 according to the ninth embodiment. The process shown in this flowchart is also called from a main routine at regular time intervals or when a certain condition is established (at the time of the start-up of the system, for example), and then executed.

With reference to FIG. 23, as compared with the flowchart shown in FIG. 19, this flowchart includes step S225 instead of step S220. That is, when it is determined that temperature Tb1 or Tb2 is lower than threshold temperature Tth in step S210, converter ECU 2 generates target voltage VR1 and target current IR1 (step S225). More specifically, converter ECU 2 sets target voltage VR1 within an allowable range of voltage value Vh (Vb1≦Vh≦Vh_max), and converts the sign of target current IR1 in a certain cycle.

Thus, converter ECU 2 controls converter 8-1 in such a way that current value Ib1 follows target current IR1 (current FB control). Thus, an electric power flows between power storage devices 6-1 and 6-2 through main positive bus MPL and main negative bus MNL based on the target current IR1, and then the temperature rise control of power storage devices 6-1 and 6-2 is executed.

A value of target current IR1 may be a predetermined value or may be a value provided by dividing a discharge allowable electric power or charge allowable electric power of power storage device 6-1 calculated based on state quantity SOC1 of power storage device 6-1 by voltage value Vb1.

The correction processes executed in steps S240 to S270 are the same as those in the seventh embodiment.

As described above, according to the ninth embodiment, since temperature rise control unit 44G is configured by the current control system, the current value (electric power value) exchanged between power storage devices 6-1 and 6-2 at the temperature rise control time can be set. Therefore, according to the ninth embodiment, the management of SOC of power storage devices 6-1 and 6-2 during the temperature rise control can be easy. In addition, the temperature rise speed can be controlled based on the value of the target current.

Tenth Embodiment

According to a tenth embodiment, the function to correct target current IR1 when voltage value Vb1 of power storage device 6-1 gets out of the range of the upper and lower limits is added to the constitution of the temperature rise control unit in the ninth embodiment.

Entire constitutions of a vehicle and a converter ECU according to the tenth embodiment is the same as vehicle 100A and converter ECU 2 shown in FIGS. 17 and 3.

Figure 24:
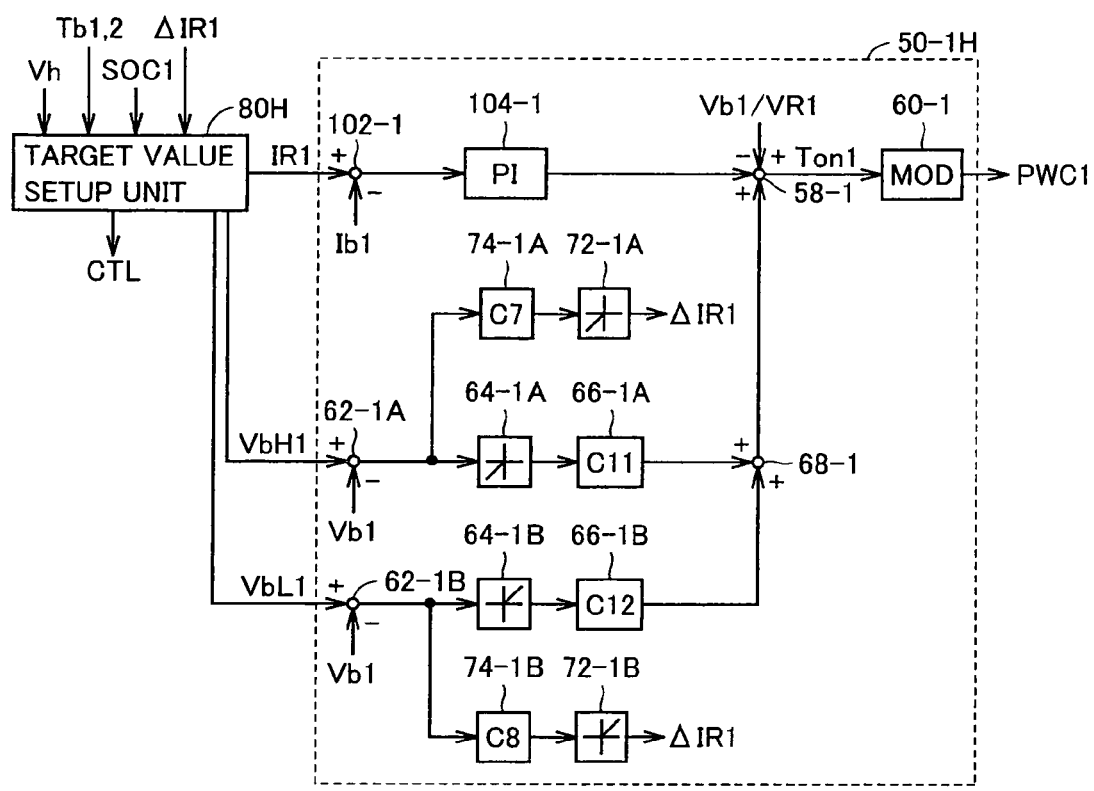
FIG. 24 is a detailed functional block diagram showing a temperature rise control unit according to a tenth embodiment.

FIG. 24 is a detailed functional block diagram showing a temperature rise control unit according to the tenth embodiment. With reference to FIG. 24, a temperature rise control unit 44H includes a first control unit 50-1H and a target value setup unit 80H. A constitution of first control unit 50-1H is the same as first control unit 50-1D shown in FIG. 11 except that switching unit 56-1 is not provided.

Target value setup unit 80H corrects target current IR1 by subtracting correction value ΔIR1 from target current IR1. Other functions of target value setup unit 80H are the same as those of target value setup unit 80G shown in FIG. 22.

Figure 25:
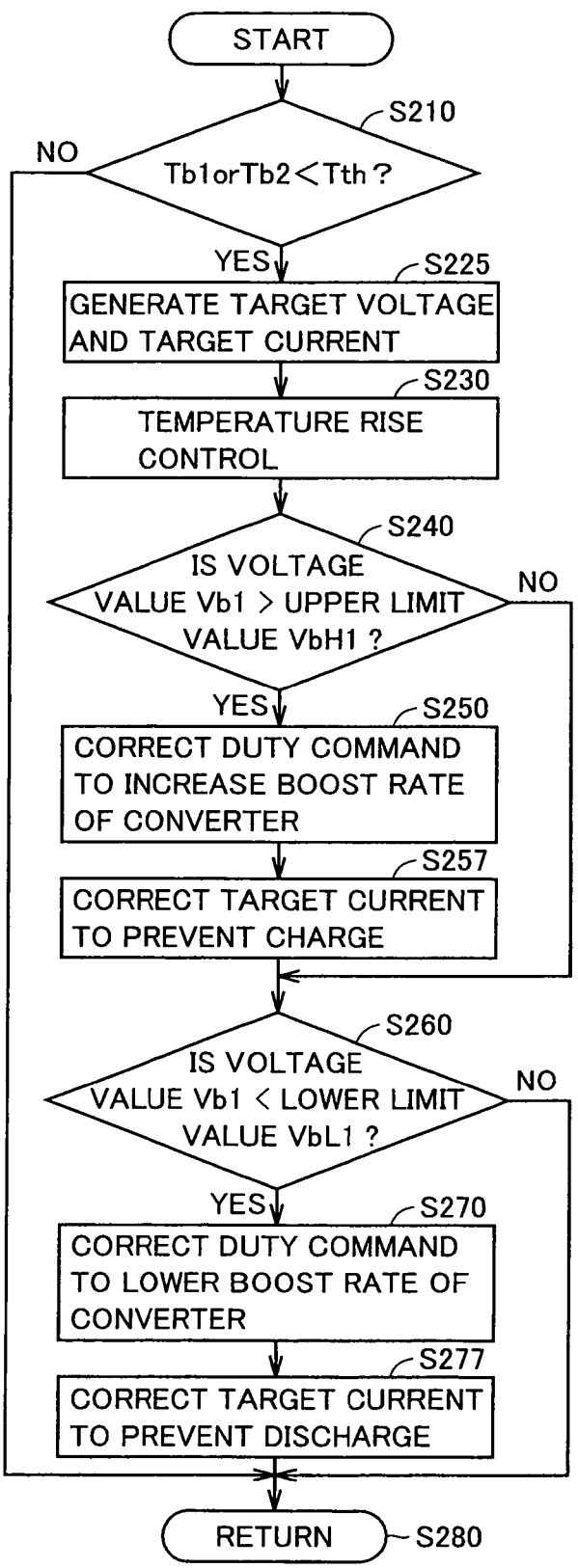
FIG. 25 is a flowchart showing temperature rise control by a converter ECU according to the tenth embodiment.

FIG. 25 is a flowchart showing the temperature rise control by converter ECU 2 according to the tenth embodiment. The process shown in this flowchart also is called from a main routine at regular time intervals or when a certain condition is established (at the time of the start-up of the system, for example), and then executed.

With reference to FIG. 25, as compared with the flowchart shown in FIG. 23, this flowchart further includes step S257 and S277. That is, when duty command Ton1 is corrected to increase the boost rate of converter 8-1 in step S250, converter ECU 2 corrects target current IR1 to prevent the charge to power storage device 6-1 (step S257).

This step S257 is executed by correction value calculation unit 74-1A and filter 72-1A of first control unit 50-1H, and target value setup unit 80H. That is, when voltage value Vb1 exceeds upper limit voltage value VbH1, the output of subtraction unit 62-1A becomes a negative value, and correction value calculation unit 74-1A outputs a negative correction amount. Thus, negative correction value ΔIR1 is outputted from filter 72-1A, and target value setup unit 80H subtracts correction value ΔIR1 from target current IR1. Here, since voltage value Vb1 exceeds upper limit voltage value VbH1 when target current IR1 is the negative value, the subtraction of negative correction value ΔIR1 from target current IR1 corresponds to reduction of target current IR1 (negative value). That is, target current IR1 is corrected to prevent the charge to power storage device 6-1.

Thus, the charge current of power storage device 6-1 is decreased and voltage value Vb1 can be prevented from exceeding upper limit voltage value VbH1 again.

In addition, when duty command Ton1 is corrected to lower the boost rate of converter 8-1 in step S270, converter ECU 2 corrects target current IR1 to prevent the discharge from power storage device 6-1 (step S277).

This step S277 is executed by correction value calculation unit 74-1B and filter 72-1B of first control unit 50-1H, and target value setup unit 80H. That is, when voltage value Vb1 falls below lower limit voltage value VbL1, the output of subtraction unit 62-1B is a positive value and correction value calculation unit 74-1B outputs a positive correction amount. Thus, positive correction value ΔIR1 is outputted from filter 72-1B, and target value setup unit 80H subtracts correction value ΔIR1 from target current IR1. Here, since voltage value Vb1 falls below lower limit voltage value VbL1 when target current IR1 is the positive value, the subtraction of positive correction value ΔIR1 from target current IR1 corresponds to reduction of target current IR1 (positive value). That is, target current IR1 is corrected to prevent the discharge from power storage device 6-1.

Thus, the discharge current from power storage device 6-1 is decreased and voltage value Vb1 can be prevented from falling below lower limit voltage value VbL1 again.

As described above, according to the tenth embodiment, when voltage value Vb1 of power storage device 6-1 gets out of the range of the upper and lower limits, the duty command of converter 8-1 is corrected and target current IR1 is also corrected. Therefore, according to this tenth embodiment, voltage value Vb1 can be prevented from getting out of the range of the upper and lower limits again.

Eleventh Embodiment

According to each of the above embodiments, when the voltage of the power storage device gets out of the range of the upper and lower limits during the temperature rise control, the duty command of the corresponding converter is corrected such that the voltage of the power storage device falls within the range of the upper and lower limits. Meanwhile, according to the following embodiments including this eleventh embodiment, a target value of the voltage control system or the current control system is generated such that the voltage of the power storage device becomes the upper limit voltage value or the lower limit voltage value. Thus, the electric power exchanged between the power storage devices can be maximized and the temperature of the power storage device can be raised immediately.

Figure 26:
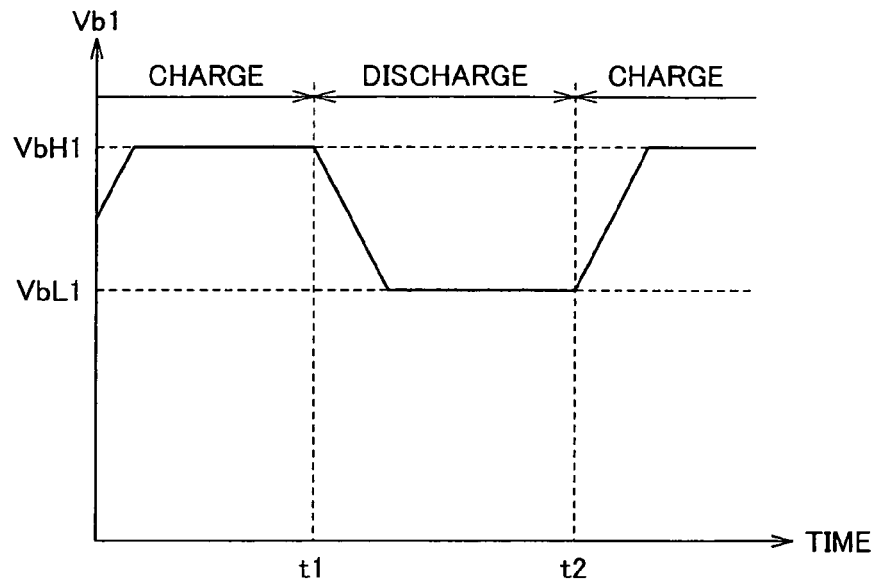
FIG. 26 is a view showing shift of a voltage of power storage device during temperature rise control.

FIG. 26 is a view showing the shift of the voltage of the power storage device during the temperature rise control. The shift of the voltage of power storage device 6-1 is represen- tatively shown in FIG. 26. With reference to FIG. 26, a horizontal axis designates a time, and a vertical axis designates voltage value Vb1 of power storage device 6-1 during the temperature rise control. When power storage device 6-1 is switched from the charge side to the discharge side at a time t 1, the target value of converter 8-1 is adjusted such that voltage value Vb1 becomes lower limit voltage value VbL1. Therefore, the discharged electric power of power storage device 6-1 is maximized without falling below lower limit voltage value VbL1, so that the temperature of the power storage device can be raised immediately.

Meanwhile, when power storage device 6-1 is switched from the discharge side to the charge side at a time t2, the target value of converter 8-1 is adjusted such that voltage value Vb1 becomes upper limit voltage value VbH1. Therefore, the charged electric power of power storage device 6-1 is maximized without exceeding upper limit voltage value VbH1, so that the temperature of the power storage device can be raised immediately similar to the case of the discharge.

Since it is necessary to control power storage device 6-2 similarly to power storage device 6-1, the target value on the safe side is selected from the target value based on voltage value Vb1 of power storage device 6-1 and the gadget value based on voltage value Vb2 of power storage device 6-2 in practice as will be described later. In other words, the target values of converters 8-1 and 8-2 are generated such that when the voltage value of the one power storage device is controlled to be the upper limit voltage value or the lower limit voltage value, the voltage value of the other power storage device is to be within the range of the upper and lower limits.

This eleventh embodiment corresponds to the first embodiment and its variation, and a temperature rise control unit is configured by the voltage control system. Thus, according to the eleventh embodiment, a target voltage of the voltage control system is generated such that a voltage of a power storage device becomes the upper limit voltage value or the lower limit voltage value.

Entire constitutions of a vehicle and a converter ECU according to the eleventh embodiment are the same as vehicle 100 shown in FIG. 1 and converter ECU 2 shown in FIG. 3. In addition, an entire constitution of a temperature rise control unit is the same as temperature rise control unit 44 (or 44A) shown in FIG. 4 (or FIG. 6).

Figure 27:
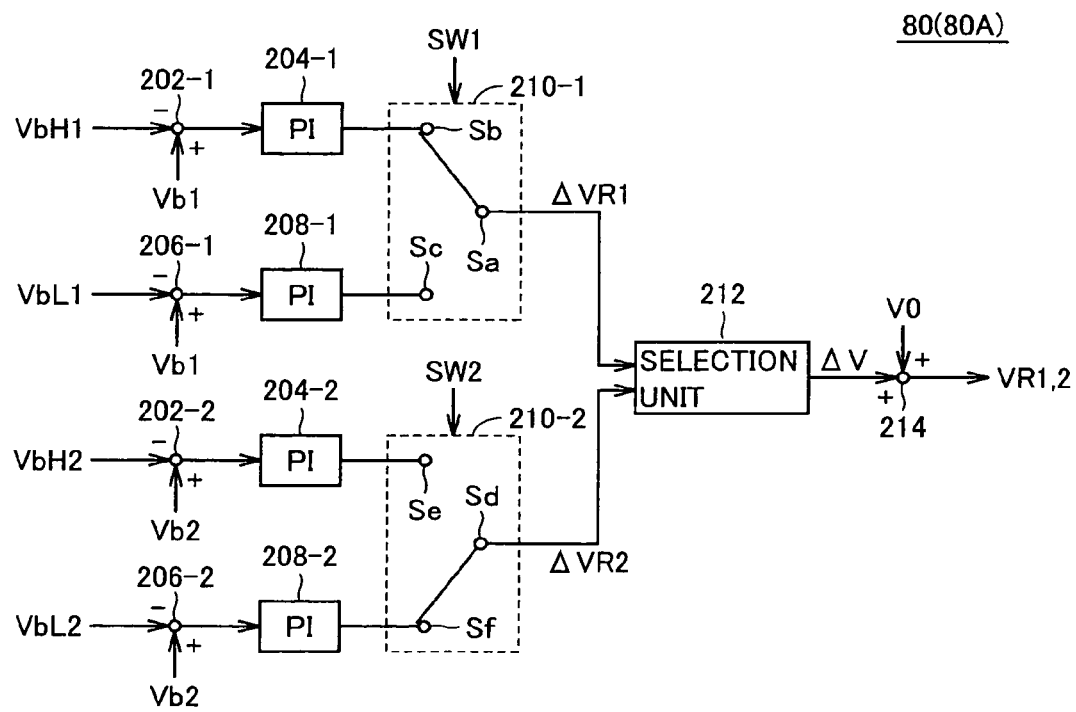
FIG. 27 is a functional block diagram showing a target value setup unit according to an eleventh embodiment.

FIG. 27 is a functional block diagram showing target value setup unit 80 (or 80A) according to the eleventh embodiment. With reference to FIG. 27, target value setup unit 80 (or 80A) includes subtraction units 202-1, 202-2, 206-1, and 206-2, PI control units 204-1, 204-2, 208-1, and 208-2, switches 210-1 and 210-2, a selection unit 212, and a addition unit 214.

Subtraction unit 202-1 subtracts upper limit voltage value VbH1 of power storage device 6-1 from voltage value Vb1 of power storage device 6-1, and outputs the calculated result to PI control unit 204-1. PI control unit 204-1 performs a proportional integral calculation using a deviation of voltage value Vb1 and upper limit voltage value VbH1 as its input, and outputs the calculated result to the switch 210-1. Subtraction unit 206-1 subtracts lower limit voltage value VbL1 of power storage device 6-1 from voltage value Vb1, and outputs the calculated result to PI control unit 208-1. PI control unit 208-1 performs a proportional integral calculation using a deviation of voltage value Vb1 and lower limit voltage value VbL1 as its input, and outputs the calculated result to the switch 210-1.

When switching signal SW1 is inactivated, that is, when power storage device 6-1 is on the charge side, switch 210-1 outputs the output from PI control unit 204-1 to selection unit 212 as correction value ΔVR1. Meanwhile, when switching signal SW1 is activated, that is, when power storage device 6-1 is on the discharge side, switch 210-1 outputs the output from PI control unit 208-1 to selection unit 212 as correction value ΔVR1.

Since constitution and operation of a circuit including subtraction units 202-2 and 206-2, PI control units 204-2 and 208-2, and switch 210-2 are the same as those of the circuit including subtraction units 202-1 and 206-1, PI control units 204-1 and 208-1, and switch 210-1, their description will not be repeated.

Selection unit 212 selects the one having a smaller absolute value from the correction value ΔVR1 from switch 210-1 and correction value ΔVR2 from switch 210-2, and outputs the selected value to addition unit 214 as correction value ΔV. The addition unit 214 adds correction value ΔV from the selection unit 212 to an initial value V0 of the target voltage, and sets the calculated result as target voltages VR1 and VR2 of converters 8-1 and 8-2. The one having the smaller absolute value is selected from correction values ΔVR1 and ΔVR2 as the correction value of the target voltage because when the voltage of the one power storage device is controlled to be the upper limit voltage value or the lower limit voltage value, the voltage of the other power storage device is to be within the range of the upper and lower limits.

Figure 28:
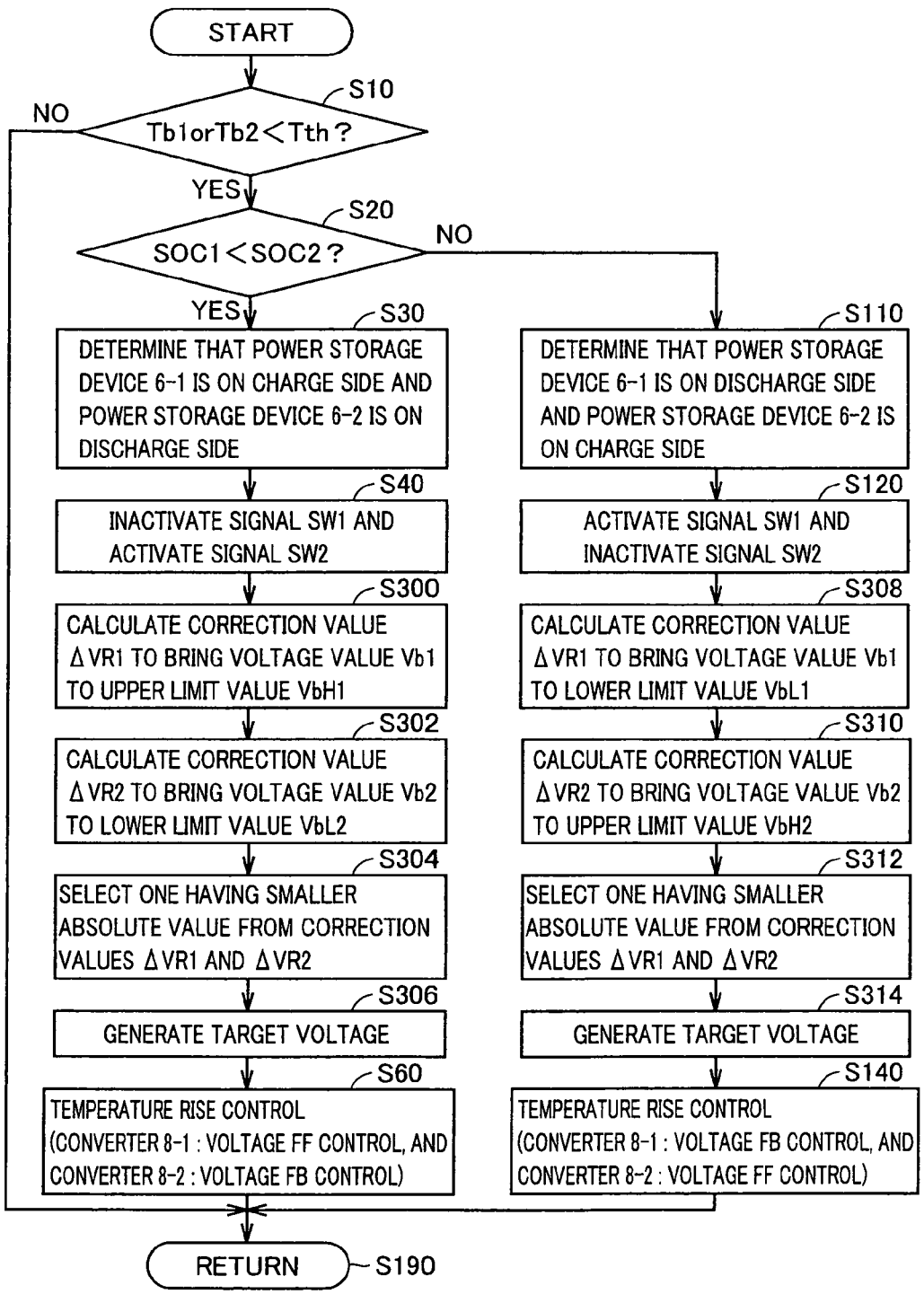
FIG. 28 is a flowchart showing temperature rise control by a converter ECU according to the eleventh embodiment.

FIG. 28 is a flowchart showing the temperature rise control by converter ECU 2 according to the eleventh embodiment. The processes shown in this flowchart is also called from a main routine at regular time intervals or when a predetermined condition is established (when a system is started, for example), and then executed.

With reference to FIG. 28, as compared with the flowchart shown in FIG. 5, this flowchart is not provided with step S70 to S100, and S150 to S180, and includes step S300 to S306 instead of step S50, and includes step S308 to S314 instead of step S130.

More specifically, when switching signal SW1 is inactivated and switching signal SW2 is activated in step S40, converter ECU 2 calculates correction value ΔVR1 to bring voltage value Vb1 of power storage device 6-1 to upper limit voltage value VbH1 (step S300). Furthermore, converter ECU 2 calculates correction value ΔVR2 to bring voltage value Vb2 of power storage device 6-2 to lower limit voltage value VbL2 (step S302).

Then, converter ECU 2 selects the one having the smaller absolute value from correction values ΔVR1 and ΔVR2 as correction value ΔV (step S304). Then, converter ECU 2 adds correction value ΔV to initial value V0 of the target voltage and generates target voltages VR1 and VR2 of converters 8-1 and 8-2 (step S306).

Thus, converter ECU 2 controls converter 8-1 by the voltage FF control based on target voltage VR1, and controls converter 8-2 by the voltage FB control based on target voltage VR2 to execute the temperature rise control in step S60.

In addition, when switching signal SW1 is activated and switching signal SW2 is inactivated in step S120, converter ECU 2 calculates correction value ΔVR1 to bring voltage value Vb1 of power storage device 6-1 to lower limit voltage value VbL1 (step S308). Furthermore, converter ECU 2 calculates correction value ΔVR2 to bring voltage value Vb2 of power storage device 6-2 to upper limit voltage value VbH2 (step S310).

Then, converter ECU 2 selects the one having the smaller absolute value from correction values ΔVR1 and ΔVR2 as correction value ΔV (step S312). Then, converter ECU 2 adds correction value ΔV to initial value V0 of the target voltage and generates target voltages VR1 and VR2 of converters 8-1 and 8-2 (step S314).

Thus, converter ECU 2 controls converter 8-1 by the voltage FB control based on target voltage VR1, and controls converter 8-2 by the voltage FF control based on target voltage VR2 to execute the temperature rise control in step S140.

As described above, according to the eleventh embodiment, the temperature rise control unit is configured by the voltage control system and the target voltage of the voltage control system is generated such that the voltage of the power storage device becomes the upper limit voltage value or the lower limit voltage value. Therefore, the electric power exchanged between the power storage devices can be maximized and the temperature of the power storage device can be raised immediately.

Variation

Figure 29:
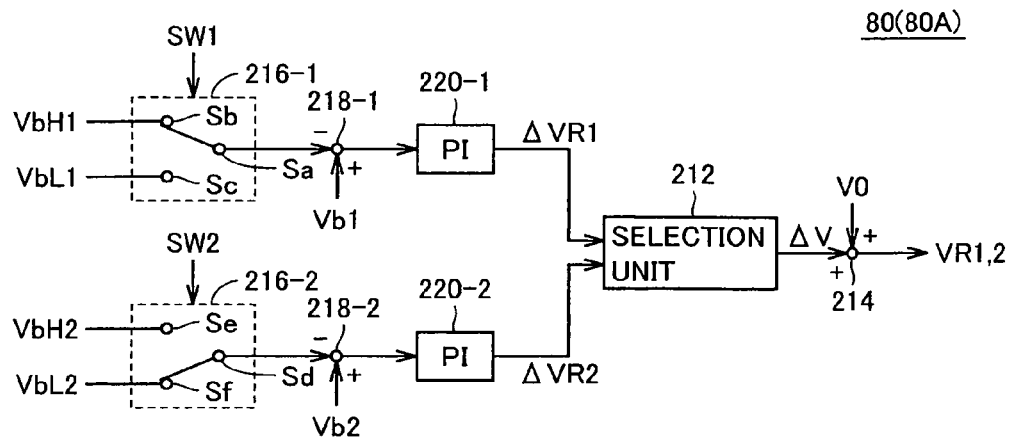
FIG. 29 is a functional block diagram showing a target value setup unit according to a variation of the eleventh embodiment.

FIG. 29 is a functional block diagram showing target value setup unit 80 (or 80A) according to a variation of the eleventh embodiment. With reference to FIG. 29, target value setup unit 80 (or 80A) includes switches 216-1 and 216-2, subtraction units 218-1 and 218-2, PI control units 220-1 and 220-2, selection unit 212, and addition unit 214.

When switching signal SW1 is inactivated, switch 216-1 outputs upper limit voltage value VbH1 to subtraction unit 218-1. Meanwhile, when switching signal SW1 is activated, switch 216-1 outputs lower limit voltage value VbL1 to subtraction unit 218-1. Subtraction unit 218-1 subtracts the output of switch 216-1 from voltage value Vb1, and outputs the calculated result to PI control unit 220-1. PI control unit 220-1 performs a proportional integral calculation using a deviation of voltage value Vb1 and the output from switch 216-1 as its input, and outputs the calculated result to the selection unit 212 as correction value ΔVR1.

Since constitution and operation of a circuit including switch 216-2, subtraction unit 218-2, and PI control unit 220-2 are the same as those of the circuit including switch 216-1, subtraction unit 211-2 and PI control unit 220-1, their description will not be repeated. In addition, selection unit 212 and addition unit 214 are the same as those described in the eleventh embodiment.

According to this variation also, the target voltage of the voltage control system is generated such that the voltage of the power storage device becomes the upper limit voltage value or the lower limit voltage value, and the same effect as in the eleventh embodiment can be achieved. Thus, according to this variation, the calculation amount of the target value setup unit can be decreased as compared with the eleventh embodiment.

Twelfth Embodiment

This twelfth embodiment corresponds to the third embodiment, and a temperature rise control unit is configured by the current control system. Thus, according to the twelfth embodiment, a target current of the current control system is generated such that the voltage of the power storage device becomes the upper limit voltage value or the lower limit voltage value.

Entire constitutions of a vehicle and converter ECU according to the twelfth embodiment are the same as vehicle 100 shown in FIG. 1 and converter ECU 2 shown in FIG. 3. In addition, an entire constitution of the temperature rise control unit is the same as temperature rise control unit 44C shown in FIG. 9.

Figure 30:
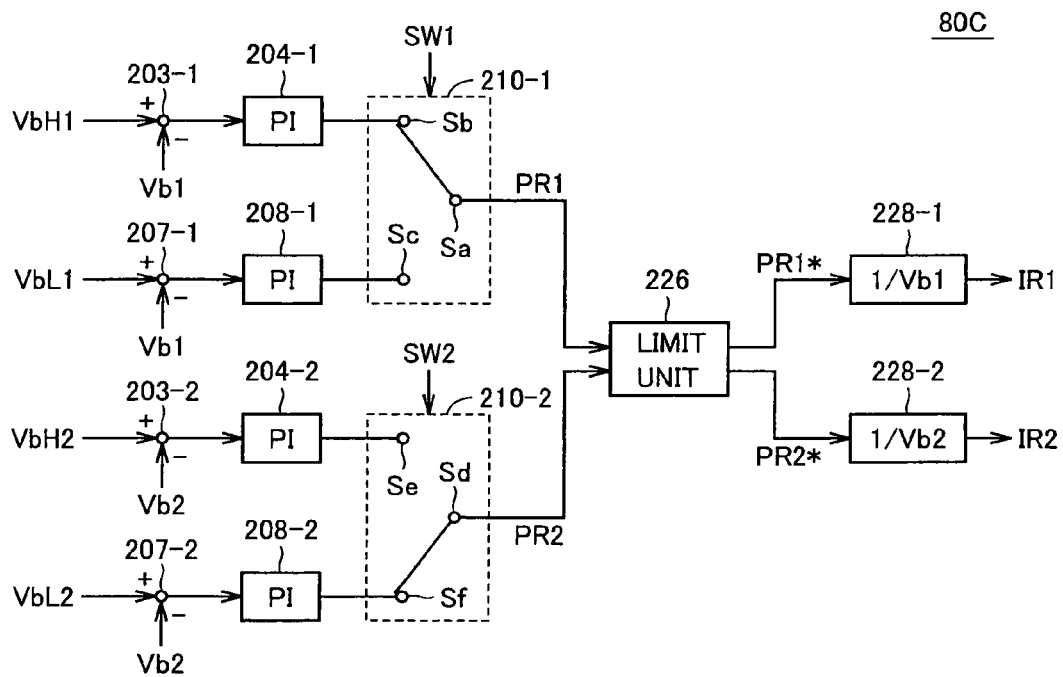
FIG. 30 is a functional block diagram showing a target value setup unit according to a twelfth embodiment.

FIG. 30 is a functional block diagram showing target value setup unit 80C according to the twelfth embodiment. With reference to FIG. 30, as compared with the constitution of target value setup unit 80 (or 80A) according to the eleventh embodiment shown in FIG. 27, target value setup unit 80C includes subtraction units 203-1, 207-1, 203-2, and 207-2, instead of subtraction units 202-1, 206-1, 202-2, and 206-2, and limit unit 226, and division units 228-1 and 228-2 instead of selection unit 212, and addition unit 214.

Subtraction unit 203-1 subtracts voltage value Vb1 of power storage device 6-1 from upper limit voltage value VbH1 of power storage device 6-1, and outputs the calculated result to PI control unit 204-1. Subtraction unit 207-1 subtracts voltage value Vb1 from lower limit voltage value VbL1 of power storage device 6-1, and outputs the calculated result to PI control unit 208-1. Subtraction units 203-2 and 207-2 for power storage device 6-2 are the same as those of subtraction units 203-1 and 207-1.

Limit unit 226 receives the output from switch 210-1 as a first electric power command value PR1, and receives the output from switch 210-2 as a second electric power command value PR2. Thus, limit unit 226 limits the absolute values of first and second electric power command values PR1 and PR2 to the one having a smaller absolute value. Division unit 228-1 divides a first electric power command value PR1* from limit unit 226 by voltage value Vb1 of power storage device 6-1, and sets the calculated result as target current IR1 of converter 8-1. In addition, division unit 228-2 divides a second electric power command value PR2* from limit unit 226 by voltage value Vb2 of power storage device 6-2, and sets the calculated result as target current IR2 of converter 8-2. The absolute values of the first and second electric power command values PR1 and PR2 are limited to the one having the smaller absolute value because when the voltage of the one power storage device is controlled to be the upper limit voltage value or the lower limit voltage value, the voltage of the other power storage device is to be within the range of the upper and lower limits.

Figure 31:
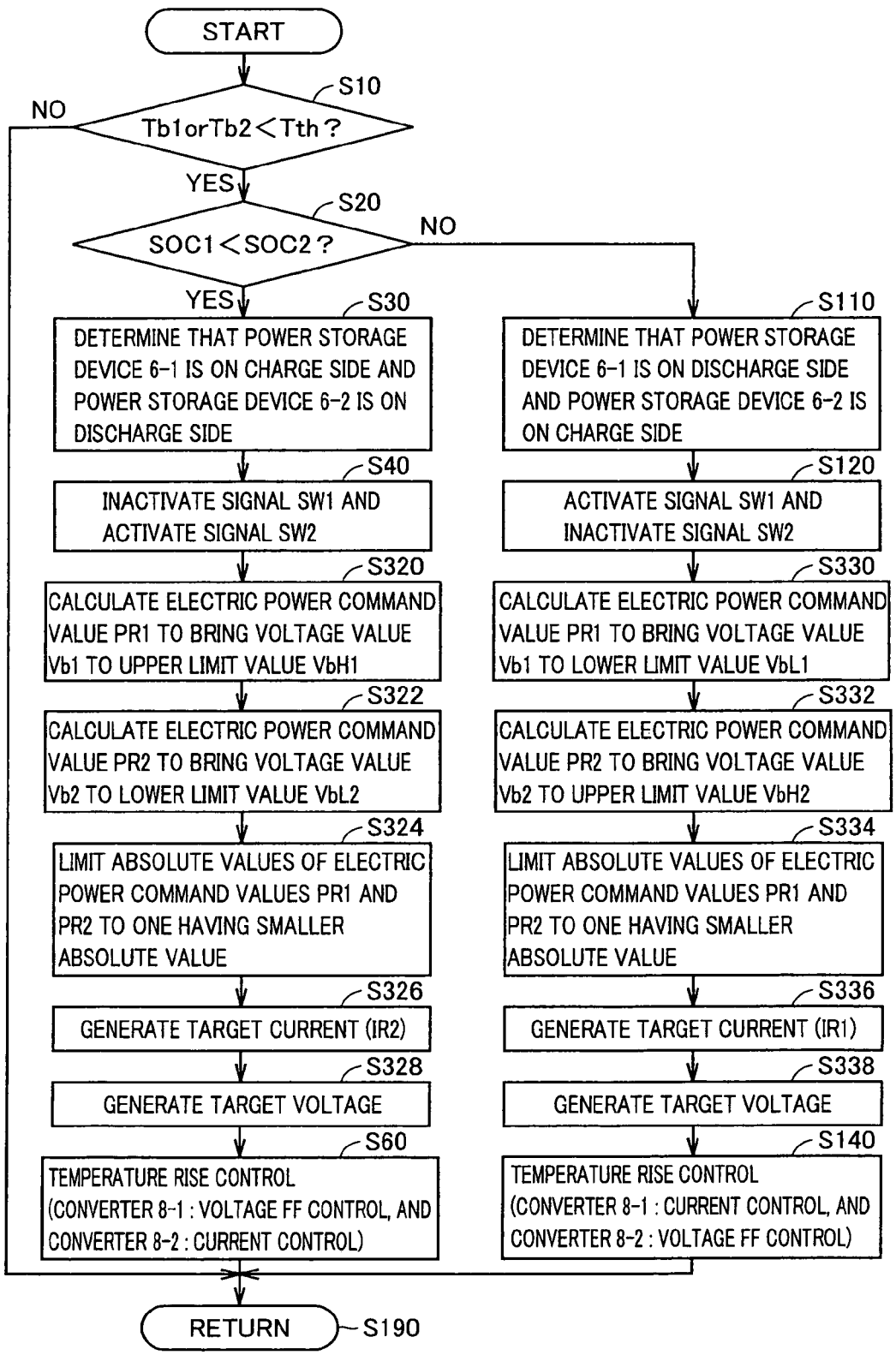
FIG. 31 is a flowchart showing temperature rise control by a converter ECU according to the twelfth embodiment.

FIG. 31 is a flowchart showing the temperature rise control by converter ECU 2 according to the twelfth embodiment. The processes shown in this flowchart is also called from a main routine at regular time intervals or when a predetermined condition is established (when a system is started, for example), and then executed.

With reference to FIG. 31, as compared with the flowchart shown in FIG. 10, this flowchart is not provided with step S70 to S100, and S150 to S180, and includes step S320 to S328 instead of step S55, and includes step S330 to S338 instead of step S135.

More specifically, when switching signal SW1 is inactivated and switching signal SW2 is activated in step S40, converter ECU 2 calculates first electric power command value PR1 to bring voltage value Vb1 of power storage device 6-1 to upper limit voltage value VbH1 (step S320). Furthermore, converter ECU 2 calculates second electric power command value PR2 to bring voltage value Vb2 of power storage device 6-2 to lower limit voltage value VbL2 (step S322).

Then, converter ECU 2 limits the absolute values of first and second electric power command values PR1 and PR2 to the one having the smaller absolute value (step S324). Then, converter ECU 2 divides second electric power command value PR2 by voltage value Vb2 of power storage device 6-2, and generates target current IR2 of converter 8-2 (step S326).

Thus, converter ECU 2 generates target voltages VR1 and VR2 (step S328) and then controls converter 8-1 by the voltage FF control and controls converter 8-2 by the current control based on target current IR2 to execute the temperature rise control in step S60.

In addition, when switching signal SW1 is activated and switching signal SW2 is inactivated in step S120, converter ECU 2 calculates first electric power command value PR1 to bring voltage value Vb1 of power storage device 6-1 to lower limit voltage value VbL1 (step S330). Furthermore, converter ECU 2 calculates second electric power command value PR2 to bring voltage value Vb2 of power storage device 6-2 to upper limit voltage value VbH2 (step S332).

Then, converter ECU 2 limits the absolute values of first and second electric power command values PR1 and PR2 to the one having the smaller absolute value (step S334). Then, converter ECU 2 divides first electric power command value PR1 by voltage value Vb1 of power storage device 6-1, and generates target current IR1 of converter 8-1 (step S336).

Thus, converter ECU 2 generates target voltages VR1 and VR2 (step S338) and then controls converter 8-1 by the current control based on target current IR1 and controls converter 8-2 by the voltage FF control to execute the temperature rise control in step S140.

As described above, according to the twelfth embodiment, the temperature rise control unit is configured by the current control system, and the target current of the current control system is generated such that voltage of the power storage device becomes the upper limit voltage value or the lower limit voltage value. Therefore, according to the twelfth embodiment, the electric power exchanged between the power storage devices can be maximized, and the temperature of the power storage device can be raised immediately.

Variation

Figure 32:
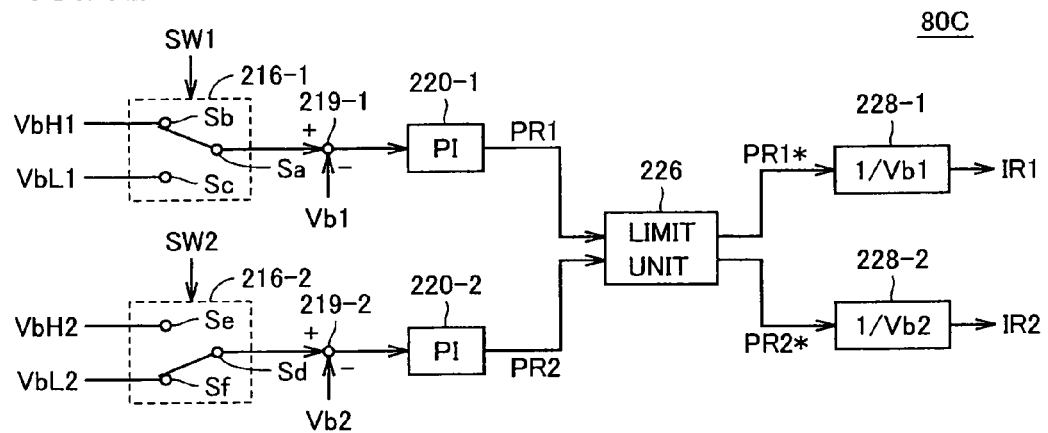
FIG. 32 is a functional block diagram showing a target value setup unit according to a variation of the twelfth embodiment.

FIG. 32 is a functional block diagram showing target value setup unit 80C according to a variation of the twelfth embodiment. With reference to FIG. 32, as compared with target value setup unit 80 (or 80A) according to the eleventh embodiment shown in FIG. 29, target value setup unit 80C includes subtraction units 219-1 and 219-2 instead of subtraction units 218-1 and 218-2, and limit unit 226, and division units 228-1 and 228-2 instead of selection unit 212 and addition unit 214.

Subtraction unit 219-1 subtracts voltage value Vb1 from the output of switch 216-1, and outputs the calculated result to PI control unit 220-1. Subtraction unit 219-2 subtracts voltage value Vb2 from the output of switch 216-2, and outputs the calculated result to PI control unit 220-2. In addition, limit unit 226 and division units 228-1 and 228-2 are the same as those described in the twelfth embodiment.

According to this variation also, the target current of the current control system is generated such that the voltage of the power storage device becomes the upper limit voltage value or the lower limit voltage value, and the same effect as in the twelfth embodiment can be achieved. Thus, according to this variation, the calculation amount of the target value setup unit can be decreased as compared with the twelfth embodiment.

Thirteenth Embodiment

This thirteenth embodiment corresponds to the fifth embodiment, and one converter is controlled by the current control, and the other converter is controlled by the voltage control during the temperature rise control. Thus, according to the thirteenth embodiment, a target current of the current control system is generated such that the voltage of the power storage device becomes the upper limit voltage value or the lower limit voltage value.

Entire constitutions of a vehicle and converter ECU according to the thirteenth embodiment are the same as vehicle 100 shown in FIG. 1 and converter ECU 2 shown in FIG. 3. In addition, an entire constitution of a temperature rise control unit is the same as temperature rise control unit 44I shown in FIG. 13.

Figure 33:
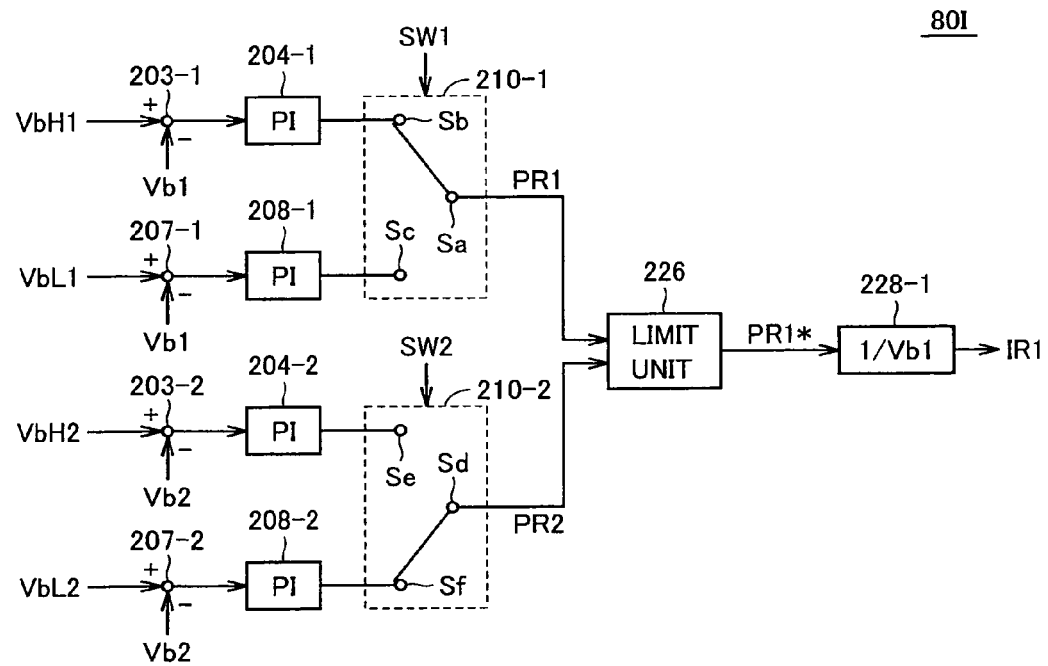
FIG. 33 is a functional block diagram showing a target value setup unit according to a thirteenth embodiment.

FIG. 33 is a functional block diagram showing target value setup unit 80I according to the thirteenth embodiment. With reference to FIG. 33, as compared with target value setup unit 80C according to the twelfth embodiment shown in FIG. 30, target value setup unit 80I does not include division units 228-2. Target value setup unit 80I does not include division unit 228-2 because it is not necessary to calculate target current IR2 as converter 8-2 is controlled by the voltage control.

Figure 34:
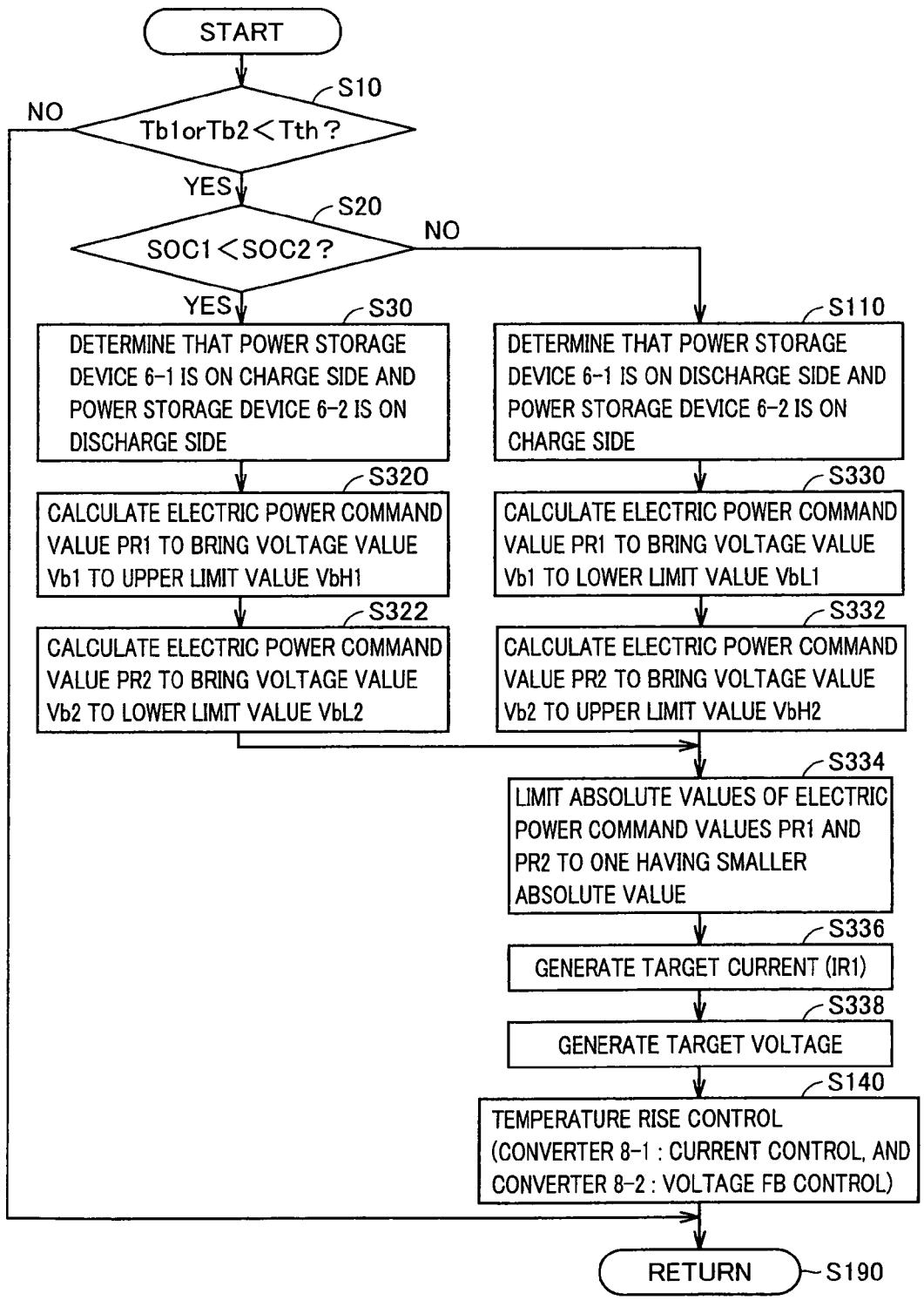
FIG. 34 is a flowchart showing temperature rise control by a converter ECU according to the thirteenth embodiment.

FIG. 34 is a flowchart showing the temperature rise control by converter ECU 2 according to the thirteenth embodiment. The processes shown in this flowchart is also called from a main routine at regular time intervals or when a predetermined condition is established (when a system is started, for example), and then executed.

With reference to FIG. 34, as compared with the flowchart shown in FIG. 31, this flowchart is not provided with step S324 to S328, and S60. Thus, when second electric power command value PR2 is calculated in step S322, converter ECU 2 moves the process to step S334. Thus, converter ECU 2 executes the processes in step S334 to S338, and then controls converter 8-1 by the current control based on target current IR1, and controls converter 8-2 by the voltage FF control to execute the temperature rise control in step S140.

Although converter 8-1 is controlled by the current control and converter 8-2 is controlled by the voltage FB control in the above, converter 8-2 may be controlled by the current control and converter 8-1 may be controlled by the voltage FB control.

As described above, according to the thirteenth embodiment, the target current of the current control system is generated such that voltage of the power storage device becomes the upper limit voltage value or the lower limit voltage value. Therefore, according to the thirteenth embodiment, the electric power exchanged between the power storage devices can be maximized, and the temperature of the power storage device can be raised immediately.

Variation

Figure 35:
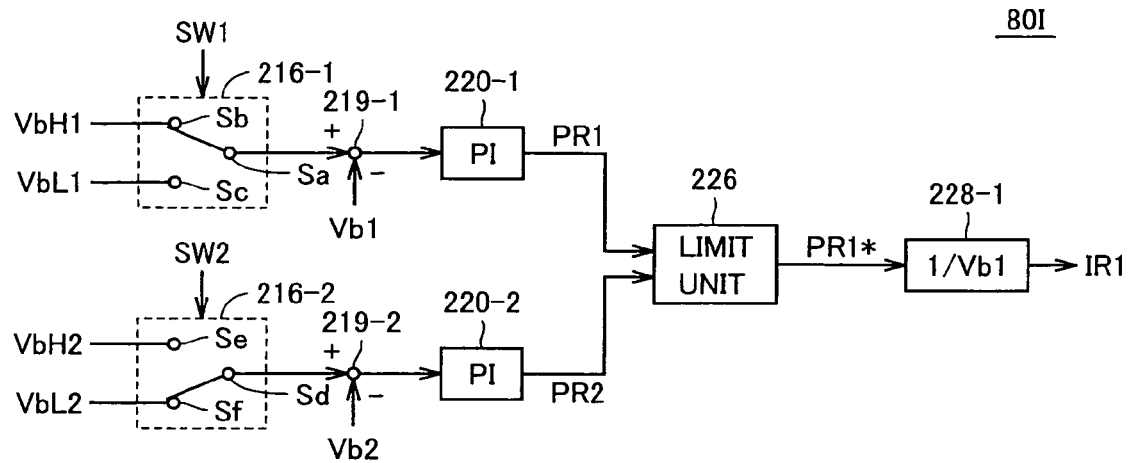
FIG. 35 is a functional block diagram showing a target value setup unit according to a variation of the thirteenth embodiment.

FIG. 35 is a functional block diagram showing target value setup unit 80I according to a variation of the thirteenth embodiment. With reference to FIG. 35, as compared with target value setup unit 80C according to the twelfth embodiment shown in FIG. 32, target value setup unit 80I does not include division units 228-2. Target value setup unit 80I does not include division unit 228-2 for the same reason described in the thirteenth embodiment.

According to this variation also, the target current of the current control system is generated such that the voltage of the power storage device becomes the upper limit voltage value or the lower limit voltage value, and the same effect as in the thirteenth embodiment can be achieved. Thus, according to this variation, the calculation amount of the target value setup unit can be decreased as compared with the thirteenth embodiment.

Fourteenth Embodiment

This fourteenth embodiment corresponds to the seventh embodiment, and target voltage VR1 is generated such that the voltage of the power storage device 6-1 becomes the upper limit voltage value or the lower limit voltage value similar to the first embodiment and the eleventh embodiment corresponding to the variation thereof.

Entire constitutions of a vehicle and converter ECU according to the fourteenth embodiment are the same as vehicle 100A shown in FIG. 17 and converter ECU 2 shown in FIG. 3. In addition, an entire constitution of a temperature rise control unit is the same as temperature rise control unit 44E shown in FIG. 18.

Figure 36:
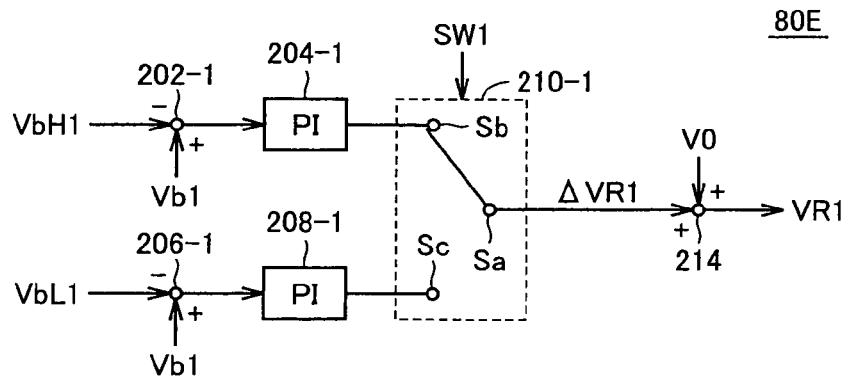
FIG. 36 is a functional block diagram showing a target value setup unit according to a fourteenth embodiment.

FIG. 36 is a functional block diagram showing target value setup unit 80E according to the fourteenth embodiment. With reference to FIG. 36, target value setup unit 80E includes subtraction units 202-1 and 206-1, PI control units 204-1 and 208-1, switch 210-1, and addition unit 214. Addition unit 214 adds correction value ΔVR1 from switch 210-1 to initial value V0 of a target voltage and sets the calculated result as target voltage VR1 of converter 8-1. Subtraction units 202-1 and 206-1, PI control units 204-1 and 208-1, and switch 210-1 are the same as those described in FIG. 27.

Figure 37:
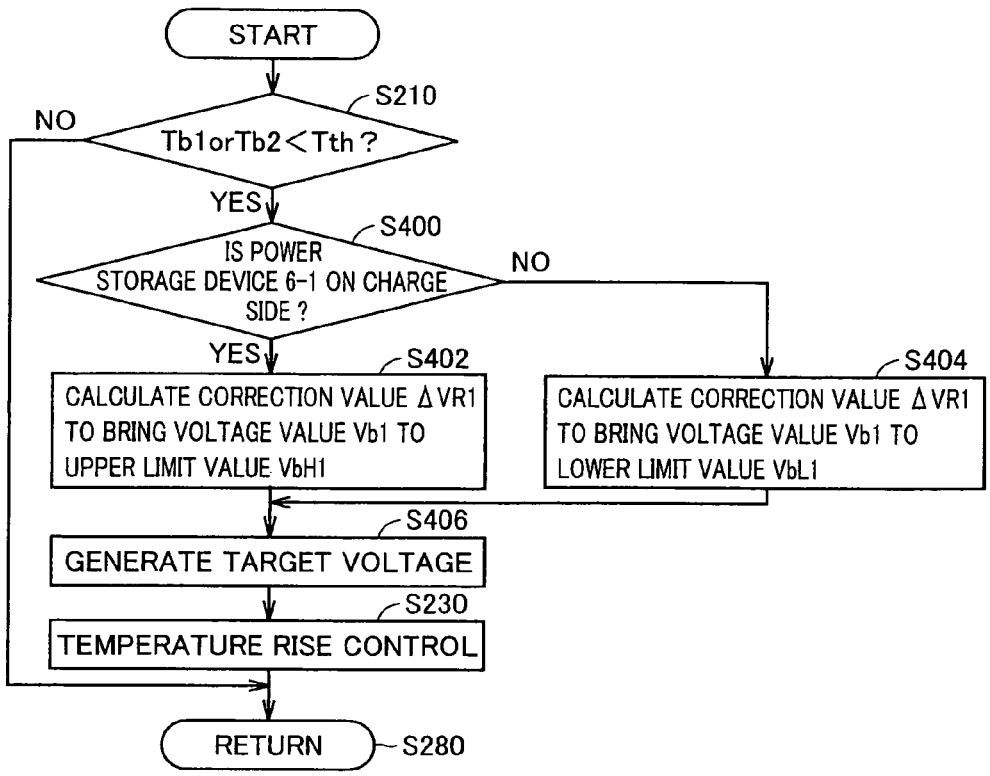
FIG. 37 is a flowchart showing temperature rise control by a converter ECU according to the fourteenth embodiment.

FIG. 37 is a flowchart showing the temperature rise control by converter ECU 2 according to the fourteenth embodiment. The processes shown in this flowchart is also called from a main routine at regular time intervals or when a predetermined condition is established (when a system is started, for example), and then executed.

With reference to FIG. 37, converter ECU 2 determines whether temperature Tb1 or temperature Tb2 is lower than predetermined threshold temperature Tth (−10° C., for example) (step S210). When converter ECU 2 determines that both temperatures Tb1 and Tb2 are not less than threshold temperature Tth (NO in step S210), it moves the process to step S280.

When it is determined that temperature Tb1 or Tb2 is lower than threshold temperature Tth in step S210 (YES in step S210), converter ECU 2 determines whether power storage device 6-1 is the charge side or not based on state quantities SOC1 and SOC2 of power storage devices 6-1 and 6-2 (step S400). Thus, when it is determined that power storage device 6-1 is on the charge side (YES in step S400), converter ECU 2 calculates correction value ΔVR1 to bring voltage value Vb1 of power storage device 6-1 to upper limit voltage value VbH1 (step S402). Meanwhile, when it is determined that power storage device 6-1 is on the discharge side (NO in step S400), converter ECU 2 calculates correction value ΔVR1 to bring voltage value Vb1 to lower limit voltage value VbL1 (step S404).

Thus, converter ECU 2 adds correction value ΔVR1 to initial value V0 of the target voltage and generates target voltage VR1 of converter 8-1 (step S406). Thus, converter ECU 2 controls converter 8-1 by the voltage FB control based on target voltage VR1 to execute the temperature rise control (step S230).

As described above, according to the fourteenth embodiment, the target voltage VR1 is generated such that the voltage of power storage device 6-1 becomes the upper limit voltage value VbH1 or the lower limit voltage value VbL1. Therefore, according to the fourteenth embodiment, the charge and discharge electric power of power storage device 6-1 can be maximized, and the temperature of power storage device 6-1 can be raised immediately.

Variation

Figure 38:
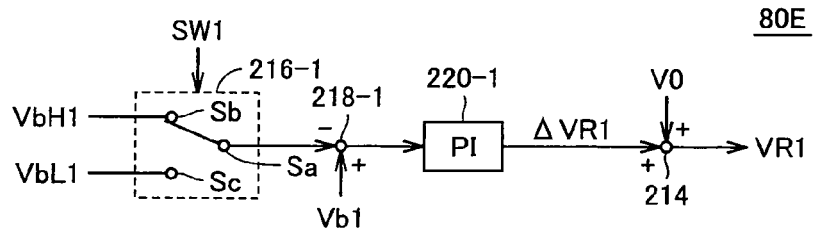
FIG. 38 is a functional block diagram showing a target value setup unit according to a variation of the fourteenth embodiment.

FIG. 38 is a functional block diagram showing target value setup unit 80E according to a variation of the fourteenth embodiment. With reference to FIG. 38, target value setup unit 80 E includes switch 216-1, subtraction unit 218-1, PI control unit 220-1, and addition unit 214. Addition unit 214 adds correction value ΔVR1 from PI control unit 220-1 to initial value V0 of a target voltage, and sets the calculated result as target voltage VR1 of converter 8-1. Switch 216-1, subtraction unit 218-1, and PI control unit 220-1 are the same as those described in FIG. 29.

According to this variation also, target voltage VR1 is generated such that the voltage of power storage device 6-1 becomes upper limit voltage value VbH1 or lower limit voltage value VbL1, and the same effect as in the fourteenth embodiment can be achieved. Thus, according to this variation, the calculation amount of the target value setup unit can be decreased as compared with the fourteenth embodiment.

Fifteenth Embodiment

This fifteenth embodiment corresponds to the ninth embodiment, and target current IR1 is generated to bring the voltage of power storage device 6-1 to the upper limit voltage value or the lower limit voltage value similar to the twelfth embodiment corresponding to the third embodiment.

Entire constitutions of a vehicle and converter ECU according to the fifteenth embodiment are the same as vehicle 100A shown in FIG. 17 and converter ECU 2 shown in FIG. 3. In addition, an entire constitution of a temperature rise control unit is the same as temperature rise control unit 44G shown in FIG. 22.

Figure 39:
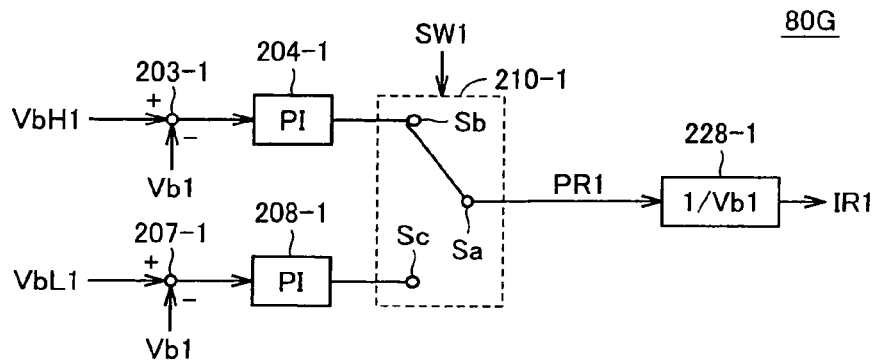
FIG. 39 is a functional block diagram showing a target value setup unit according to a fifteenth embodiment.

FIG. 39 is a functional block diagram showing target value setup unit 80G according to the fifteenth embodiment. With reference to FIG. 39, target value setup unit 80G includes subtraction units 203-1 and 207-1, PI control units 204-1 and 208-1, switch 210-1, and division unit 228-1. Division unit 228-1 receives the output from switch 210-1 as electric power command value PR1. Then, division unit 228-1 divides electric power command value PR1 by voltage value Vb1 of power storage device 6-1, and sets the calculated result as target current IR1 of converter 8-1. Subtraction units 203-1 and 207-1, PI control units 204-1 and 208-1, and switch 210-1 are the same as those described in FIG. 30.

FIG. 40 is a flowchart showing the temperature rise control by converter ECU 2 according to the fifteenth embodiment. The processes shown in this flowchart is also called from a main routine at regular time intervals or when a predetermined condition is established (when a system is started, for example), and then executed.

With reference to FIG. 40, as compared with the flowchart shown in FIG. 37, this flowchart includes steps S410 to S416 instead of steps S402 to S406. That is, when it is determined that power storage device 6-1 is on the charge side in step S400 (YES in step S400), converter ECU 2 calculates electric power command value PR1 to bring voltage value Vb1 of power storage device 6-1 to upper limit voltage value VbH1 (step S410). Meanwhile, when it is determined that power storage device 6-1 is on the discharge side in step S400 (NO in step S400), converter ECU 2 calculates electric power command value PR1 to bring voltage value Vb1 to lower limit voltage value VbL1 (step S412).

Thus, converter ECU 2 divides calculated electric power command value PR1 by voltage value Vb1, and generates target current IR1 of converter 8-1 (step S414). Thus, converter ECU 2 generates target voltage VR1 (step S416) and then controls converter 8-1 by the current control based on target current IR1 to execute the temperature rise control.

As described above, according to the fifteenth embodiment, the target current IR1 is generated to bring the voltage of power storage device 6-1 to the upper limit voltage value VbH1 or the lower limit voltage value VbL1. Therefore, according to the fifteenth embodiment, the charge and discharge electric power of power storage device 6-1 during the temperature rise control can be maximized, and the temperature of power storage device 6-1 can be raised immediately.

Variation

FIG. 41 is a functional block diagram showing target value setup unit 80G according to a variation of the fifteenth embodiment. With reference to FIG. 41, target value setup unit 80G includes switch 216-1, subtraction unit 219-1, PI control unit 220-1, and division unit 228-1. Division unit 228-1 receives the output from switch 220-1 as electric power command value PR1. Then, division unit 228-1 divides electric power command value PR1 by voltage value Vb1 of power storage device 6-1, and sets the calculated result as target current IR1 of converter 8-1. Switch 216-1, subtraction unit 219-1, and PI control unit 220-1 are the same as those described in FIG. 32.

According to this variation also, target current IR1 is generated to bring the voltage of power storage device 6-1 to upper limit voltage value VbH1 or lower limit voltage value VbL1, and the same effect as in the fifteenth embodiment can be achieved. Thus, according to this variation, the calculation amount of the target value setup unit can be decreased as compared with the fifteenth embodiment.

According to each of the above embodiments, target value setup units 80, 80A to 80J may change upper limit voltage values VbH1 and VbH2 and lower limit voltage values VbL1 and VbL2 based on at least one of the temperature and SOC of the corresponding power storage device. For example, target value setup units 80, 80A to 80J may change upper limit voltage value VbH1 and lower limit voltage value VbL1 (or upper limit voltage value VbH2 and lower limit voltage value VbL2) so as to narrow a voltage range determined by upper limit voltage value VbH1 and lower limit voltage value VbL1 (or upper limit voltage value VbH2 and lower limit voltage value VbL2) as the temperature or SOC of power storage device 6-1 (or 6-2) becomes low.

In addition, the function to correct the duty command of the corresponding converter when the voltage of the corresponding power storage device gets out of the range of the upper and lower limits may not be given to the first and second control units to execute the actual voltage control or current control in the above embodiments 11 to 15 and their variations.

The temperature rise control unit in each of the above embodiments may be configured by the circuit having the function corresponding to each block, or may be implemented by executing the processes by converter ECU 2 based on a predetermined program. In the latter case, the above-described control of each temperature rise control unit is executed by a CPU (Central Processing Unit) such that the CPU reads the program to execute the processes shown in the above functional block and flowchart from a ROM (Read Only Memory), and executes the read program and execute the processes based on the above functional block and flowchart. Therefore, the ROM corresponds to a computer (CPU)-readable recording medium having the recorded program to execute the processes shown in the above functional block and flowchart.

Although power supply system 1 includes converters 8-1 and 8-2 corresponding to two power storage devices 6-1 and 6-2, respectively in the above embodiments 1 to 6 and 11 to 13, more power storage devices and converters corresponding to them may be provided. In this case, the temperature rise control can be implemented by the above-described method after any two power storage devices and converters corresponding to them are selected.

In addition, although power supply system 1A includes power storage devices 6-1 and 6-2 in the above embodiments 7 to 10, 14, and 15, more power storage units connected to power storage device 6-2 in parallel may be provided. In this case, the temperature rise control can be implemented by exchanging an electric power between power storage device 6-1 and the plurality of power storage units.

In the above description, main positive bus MPL and main negative bus MNL correspond to an "electric power line" in the present invention, and converter ECU 2 in the above description corresponds to a "control device" in the present invention.

The embodiment disclosed herein is not restrictive but an example in all respects. A scope of the present invention is not shown by the above description but claims. The present invention should include all variations within similar meanings and ranges to the claims.

The invention claimed is:

1. A power supply system capable of supplying an electric power to a load device, comprising:
   first and second power storage devices capable of charging and discharging;
   an electric power line configured to allow an electric power to be exchanged between the power supply system and said load device;
   a first converter provided between said first power storage device and said electric power line to convert a voltage between said first power storage device and said electric power line;
   a second converter provided between said second power storage device and said electric power line to convert a voltage between said second power storage device and said electric power line; and
   a control device to control said first and second converters, wherein
   said control device controls the converter corresponding to the power storage device on a charge side so as to prevent a voltage of the charge-side power storage device from exceeding an upper limit value, and controls the converter corresponding to the power storage device on a discharge side so as to prevent a voltage of the discharge-side power storage device from falling below a lower limit value, during temperature rise control to raise temperature of at least one of said first and second power storage devices by exchanging the electric power between said first and second power storage devices through said first and second converters and said electric power line.

2. The power supply system according to claim 1, wherein said control device includes first and second control units to control said first and second converters, respectively, said first control unit includes:
   a current control unit to control said first converter such that charge and discharge currents of said first power storage device become target currents during said temperature rise control; and
   a first correction unit to correct an output of said current control unit so as to increase a voltage of said electric power line when the voltage of said first power storage device exceeds said upper limit value, and to correct the output of said current control unit so as to lower the voltage of said electric power line when the voltage of said first power storage device falls below said lower limit value, and said second control unit includes:
   a voltage control unit to control said second converter such that the voltage of said electric power line becomes a target voltage during said temperature rise control; and
   a second correction unit to correct an output of said voltage control unit so as to increase the voltage of said electric power line when the voltage of the second power storage device exceeds said upper limit value, and to correct the output of said voltage control unit so as to lower the voltage of said electric power line when the voltage of said second power storage device falls below said lower limit value.

3. The power supply system according to claim 2, wherein said first control unit further includes a third correction unit to correct said target current so as to decrease a charge current to said first power storage device when the voltage of said first power storage device exceeds said upper limit value, and to correct said target current so as to decrease a discharge current from said first power storage device when the voltage of said first power storage device falls below said lower limit value, and
said second control unit further includes a fourth correction unit to correct said target voltage so as to increase it when the voltage of said second power storage device exceeds said upper limit value, and to correct said target voltage so as to lower it when the voltage of said second power storage device falls below said lower limit value.

4. The power supply system according to claim 1, wherein said upper and lower limit values are set based on at least one of a temperature and a state of charge of the corresponding power storage device.

5. The power supply system according to claim 1, wherein said control device controls the converter corresponding to said charge-side power storage device such that the voltage of said charge-side power storage device becomes said upper limit value during said temperature rise control.

6. The power supply system according to claim 1, wherein said control device controls the converter corresponding to said discharge-side power storage device such that the voltage of said discharge-side power storage device becomes said lower limit value during said temperature rise control.

7. A power supply system capable of supplying an electric power to a load device, comprising:
   a first power storage device capable of charging and discharging;
   an electric power line configured to allow an electric power to be exchanged between the power supply system and said load device;
   a converter provided between said first power storage device and said electric power line to convert a voltage between said first power storage device and said electric power line;
   a second power storage device connected to said electric power line and capable of charging and discharging; and
   a control device to control said converter, wherein
   said control device controls said converter to prevent a voltage of said first power storage device from exceeding an upper limit value and falling below a lower limit value, during temperature rise control to raise temperature of at least one of said first and second power storage devices by exchanging the electric power between said first and second power storage devices through said converter and said electric power line.

8. The power supply system according to claim 7, wherein said control device includes:
a voltage control unit to control said converter to control a voltage of said electric power line to be a target voltage during said temperature rise control; and
a first correction unit to correct an output of said voltage control unit to increase the voltage of said electric power line when the voltage of said first power storage device exceeds said upper limit value, and to correct the output of said voltage control unit to lower the voltage of said electric power line when the voltage of said first power storage device falls below said lower limit value.

9. The power supply system according to claim 8, wherein said control device further includes:
a second correction unit to correct said target voltage to increase it when the voltage of the first power storage device exceeds said upper limit value, and to correct said target voltage to lower it when the voltage of said first power storage device falls below said lower limit value.

10. The power supply system according to claim 7, wherein said control device includes:
a current control unit to control said converter to control charge and discharge currents of said first power storage device to be a target current, during said temperature rise control; and
a first correction unit to correct an output of said current control unit to increase a voltage of said electric power line when the voltage of said first power storage device exceeds said upper limit value, and to correct the output of said current control unit to lower the voltage of said electric power line when the voltage of said first power storage device falls below said lower limit value.

11. The power supply system according to claim 10, wherein
said control device further includes:
a second correction unit to correct said target current to decrease the charge current to said first power storage device when the voltage of the first power storage device exceeds said upper limit value, and to correct said target current to decrease the discharge current from said first power storage device when the voltage of said first power storage device falls below said lower limit value.

12. The power supply system according to claim 7, wherein said upper and lower limit values are set based on at least one of a temperature and a state of charge of said first power storage device.

13. The power supply system according to claim 7, wherein said control device controls said converter such that the voltage of said first power storage device becomes said upper limit value during said temperature rise control.

14. The power supply system according to claim 7, wherein said control device controls said converter such that a voltage of said first power storage device becomes said lower limit value during said temperature rise control.

* * * * *